United States Patent
Reese

(10) Patent No.: US 6,370,516 B1
(45) Date of Patent: Apr. 9, 2002

(54) COMPUTER BASED DEVICE TO REPORT THE RESULTS OF CODIFIED METHODOLOGIES OF FINANCIAL ADVISORS APPLIED TO A SINGLE SECURITY OR ELEMENT

(76) Inventor: John P Reese, 4 Buckingham La., West Hartford, CT (US) 06117

( * ) Notice: Subject to any disclaimer, the term of this patent is extended or adjusted under 35 U.S.C. 154(b) by 0 days.

(21) Appl. No.: 09/042,476

(22) Filed: Mar. 16, 1998

(51) Int. Cl.[7] .............................................. G06F 17/60
(52) U.S. Cl. ......................................... 705/36; 705/35
(58) Field of Search ............................. 705/35, 36, 38, 705/37; 707/7, 9, 10, 104; 706/925

(56) References Cited

U.S. PATENT DOCUMENTS

| | | | | |
|---|---|---|---|---|
| 4,989,141 A | * | 1/1991 | Lyons et al. ................... | 705/36 |
| 5,006,998 A | * | 4/1991 | Yasunobu et al. .......... | 706/925 |
| 5,262,941 A | * | 11/1993 | Saladin et al. ................. | 705/38 |
| 5,471,575 A | * | 11/1995 | Giansante .................... | 707/503 |
| 5,502,637 A | * | 3/1996 | Beaulieu et al. .............. | 705/36 |
| 5,812,988 A | * | 9/1998 | Sandretto ..................... | 705/36 |
| 5,819,271 A | * | 10/1998 | Mahoney et al. .............. | 707/9 |
| 5,893,079 A | * | 4/1999 | Cwenar ........................ | 705/36 |
| 5,978,778 A | * | 11/1999 | O'Shaughnessy ............ | 705/36 |
| 6,012,042 A | * | 1/2000 | Black et al. ................... | 705/36 |
| 6,018,722 A | * | 1/2000 | Ray et al. ..................... | 705/36 |
| 6,188,992 B1 | * | 2/2001 | French ......................... | 705/35 |

FOREIGN PATENT DOCUMENTS

| | | | | |
|---|---|---|---|---|
| WO | WO 95/27945 | * | 10/1995 | ........... G06F/15/16 |
| WO | WO 96/06402 | * | 2/1996 | ........... G06F/17/60 |

OTHER PUBLICATIONS

Gianturco, Michael, "Investing on the Web: Surf and Grow Rich", Forbes ASAP Supplement, pp. 36–38, Dialog File 15:ABI/Inform, Jun. 3, 1996.*

"Zacks, Newsbytes Offer Time Sensitive Stories to Investors", Newsbytes News Network, Dialog File 9:Business & Industry, Sep. 6, 1996.*

"Zacks Launches New Investment Web Site", Newsbytes News Network, Dialog File 9:Business & Industry, Nov. 6, 1996.*

Harris, Diane, "Smart Ways to Shop the New Financial Supermarkets", Money, vol. 26, No. 6, pp 100–109, Jun. 1997.*

"InvestorsEdge, a Unit of Neural Applications Corporation, Unveils a New Financial Internet Business Unit—Stockpoint", PR Newswire, Dialog File 16:PROMT, Oct. 20, 1997.*

Egan, Jack, "The Virtual Bloomberg", U.S. News & World Report, vol. 123, No. 22, p. 83, Dec. 8, 1997.*

"Money Talks Adds Daily Small–Cap Interviews and Earnings Analysis; Financial Services Web Sites Will Provide New Content for Money Talks Site", PR Newswire, Dialog File 148:Trade & Industry, Dec. 19, 1997.*

* cited by examiner

Primary Examiner—Emanuel Todd Voeltz
Assistant Examiner—John W. Hayes

(57) ABSTRACT

The invention utilizes computer apparatus to automatically generate a display or report containing the result for a plurality of investment advisor methodologies (FIG. 2) for one specific security at a time (FIG. 18a). The user is not required to input any more information than the security identification because the information required for the calculations is readily available in the data storage means (FIG. 3, box 54). In addition to the result, a descriptive analysis (FIG. 7) can be provided which illustrates the reasoning (FIG. 7, box 144) of the particular advisor (FIG. 7, box 140) in support of the result (FIG. 7, box 146). Also a report can be provided for individual ratios (FIG. 8) applied to one specific security (FIG. 8, box 166) at a time for a plurality of investment advisor methodologies (FIG. 8, box 168). Another type of display or report the system could generate is an analysis by a plurality of advisors (FIG. 26, box 262), of a particular element selected from a list of elements (FIG. 23), within a related subject matter.

35 Claims, 50 Drawing Sheets

FIG. 1

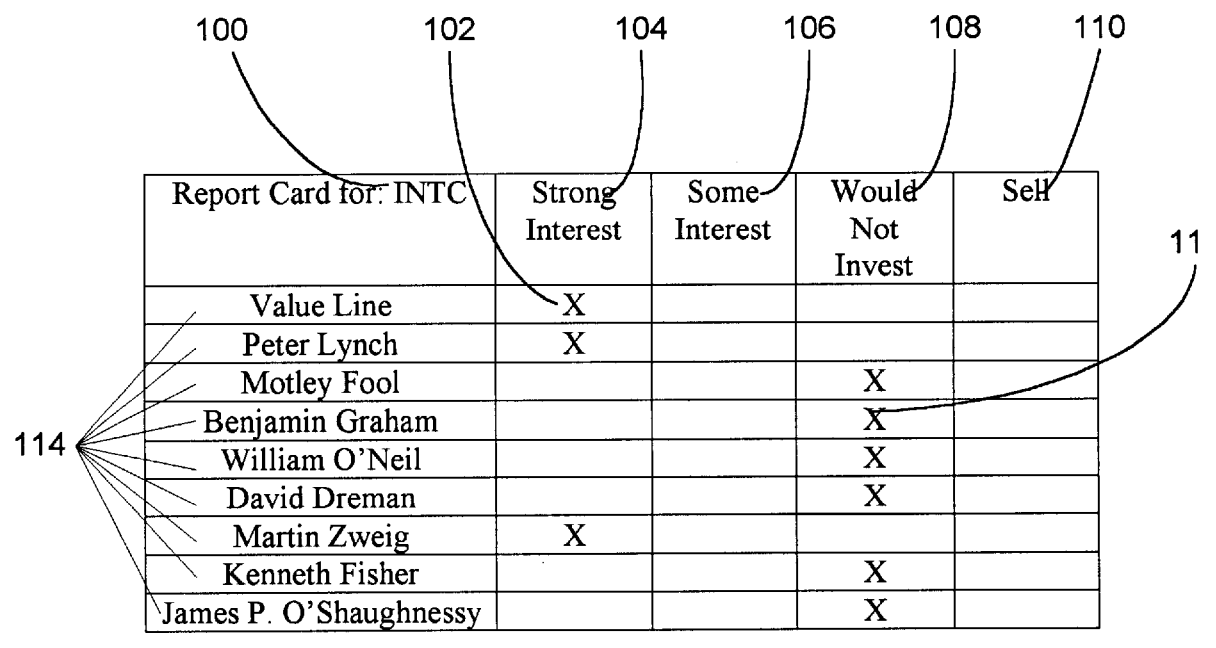

| Report Card for: INTC | Strong Interest | Some Interest | Would Not Invest | Sell |
|---|---|---|---|---|
| Value Line | X | | | |
| Peter Lynch | X | | | |
| Motley Fool | | | X | |
| Benjamin Graham | | | X | |
| William O'Neil | | | X | |
| David Dreman | | | X | |
| Martin Zweig | X | | | |
| Kenneth Fisher | | | X | |
| James P. O'Shaughnessy | | | X | |

FIG. 7

Would Kenneth Fisher recommend INTC? ,140 ,142

Here 's how Kenneth Fisher would evaluate INTC:

144
- Look at the P/S Ratio: The prospective company should have a low Price/Sales Ratio. Non-cyclical stocks with Price/Sales Ratios > 3 should never be purchased, however they can be held depending on the investor's risk aversion. INTC's P/S (5.1) is above 3. If you are currently holding this stock, you should think about selling it if risk bothers you. If risk does not bother you much, hold the stock until the P/S ratio approaches 6.
- Look at the Debt/Equity Ratio: Less debt equals less risk. The Debt/Equity ratio for INTC, (3.0%), would be acceptable to Fisher.
- Look at the Price/Research Ratio: Technology or Medical companies with low PRRs should be purchased. To Fisher, companies with Price/Research Ratios greater than 15 should never be purchased, because they either spend too little on R&D, or are extremely overvalued. This ratio indicates how much a market values a company's R&D. The PRR for INTC is 54.3, and it would be avoided at all costs by Fisher.

140     Fisher would not have <u>strong interest</u> in INTC at this time.     146

Would William O'Neil recommend INTC?     142

Here's how William O'Neil would evaluate INTC:

150   152   148
                                                              154

144
- Look at the quarterly EPS change (This quarter vs. same quarter last year): The EPS growth for this quarter relative to the same quarter a year earlier for INTC, 55.9%, is greater than 18%, and is the very least O'Neil likes to see for a "good" growth company. INTC would pass O'Neil's first requirement.
- Look at the shares outstanding: Shares outstanding should be less than 25 million, INTC currently has 1,636 million shares outstanding, and therefore would fail this test.
- Look at the institutional ownership: There should be some institutional ownership. Institutions own 54.3% of INTC's stock. Because there is some institutional ownership present, INTC would pass this test.

O'Neil would not have <u>strong interest</u> in INTC at this time.

P/S Ratio Analysis

Long-Term

| Recommendor | Orientation | Recommendation |
|---|---|---|
| Kenneth Fisher | Undetermined period of time. His method can be used by any kind of investor. | The prospective company should have a low Price/Sales Ratio. Non-cyclical stocks with Price/Sales Ratios > 3 should never be purchased, however they can be held depending on the investor's risk aversion. INTC's P/S (5.1) is above 3. If you are currently holding this stock, you should think about selling it if risk bothers you. If risk does not bother you much, hold the stock until the P/S ratio approaches 6. |
| James P. O'Shaughnessy | Approximately 5 years | INTC, with a P/S of 5.07, does not fall within the 50 highest nor 50 lowest P/S ratios of the current market. Neither does it pass the required criteria for O'Shaugnessy's Cornerstone Growth Strategy which would allow a company to have a P/S ratio up to 1.5. Therefore, you should use other ratios, rather than this one, to help you decide if this is one of the best stocks. |

Yield Analysis

Long-term

| Recommendor | Orientation | Recommendation |
|---|---|---|
| David Dreman | Value Stocks (3-9 years) | The company in question should have a yield that is high and that can be maintained or increased. INTC's current Yield is 0.17%, while the Market Yield is 1.69%, so INTC would fail this Dreman test. |
| James P. O'Shaughnessy | Approximately 5 years | This is not one of the 50 highest dividend yields from large-cap stocks. Therefore, you should use other ratios, rather than this one, to help you decide if you should buy this stock. |

FIG. 10

| Report Card for: INTC | Strong Interest | Some Interest | Would Not Invest | Sell |
|---|---|---|---|---|
| Value Line | X | | | |
| Peter Lynch | X | | | |
| Motley Fool | | | X | |
| Benjamin Graham | | | X | |
| William O'Neil | | | X | |
| David Dreman | | | X | |
| Martin Zweig | X | | | |
| Kenneth Fisher | | | X | |
| James P. O'Shaughnessy | | | X | |

Would Kenneth Fisher recommend INTC?

Here's how Kenneth Fisher would evaluate INTC:

- Look at the P/S Ratio: The prospective company should have a low Price/Sales Ratio. Non-cyclical stocks with Price/Sales Ratios > 3 should never be purchased, however they can be held depending on the investor's risk aversion. INTC's P/S (5.1) is above 3. If you are currently holding this stock, you should think about selling it if risk bothers you. If risk does not bother you much, hold the stock until the P/S ratio approaches 6.
- Look at the Debt/Equity Ratio: Less debt equals less risk. The Debt/Equity ratio for INTC, (3.0%), would be acceptable to Fisher.
- Look at the Price/Research Ratio: Technology or Medical companies with low PRRs should be purchased. To Fisher, companies with Price/Research Ratios greater than 15 should never be purchased, because they either spend too little on R&D, or are extremely overvalued. This ratio indicates how much a market values a company's R&D. The PRR for INTC is 54.3, and it would be avoided at all costs by Fisher.

Fisher would not have <u>strong interest</u> in INTC at this time.

Would William O'Neil recommend INTC?

Here's how William O'Neil would evaluate INTC:

- Look at the quarterly EPS change (This quarter vs. same quarter last year): The EPS growth for this quarter relative to the same quarter a year earlier for INTC, 55.9%, is greater than 18%, and is the very least O'Neil likes to see for a "good" growth company. INTC would pass O'Neil's first requirement.
- Look at the shares outstanding: Shares outstanding should be less than 25 million, INTC currently has 1,636 million shares outstanding, and therefore would fail this test.
- Look at the institutional ownership: There should be some institutional ownership. Institutions own 54.3% of INTC's stock. Because there is some institutional ownership present, INTC would pass this test.

O'Neil would not have <u>strong interest</u> in INTC at this time

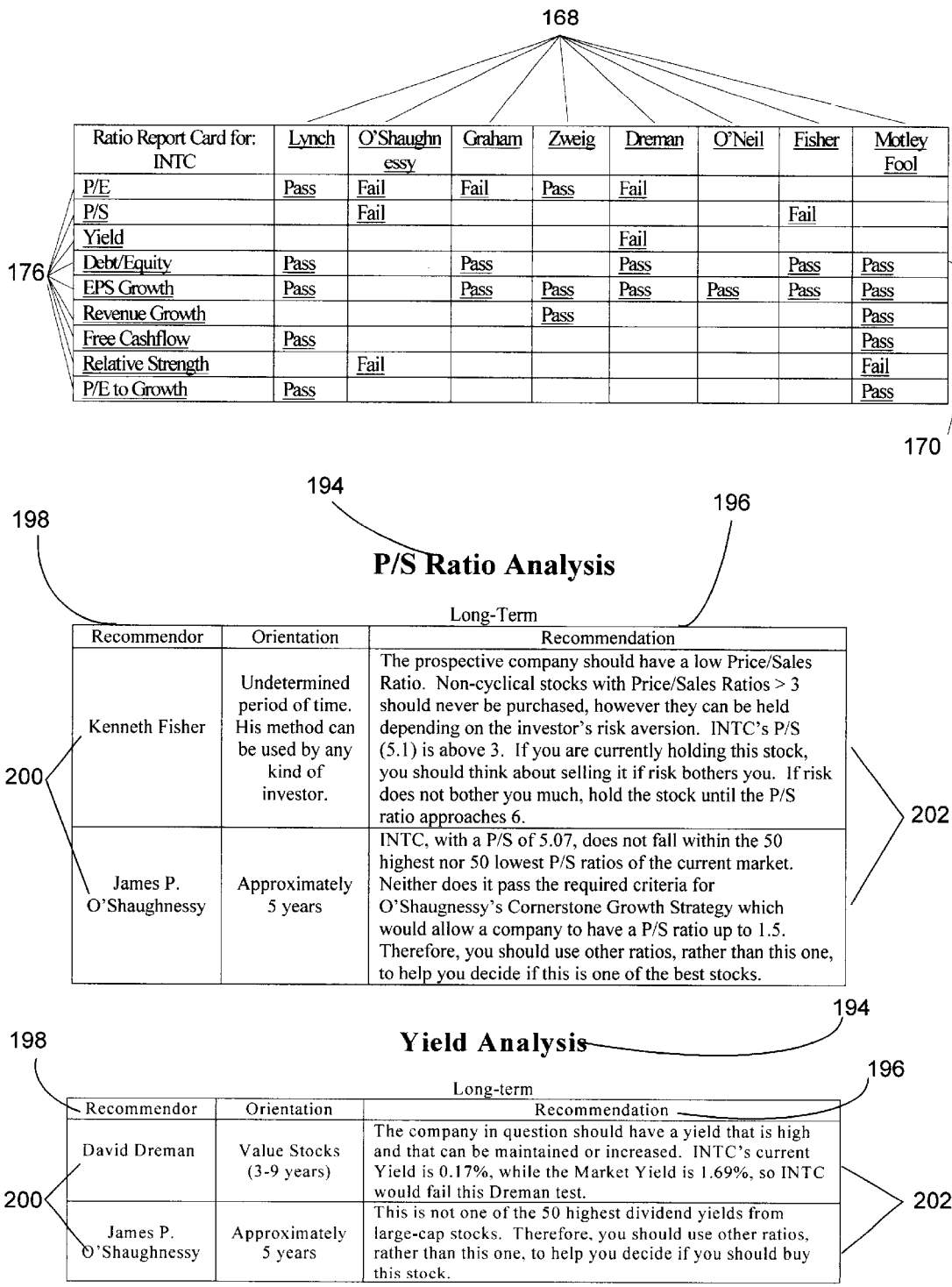

FIG. 12

| Report Card for: INTC | Strong Interest | Some Interest | Would Not Invest | Sell |
|---|---|---|---|---|
| Value Line | X | | | |

FIG. 13

Would Peter Lynch recommend INTC?

Here's how Peter Lynch would evaluate INTC:

- Determine the Classification: INTC would be considered a "fast-grower" by Lynch
- Look at the P/E/Growth Ratio: The investor should examine the P/E (17.8) relative to the growth rate (30.7%), based on the three year historical growth rate, for a company as he considers this a quick way of determining the fairness of the price. In this particular case, the P/E/G ratio for INTC (0.58) makes it attractive.
- Look at the P/E Ratio: For companies with sales greater than 1 billion Lynch likes to see that the P/E ratio remain below 40. He feels that companies this large would have a difficult time maintaining a growth rate high enough to support this P/E above this threshold. INTC, whose sales are 25,003.0 million, would need to have a P/E below 40 to pass Lynch's criteria. INTC's P/E of (17.8) would be considered acceptable.
- Look at the EPS Growth Rate: Lynch favors companies that have several years of fast earnings growth (at least 20%/yr. but not too fast), because he feels that they have a proven formula for growth that in many cases can continue many more years. The EPS growth rate for INTC is 30.7%, based on the three year historical growth rate, which Lynch would find acceptable.
- Look at the Debt/Equity Ratio: Lynch would consider the Debt/Equity ratio for INTC (3.0%) to be exceptionally low, which is considered good by Lynch (Equity is at least ten times debt). He feels this ratio is one quick way to determine the financial strength of the company.

Lynch would find INTC attractive right now as it passes his quantitative criteria.

FIG. 15

PE to Growth Analysis

| Recommendor | Orientation | Recommendation |
|---|---|---|
| Peter Lynch | (1-5 Years) | Using Peter Lynch's methodology, the investor should look for companies with P/Es around or below their earnings growth rates. In this particular case, the P/E/G ratio for INTC (0.6) makes it a great buy. |
| Motley Fool | (1-5 Years) | If the company's Fool ratio is between .5 and .65 (INTC's is 0.58) it would pass the PEG ratio analysis. Therefore, INTC would pass this individual criteria. However, INTC failed more than one other critical criteria which means it would fail The Motley Fool's overall test. |

FIG. 16

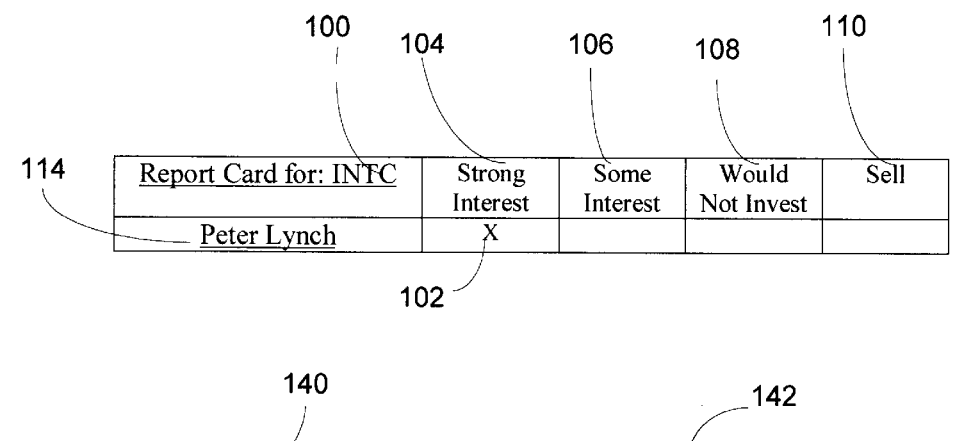

Would Peter Lynch recommend INTC?

Here's how Peter Lynch would evaluate INTC:

- Determine the Classification: INTC would be considered a "fast-grower" by Lynch
- Look at the P/E/Growth Ratio: The investor should examine the P/E (17.8) relative to the growth rate (30.7%), based on the three year historical growth rate, for a company as he considers this a quick way of determining the fairness of the price. In this particular case, the P/E/G ratio for INTC (0.58) makes it attractive.
- Look at the P/E Ratio: For companies with sales greater than 1 billion Lynch likes to see that the P/E ratio remain below 40. He feels that companies this large would have a difficult time maintaining a growth rate high enough to support this P/E above this threshold. INTC, whose sales are 25,003.0 million, would need to have a P/E below 40 to pass Lynch's criteria. INTC's P/E of (17.8) would be considered acceptable.
- Look at the EPS Growth Rate: Lynch favors companies that have several years of fast earnings growth (at least 20%/yr. but not too fast), because he feels that they have a proven formula for growth that in many cases can continue many more years. The EPS growth rate for INTC is 30.7%, based on the three year historical growth rate, which Lynch would find acceptable.
- Look at the Debt/Equity Ratio: Lynch would consider the Debt/Equity ratio for INTC (3.0%) to be exceptionally low, which is considered good by Lynch (Equity is at least ten times debt). He feels this ratio is one quick way to determine the financial strength of the company.

<u>Lynch would find INTC attractive right now as it passes his quantitative criteria.</u>

FIG. 17

| Ratio Report Card for: INTC | Lynch | O'Shaugh nessy | Graham | Zweig | Dreman | O'Neil | Fisher | Motley Fool |
|---|---|---|---|---|---|---|---|---|
| P/E to Growth | Pass | | | | | | | Pass |

PE to Growth Analysis

| Recommendor | Orientation | Recommendation |
|---|---|---|
| Peter Lynch | (1-5 Years) | Using Peter Lynch's methodology, the investor should look for companies with P/Es around or below their earnings growth rates. In this particular case, the P/E/G ratio for INTC (0.6) makes it a great buy. |
| Motley Fool | (1-5 Years) | If the company's Fool ratio is between .5 and .65 (INTC's is 0.58) it would pass the PEG ratio analysis. Therefore, INTC would pass this individual criteria. However, INTC failed more than one other critical criteria which means it would fail The Motley Fool's overall test. |

FIG. 19

Choose a Recommendor: 218

○ Peter Lynch    ○ William O'Neil
○ Kenneth Fisher    ○ Value Line
○ Benjamin Graham    ○ David Dreman
○ Motley Fools    ○ Martin Zweig
○ No Preference    ○ James P. O'Shaughnessy
(show me the whole page)

FIG. 20

Choose a Ratio:

○ PE Ratio    ○ PEG Ratio — 222

○ EPS Growth    ○ Revenue Growth

○ PS Ratio    ○ Yield

○ DE Ratio

FIG. 21a

```
<%Sub GrahamByCpyTest(grahamAnalysis)

' Comments: Graham performs a series of tests to evaluate the
    attractiveness of a security.
    ' Parameters:  The following parameters are defined as global variables.
    ' Ticker as String
    ' LTDebt as Variant
    ' CurLiabs as Variant
    ' CurAssets as Variant
    ' GrahamEPSGrowth as Variant
    ' CurRatio as Variant
    ' EPS4 as Variant
    ' EPS5 as Variant
    ' PERatio as Variant
    ' PRBook as Variant
    ' SecDesc as String
    ' Sales as Variant
    '_____                /— 224

'Title for Graham's section
grahamAnalysis = "<hr><font color=""" & conBlack & """ size=""5""><a
name=""graham""><strong>Would <a
href=""../../sources.asp#graham"">Benjamin Graham</a> recommend " & Ticker
& "? </font></strong><br>" & RR   228
'_____ 226            /       /— 224

If SecDesc = "Technology" Then
    grahamAnalysis = grahamAnalysis & "<br><font color=""" & conBlack &
    """ size=""" & conTextSize & """ face=""" & conFontFace & """><strong>
    Here's how Ben Graham would evaluate " & Ticker & ":
    </font></strong><br>" & RR
    grahamAnalysis = grahamAnalysis & "<font face=""" & conFontFace & """
    color=""" & conMaroon & """ size=""" & conTextSize &
    """><strong><ul><li><font color=""" & conBlack & """><u>Look at the
    Sector</font></u>:  <font color=""" & conBlack & """ face=""" &
    conFontFace & """>" & Ticker & "</font> is a " & SecDesc & " stock, which
    is one sector that Graham avoids.  He states that although you may get
    lucky and invest in a technology winner, many stocks in this sector will end
    up being losers.  Although Graham would avoid <font color=""" & conBlack
    & """ face=""" & conFontFace & """>" & Ticker & "</font>, the following is a
```

230 (label for the If block)

FIG. 21b list of criteria Graham would apply if it were not a technology
company.</strong></li></font> " & RR  — 238
'Output string for ratio analysis
grahamPEan = "<font face=""" & conFontFace & """ color=""" &
conMaroon & """ size=""" & conTextSize & """><strong>When Benjamin
Graham wrote his now immortal book ""The Intelligent Investor"", he felt
that technology and financial stocks were too risky to invest in, and at that
time they were not the driving force of the market as they are today.
Because <font color=""" & conBlack & """ face=""" & conFontFace & """>"
& Ticker & "</font> is a " & SecDesc & " company, (which typically have a
large number of intangible assets, an item ignored by Graham's value
analysis) Graham's analysis of P/E would not be relevant
here.</font></strong>"  — 240
'Output string for ratio report card
GrahamPEGood = "<font face=""" & conFontFace & """ color=""" &
conMaroon & """ size=""" & conTextSize &
"""><strong>&nbsp;</font></strong>" & RR  — 242
'Scorecard variable
GrahamFinalScore = GrahamFinalScore + 0
Elself SecDesc = "Financial" Then
 grahamAnalysis = grahamAnalysis & "<font color=""" & conBlack & """
size=""" & conTextSize & """ face=""" & conFontFace & """><strong>
Here's how Ben Graham would evaluate " & Ticker & ":
</font></strong><br>" & RR
 grahamAnalysis = grahamAnalysis & "<br><font face=""" &
conFontFace & """ color=""" & conMaroon & """ size=""" & conTextSize &
"""><strong><ul><li><font color=""" & conBlack & """><u>Look at the
Sector</font></u>: <font color=""" & conBlack & """ face=""" &
conFontFace & """>" & Ticker & "</font> is a " & SecDesc & " stock, which
is one sector that Graham goes out of his way to avoid. Although Graham
would avoid <font color=""" & conBlack & """ face=""" & conFontFace &
""">" & Ticker & "</font>, the following is a list of criteria Graham would
apply if it were not a financial company.</strong></li></font> " & RR
'Output string for ratio analysis
 grahamPEan = "<font face=""" & conFontFace & """ color=""" &
conMaroon & """ size=""" & conTextSize & """><strong>When Benjamin
Graham wrote his now immortal book ""The Intelligent Investor"", he felt
that technology and financial stocks were too risky to invest in, and at that
time they were not the driving force of the market as they are today.
Because <font color=""" & conBlack & """ face=""" & conFontFace & """>"
& Ticker & "</font> is a " & SecDesc & " company, (which typically have a

FIG. 21c large number of intangible assets, an item ignored by Graham's value analysis) Graham's analysis of P/E would not be relevant here.</font></strong>"
'Output string for ratio report card
GrahamPEGood = "<font face=""" & conFontFace & """ color=""" & conMaroon & """ size=""" & conTextSize & """><strong> </font></strong>" & RR
'Scorecard variable
GrahamFinalScore = GrahamFinalScore + 0

Else grahamAnalysis = grahamAnalysis & "<br><font color=""" & conBlack & """ size=""" & conTextSize & """ face=""" & conFontFace & """><strong> Here's how Ben Graham would evaluate " & Ticker & ": </font></strong><br>" & RR
    grahamAnalysis = grahamAnalysis & "<br><font face=""" & conFontFace & """ color=""" & conMaroon & """ size=""" & conTextSize & """><strong><ul><li><font color=""" & conBlack & """><u>Look at the Sector</font></u>: <font color=""" & conBlack & """ face=""" & conFontFace & """>" & Ticker & "</font> is neither a Technology company nor a Financial Company, therefore Graham would, in fact, render an opinion. </strong></li></font>" & RR
    GrahamFinalScore = GrahamFinalScore + 5

End If

'_____ 232

'_____            242

'_____ 234

224

'Sales section

'_____ 228

If sales = "N/A" Then grahamAnalysis = grahamAnalysis & "<font face=""" & conFontFace & """ color=""" & conMaroon & """ size=""" & conTextSize & """><a name=""graham""><strong><li><font color=""" & conBlack & """><u>Look at the sales</font></u>: The investor must select companies of ""adequate size."" This includes companies with annual sales greater than $340 million. <font color=""" & conBlack & """>" & Ticker & "'s</font> sales figures are not available which means Graham could not render an opinion on this variable.</strong></li></font>" & RR

236

GrahamFinalScore = GrahamFinalScore + 0

Else

If sales > 340 Then

FIG. 21d grahamAnalysis = grahamAnalysis & "<font face=""" &
conFontFace & """ color=""" & conMaroon & """ size=""" &
conTextSize & """><a name=""graham""><strong><li><font
color=""" & conBlack & """><u>Look at the sales</font></u>:  The
investor must select companies of ""adequate size.""  This includes
companies with annual sales greater than $340 million. <font
color=""" & conBlack & """ face=""" & conFontFace & """>" & Ticker
& "'s</font> sales of <font color=""" & conBlack & """ face=""" &
conFontFace & """>" & Format(sales, "$#,##0.0") & "</font> million,
" & SalesType & ", passes Graham's test.</strong></li></font>" &
RR
GrahamFinalScore = GrahamFinalScore + 5
    Else
grahamAnalysis = grahamAnalysis & "<font face=""" &
conFontFace & """ color=""" & conMaroon & """ size=""" &
conTextSize & """><a name=""graham""><strong><li><font
color=""" & conBlack & """><u>Look at the sales</font></u>:  The
investor must select companies of ""adequate size.""  This includes
companies with annual sales greater than $340 million. <font
color=""" & conBlack & """ face=""" & conFontFace & """>" & Ticker
& "'s</font> sales of <font color=""" & conBlack & """ face=""" &
conFontFace & """>" & Format(sales, "$#,##0.0") & "</font> million,
" & SalesType & ", fails Graham's test.</strong></li></font>" & RR
GrahamFinalScore = GrahamFinalScore + 0
    End If
End If
'_____
'_____
                — 232
End Sub %>

FIG. 22a

```
<%Sub DremanByCpyTest(dremanAnalysis)
        ' Comments: Dreman performs a series of tests to evaluate the
        attractiveness of a security.
        ' Parameters:  The following parameters are defined as global
        variables.
        ' Ticker as String
        ' ProfMgn as Variant
        ' ROE as Variant
        ' MarketCap as Variant
        ' PERatio as Variant
        ' Payout as Variant
        ' Yield as Variant
        ' DERatio as Variant
        ' CurRatio as Variant
        ' SPPE as Variant
        ' AvgCurRatio as Variant
        ' EPSGrowth as Variant
        ' Bottom40PE as Variant
        ' DowYield as Variant
        ' TopThirdROE as Variant
        ' Indcode as String
        ' Returns  : Returns dremananalysis as the output
'_____                 ___ 224
'Title for Dreman's sections
        dremanAnalysis = "<hr><font color=""" & conBlack & """ size=""5""><a
        name=""dreman""><strong>Would <a
        href=""../../sources.asp#dreman"">David Dreman</a> recommend " &
        Ticker & "? </font></strong><br><bR>" & RR
'_____                 ___ 234
'_____           ___ 228   224
'Market Cap section
'_____
If MarketCap = "N/A" Then
        dremanAnalysis = dremanAnalysis & "<font color=""" & conBlack & """
        size=""" & conTextSize & """ face=""" & conFontFace & """><strong>
        Here's how David Dreman would evaluate " & Ticker & ":
        </font></strong><br><bR>" & RR
```

FIG. 22b dremanAnalysis = dremanAnalysis & "<font face=""" & conFontFace & """ color=""" & conMaroon & """ size=""" & conTextSize & """><strong><ul><li><font color=""" & conBlack & """><u>Look at the Market Cap</font></u>: Medium to large-sized companies should be chosen, because they are more in the public eye, and the investor is exposed to less risk of ""accounting gimmickry"" and the companies have more staying power.  <font color=""" & conBlack & """>" & Ticker & "'s market cap is not available which means Dreman could not render an opinion on this variable.</strong></li></font>" & RR
  DremanFinalScore = DremanFinalScore + 0
Else
  If MarketCap >= 250 Then
    dremanAnalysis = dremanAnalysis & "<font color=""" & conBlack & """ size=""" & conTextSize & """ face=""" & conFontFace & """><strong> Here's how David Dreman would evaluate " & Ticker & ": </font></strong><br><bR>" & RR
    dremanAnalysis = dremanAnalysis & "<font face=""" & conFontFace & """ color=""" & conMaroon & """ size=""" & conTextSize & """><strong><ul><li><font color=""" & conBlack & """><u>Look at the Market Cap</font></u>: Medium to large-sized companies should be chosen, because they are more in the public eye, and the investor is exposed to less risk of ""accounting gimmickry"" and the companies have more staying power.  <font color=""" & conBlack & """>" & Ticker & "</font> passes this test with a market cap of <font color=""" & conBlack & """>" & Format(MarketCap, "##.##") & "</font> million.</strong></li></font>" & RR
    DremanFinalScore = DremanFinalScore + 5
  Else
    dremanAnalysis = dremanAnalysis & "<font color=""" & conBlack & """ size=""" & conTextSize & """ face=""" & conFontFace & """><strong> Here's how David Dreman would evaluate " & Ticker & ": </font></strong><br><bR>" & RR
    dremanAnalysis = dremanAnalysis & GuruFontFace & "<strong><ul><li><font color=""" & conBlack & """><u>Look at the Market Cap</font></u>: Medium to large-sized companies should be chosen, because they are more in the public eye, and the investor is exposed to less risk of ""accounting gimmickry"" and the companies have more staying power.  <font color=""" & conBlack & """>" & Ticker & "</font> fails this test with a market cap of <font

FIG. 22c

```
                    color="""" & conBlack & """">" & Format(MarketCap, "##.##") &
                    "</font> million.</strong></li></font>" & RR
                    DremanFinalScore = DremanFinalScore + 0
        End If
    End If
'_____
                    _____ 232
'_____
'PERatio section _____ 234
'_____                                              224
                              _____ 228                    /
If PERatio = "N/A" Then                                      /
        If EPS > 0 Then                                      /
                'Output string for overall analysis.        /
                dremanAnalysis = dremanAnalysis & "<font face="""" &
                conFontFace & """" color="""" & conMaroon & """" size="""" &
                conTextSize & """"><strong><li><font color="""" & conBlack &
                """"><u>Look at the P/E relative to the whole market</font></u>:
                The PE of a company should be in the bottom 40% of the overall
                market.  Dreman has conducted studies that show that lower P/E
                stocks will give an investor better returns than higher P/E stocks
                while taking on less risk.  <font color="""" & conBlack & """">" &
                Ticker & "'s</font> P/E is currently not available which means there
                can not be a comparison made to the bottom 40% of the overall
                market (below " & Bottom40PE & ").</strong></li></font>" & RR
    238 ____  'Output string for ratio analysis--PE ratio
                dremanPEan = "<font face="""" & conFontFace & """" color="""" &
                conMaroon & """" size="""" & conTextSize & """"><strong> The PE of
                a company should be in the bottom 40% of the overall market.
                Dreman has conducted studies that show that lower P/E stocks will
                give an investor better returns than higher P/E stocks while taking
                on less risk.  <font color="""" & conBlack & """">" & Ticker &
                "'s</font> P/E is currently not available which means there can not
                be a comparison made to the bottom 40% of the overall market
    240         (below " & Bottom40PE & ").</font></font></strong></li></font>" &
         \____ RR
                DremanPEGood = "<font face="""" & conFontFace & """" color="""" &
                conMaroon & """" size="""" & conTextSize &
                """"><strong> </font></strong>" & RR
                'Final score variable
                DremanFinalScore = DremanFinalScore + 0
        Else
```

FIG. 22d

```
            'Output string for overall analysis.
            dremanAnalysis = dremanAnalysis & "<font face=""" &
            conFontFace & """ color=""" & conMaroon & """ size=""" &
            conTextSize & """><strong><li><font color=""" & conBlack &
            """><u>Look at the P/E relative to the whole market</font></u>:
            The PE of a company should be in the bottom 40% of the overall
            market.  Dreman has conducted studies that show that lower P/E
            stocks will give an investor better returns than higher P/E stocks
            while taking on less risk.  Unfortunately, Dreman could not render
            an opinion for <font color=""" & conBlack & """>" & Ticker &
            "'s</font> trailing 12 month earnings were
            negative.</strong></li></font>" & RR
            'Output string for ratio analysis--PE ratio
            dremanPEan = "<font face=""" & conFontFace & """ color=""" &
            conMaroon & """  size=""" & conTextSize & """><strong> The PE of
            a company should be in the bottom 40% of the overall market.
            Dreman has conducted studies that show that lower P/E stocks will
            give an investor better returns than higher P/E stocks while taking
            on less risk.  Unfortunately, Dreman could not render an opinion for
            <font color=""" & conBlack & """>" & Ticker & "'s</font> trailing 12
            month earnings were negative.</strong></font>" & RR
            DremanPEGood = "<font face=""" & conFontFace & """ color=""" &
            conMaroon & """ size=""" & conTextSize &
            """><strong> </font></strong>" & RR
            'Final score variable
            DremanFinalScore = DremanFinalScore + 0
        End If
Else
        If PERatio < Bottom40PE Then
            'Output string for overall analysis.
            dremanAnalysis = dremanAnalysis & "<font face=""" &
            conFontFace & """ color=""" & conMaroon & """ size=""" &
            conTextSize & """><strong><li><font color=""" & conBlack &
            """><u>Look at the P/E relative to the whole market</font></u>:
            The PE of a company should be in the bottom 40% of the overall
            market.  Dreman has conducted studies that show that lower P/E
            stocks will give an investor better returns than higher P/E stocks
            while taking on less risk.  <font color=""" & conBlack & """>" &
            Ticker & "'s</font> P/E is currently <font color=""" & conBlack &
            """>" & PERatio & "</font>, " & PEType & ", meets the bottom 40%
```

FIG. 22e criteria. (below " & Bottom40PE & ")</font></font></strong></li></font>" & RR
'Output string for ratio analysis
dremanPEan = "<font face=""" & conFontFace & """ color=""" & conMaroon & """ size=""" & conTextSize & """><a name=""dremanpe""><strong> The PE of a company should be in the bottom 40% of the overall market. Dreman has conducted studies that show that lower P/E stocks will give an investor better returns than higher P/E stocks while taking on less risk. <font color=""" & conBlack & """>" & Ticker & "'s</font> P/E is currently <font color=""" & conBlack & """>" & PERatio & "</font>, which is " & PEType & ", meets the bottom 40% criteria. (below " & Bottom40PE & ")</font></font></strong></font>" & RR
'Output string for ratio report card
DremanPEGood = "<font face=""" & conFontFace & """ color=""" & conMaroon & """ size=""" & conTextSize & """><strong><a href=""#dremanpe"">Pass</a></font></strong>" & RR
'Final score variable
DremanFinalScore = DremanFinalScore + 5

Else

'Output string for overall analysis.
dremanAnalysis = dremanAnalysis & "<font face=""" & conFontFace & """ color=""" & conMaroon & """ size=""" & conTextSize & """><strong><li><font color=""" & conBlack & """><u>Look at the P/E relative to the whole market</font></u>: The PE of a company should be in the bottom 40% of the overall market. Dreman has conducted studies that show that lower P/E stocks will give an investor better returns than higher P/E stocks while taking on less risk. <font color=""" & conBlack & """>" & Ticker & "'s</font> P/E is currently <font color=""" & conBlack & """>" & PERatio & "</font>, " & PEType & ", which does not meet the bottom 40% criteria. (below " & Bottom40PE & ")</font></strong></font>" & RR
'Output string for ratio analysis
dremanPEan = "<font face=""" & conFontFace & """ color=""" & conMaroon & """ size=""" & conTextSize & """><a name=""dremanpe""><strong> The PE of a company should be in the bottom 40% of the overall market. Dreman has conducted studies that show that lower P/E stocks will give an investor better returns than higher P/E stocks while taking on less risk. <font color=""" & conBlack & """>" & Ticker & "'s</font> P/E is currently

FIG. 22f

```
<font color=""""" & conBlack & """"">" & PERatio & "</font>, " &
PEType & ", which does not meet the bottom 40% criteria.  (below "
& Bottom40PE & ")</font></strong></li></font>" & RR
'Output string for ratio report card
DremanPEGood = "<font face=""""" & conFontFace & """"" color=""""" &
conMaroon & """"" size=""""" & conTextSize & """""><strong><a
href=""""dremanpe"""">Fail</a></font></strong>" & RR
'Final score variable
DremanFinalScore = DremanFinalScore + 0
        End If
End If
'_____
'_____  232

End Sub %>
```

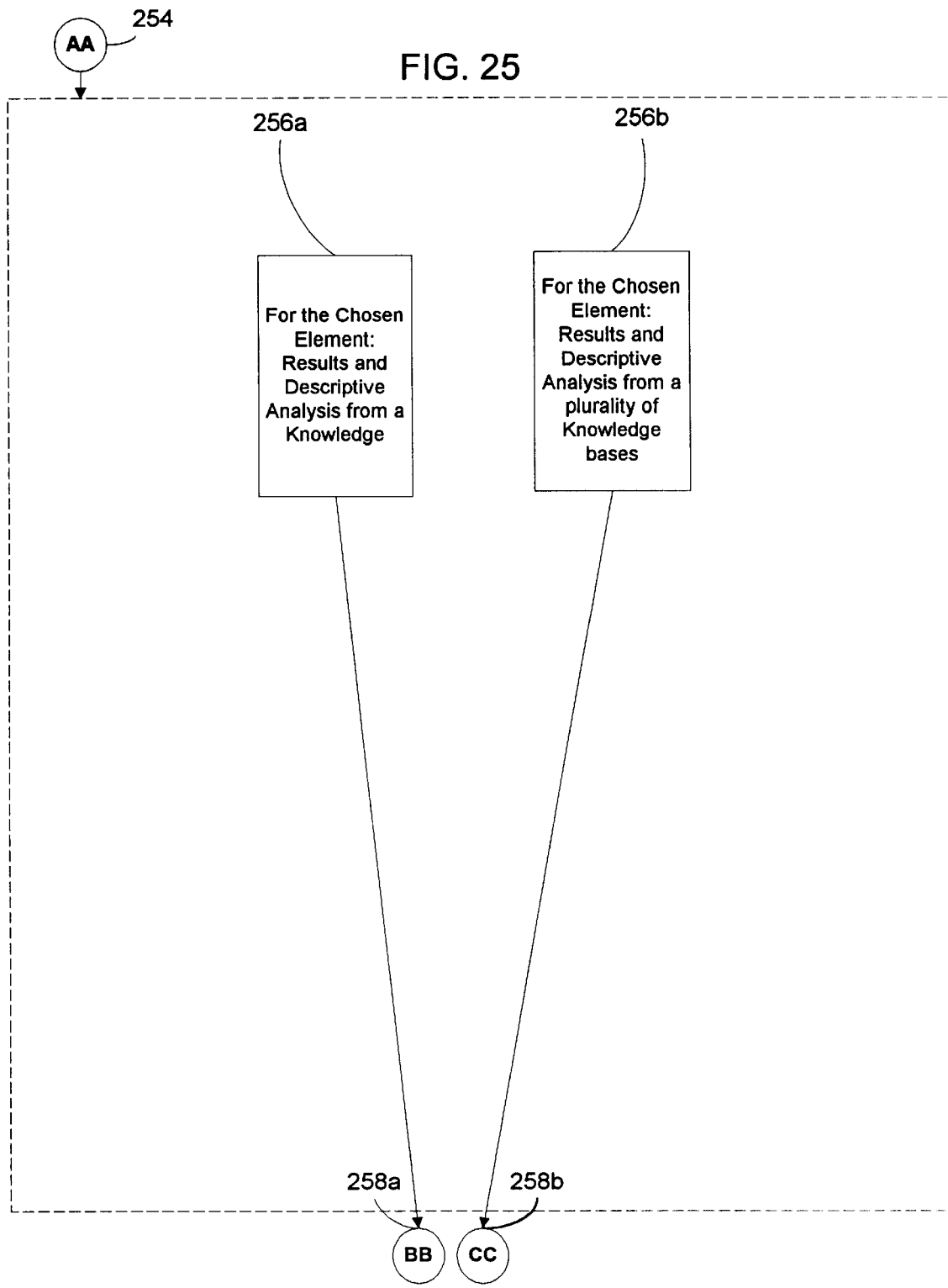

FIG. 27

| Report Card for : Element XYZ | Result 1 | Result 2 | Result 3 | Result 4 |
|---|---|---|---|---|
| Advisor 1 | X | | | |
| Advisor 2 | X | | | |
| Advisor 3 | | | X | |
| Advisor 4 | | | X | |
| Advisor 5 | | | X | |
| Advisor 6 | | | X | |
| Advisor 7 | X | | | |
| Advisor 8 | | | X | |
| Advisor 9 | | | X | |

FIG. 31

| Report Card for : Element XYZ | Result 1 | Result 2 | Result 3 | Result 4 |
|---|---|---|---|---|
| Advisor 1 | X | | | |

FIG. 32

Would Advisor 1 recommend Element XYZ?

Here's how Advisor 1 would evaluate Element XYZ:

- Evaluation Criteria 1: The reasoning of the evaluation criteria.
- Evaluation Criteria 2: The reasoning of the evaluation criteria.
- Evaluation Criteria 3: The reasoning of the evaluation criteria.

Advisor 1 would have <u>some interest</u> in Element XYZ at this time.

FIG. 35a

| | Advisor 1 | Advisor 2 | Advisor 3 | ... |
|---|---|---|---|---|
| Criteria 1 | | | | |
| Element 1 | "Pass" | "Fail" | "Fail" | ... |
| Element 2 | "Fail" | "Fail" | "Fail" | ... |
| Element 3 | "Fail" | "Pass" | "Fail" | ... |
| Criteria 2 | | | | |
| Element 1 | "Pass" | "Fail" | "Fail" | ... |
| Element 2 | "Fail" | "Fail" | "Fail" | ... |
| Element 3 | "Fail" | "Pass" | "Fail" | ... |

| | Lynch | Zweig | Dreman | ... |
|---|---|---|---|---|
| PE Ratio | | | | |
| Intel | "Pass" | "Fail" | "Fail" | ... |
| Motorola | "Fail" | "Fail" | "Fail" | ... |
| GM | "Fail" | "Pass" | "Fail" | ... |
| PS Ratio | | | | |
| Intel | "Pass" | "Fail" | "Fail" | ... |
| Motorola | "Fail" | "Fail" | "Fail" | ... |
| GM | "Fail" | "Pass" | "Fail" | ... |

Should I buy or sell CLST now? And Why?

Answer: Buy.
CLST meets the criteria that Investor guru Peter Lynch uses to select his stocks. Lynch's style returned an astounding 29% per year from 1977-1990, while he was the manager of the Fidelity Magellan Fund. CLST would be one of his picks according to his quantitative criteria.

| Report Card for: CLST | Strong Interest | Some Interest | Would Not Invest | Sell |
|---|---|---|---|---|
| Value Line | | | X | |
| Peter Lynch | X | | | |
| Motley Fool | | | X | |
| Benjamin Graham | | | X | |
| William O'Neil | | | X | |
| David Dreman | | | X | |
| Martin Zweig | | | X | |
| Kenneth Fisher | | | X | |
| James P. O'Shaughnessy | | | X | |

COMPUTER BASED DEVICE TO REPORT THE RESULTS OF CODIFIED METHODOLOGIES OF FINANCIAL ADVISORS APPLIED TO A SINGLE SECURITY OR ELEMENT

BACKGROUND

1. Field of Invention

This invention relates to a computer-based application in the financial field, specifically a reporting structure that aids in the decision making.

2. Discussion of Prior Art

Within the investment world, there are several books on investing that contain methodologies or wisdom that are very insightful and at times have eclipsed the return of the market by enormous amounts. The inventor recognized that when an investor would read these books they would begin to wonder if they could construct a system that would automatically generate the results of these analyses in an easy-to-read display or report. So initially, the inventor set up a spreadsheet to try and apply the wisdom and methodologies of these published advisors and discovered several things:

1. It was quite difficult to set up a template for a methodology because many times there were neither complete rules nor precise rules given.
2. There are a number of special cases that the author had mentioned that was not necessarily reflected in the rules they publicly disclosed.
3. Even after a set of rules was obtained, the inventor found it very tedious to look up and enter the data that was needed. In some cases, there could be twenty to fifty items and further more many times it wasn't precisely clear which variation of the data the author was talking about. For example, a company's growth rates could have such variations as the revenue growth rates, earnings growth rates, three year earnings growth rate, the five years earnings growth rate, the earnings growth rate for the last quarter, for the same quarter last year, earnings growth rate before adjustment for the extraordinary items etc.
4. It was extremely difficult to compare multiple advisors' approaches at one time. This prevented the inventor from determining if more than one of his favorite advisors would recommend the stock he was interested in.

In addition to the above desires and issues, the inventor wanted something that would be automated so that on a daily basis he could monitor one or more securities to see when one of the several advisors changed their position on whether to buy or sell the securities. Initially it was thought that this display or report generating system would be run in a personal computer environment. However, after much thought it became clear that this could run additionally on the World Wide Web and therefore be available internationally. Also, to make the system even more powerful and helpful, a data storage means was developed so that the processing of the invention reports could retrieve its data primarily or completely from web sources and databases.

This invention is a labor saving highly automated device that analyzes a single security at a time using a plurality of advisors' approaches, where the advisors have published and publicly disclosed their methodology in writing. There is no system in the market that evaluates multiple advisors and gives you their conclusion and reasoning behind their conclusion.

The Prior Art can be found in various shades. It could be in the lowest form a spreadsheet on any computer with complete formatting of the required columns by the user, sourcing of the input data and manual input of the data into the spreadsheet.

The second form of prior art is found in screens. Screens are based on various methodologies, which are multiple level formulas or a single level formula applied as a filter to the entire universe to select all the fields within the universe meeting the criteria. For example there are various screens on the internet which allow the user to select a desired name or a criteria, or a for a specified criteria input by the user searches the universe of the stocks in that system and gives a list of all the stocks meeting those criteria.

However both independently and collectively, these prior arts are not applicable to the present invention and the claims. The present invention does not require any formulation of the column by the users. It does not require a user to source any data. Further it does not require the user to input any data manually, or to interpret an advisor's methodology. The only input required by the user is the company name or the stock selection ID. Thus the entire process of reading and understanding any particular methodology is obviated, the formulation of a spreadsheet to allow the data input for calculation is eliminated and sourcing of data for input is not required. The invention allows daily updates of the required data for all the methodologies by an automated process. The invention is also set up to contain the methodologies of each of the investment advisors, which processes the data for each of the companies. All the user has to do is input the company name or security ID. Thus it is entirely different from the prior art.

To properly implement the invention, the inventor had to fairly crystallize the imprecise and incomplete rules cited by some of the advisors. A rule could be considered imprecise and incomplete for many reasons. In general, it was considered imprecise when one or more of the variables used for the rule was not clearly defined or not clearly explained. For example, an advisor may indicate that the rule required the use of the company's growth rate. The particular growth rate (earnings growth rate, revenue growth rate, sales growth rate, etc.) was not mentioned. Therefore, the inventor had to determine which growth rate to use. A rule was considered incomplete when the threshold values used for the rule were not clearly stated. For example, an advisor's rule may require that the PE ratio be "moderate". The advisor would leave a gray area surrounding the rule and the inventor had to attempt to "fuzzify" the rule and make it more black and white while still ensuring the appropriate conclusion. He accomplished this by listing out all of the criteria possibilities and determined if any of the following are conditions that were true.

1. There may have been other writings by the same author in other publications, which more precisely explained the variables. In addition to this, there may have been other sections in the same publication that aided in the clarification of the rule.
2. Of all the interpretations of the criteria, there are some that require data that is more easily and regularly available to private investors.
3. In the inventor's experience, will the interpretation yield to erroneous results.
4. There is a common accepted industry use of the ambiguous criteria that might be found in Financial Textbooks.
5. One or more of the other advisors were explicit in the use of the same variables.

Additionally, the inventor reviewed the many examples cited within the advisors' published methodologies. Through these examples, the inventor was able to better interpret ambiguous or incomplete criteria.

Upon completion of the interpretation of the many criteria that were required by the plurality of advisors, the inventor implemented a system that could automatically process the methodologies and produce the analysis results in the form of display or reports. He accomplished this through the use of a computer programming language, which enabled him to codify the advisors' methodologies. The codification used was in the form of Microsoft Access sub procedures that utilize a form of Visual Basic. These sub procedures apply If-Then-Else conditional statements, along with other conditional statements such as Visual Basic Case statements, to the required variables to determine if a security satisfies the required criteria of the advisors' methodologies. The conditional statements mentioned in the prior sentence represent the advisors' methodology criteria (referred to as Knowledge Bases in this invention patent). There are many programming languages that utilize the same conditional logic statements as does Visual Basic, which could have been used to codify the methodologies. Additionally, the conditional statements used could vary depending on the programming language or implementation of the codification of the methodologies as long as they resulted in the appropriate conclusions. Visual Basic was chosen because it was most easily accessible and use friendly for the codification.

The processing system does not attempt to imitate the workings of an expert system due to the fact that it is not structured to allow a user to enter their own additional rules to be used in the processing. In the end, the invention provides the user with a valuable research tool that displays the analysis of a selected security for a plurality of the most popular investment advisors' methodologies.

OBJECTS AND ADVANTAGES

Accordingly, the invention has objects and advantages by addressing several unrecognized problems, which are:

a. a reader of a book or article on a investment methodology has had no choice in the past for getting that methodology instantly applied to a security that he is currently interested in. The invention applies that methodology to a specific stock without the user having to define and codify the methodology, look for several sources of data required for the methodology, decide how to handle exceptions, and arrive at the conclusion with the supporting reasoning.

b. any investor wanting to analyze a stock in the past using 2 or more methodologies found it extremely time consuming and frustrating as several methodologies would require the entry of upwards of 60 variables.

c. not only is it time consuming to analyze just one security for a particular date in time, but it was impractical for any user on a daily basis to perform the methodology based on the latest data, and especially so if there were multiple securities he wanted to follow.

The present invention does not require any formulation of rules or coding by the users. It does not require a user to source any data. Further it does not require the user to input any data manually. The only input required by the user is the element (such as a company name) or the element identification (such as a ticker symbol.) The invention allows daily (or even more frequent) updates of the required data for all the methodologies by an automated process. And the output is one or more reports which provide a summary report card of the conclusions of the different published methodologies, and can optionally provide a detailed written analysis of the supporting reasons of each step of a methodology.

SUMMARY OF INVENTION

The invention utilizes a computer apparatus to automatically display a report containing the analysis results for a plurality of advisor methodologies for one specific security at a time.

DRAWING FIGURES AND DESCRIPTION OF PREFERRED EMBODIMENT

The basic claimed invention generates reports, independent of how the data is input into the system. One embodiment of the system also allows import, acceptance or capture of data into the system. The embodiment described here shows the generation of the invention reports through the processing of a plurality of Knowledge Bases.

BRIEF DESCRIPTION OF DRAWINGS

FIG. 1 illustrates the report that displays the guru report card (results) for a plurality of Knowledge Bases.

FIG. 7 illustrates the report that displays the descriptive guru analysis for a plurality of Knowledge Bases.

FIG. 9 illustrates the report that displays the descriptive ratio analysis for multiple ratios analyzed across a plurality of Knowledge Bases.

FIG. 10 illustrates the report that displays the guru report card and the descriptive guru analysis for a plurality of Knowledge Bases.

FIG. 11 illustrates the report that displays the ratio report card and descriptive ratio analysis for multiple ratios analyzed across a plurality of Knowledge Bases.

FIG. 12 illustrates the report that displays the guru report card for one Knowledge Base.

FIG. 13 illustrates the report that displays the descriptive guru analysis for one Knowledge Base.

FIG. 15 illustrates the report that displays the descriptive ratio analysis for one ratio analyzed across a plurality of Knowledge Bases.

FIG. 16 illustrates the report that displays the guru report card and the descriptive guru analysis for one Knowledge Base.

FIG. 17 illustrates the report that displays the ratio report card and descriptive ratio analysis for one ratio analyzed across a plurality of Knowledge Bases.

FIG. 18*a* illustrates a security selection enabling means whereby a user can select the security they wish to view the invention reports for.

FIG. 19 illustrates an advisor selection means whereby a user can select the Knowledge Base for which they want view the analysis of.

FIG. 20 illustrates a ratio selection means whereby a user can select the ratio for which they want to view an analysis of.

FIGS. 21*a*–21*d* illustrate the If-Then-Else rules of one of the Knowledge Bases utilized by the system to process the information and generate the results that will be displayed on the invention reports.

FIGS. 22*a–f* illustrate the If-Then-Else rules of one of the Knowledge Bases utilized by the system to process the information and generate the results that will be displayed on the invention reports.

FIG. 23 illustrates an element selection enabling means whereby a user or computer that feeds in elements one after another can select the element for which they wish to view the invention report on.

FIG. 25 is a schematic flowchart depicting the second stage of the processing of the advisor Knowledge Bases. This stage processes the methodologies and generates the results and descriptive analysis for the overall methodologies for a plurality of Knowledge.

FIG. 27 illustrates the report that displays the advisor report card (results) for a plurality of advisor Knowledge Bases.

FIG. 31 illustrates the report that displays the advisor report card for one advisor Knowledge Base.

FIG. 32 illustrates the report that displays the descriptive advisor analysis for one advisor Knowledge Base.

FIG. 35*a* illustrates the report that displays the evaluation criteria report card for a plurality of evaluation criteria for more than one element across a plurality of advisor Knowledge Bases.

FIG. 35*b* illustrates the report that displays the ratio report card for a plurality of ratios for more than one security across a plurality of investment advisor Knowledge Bases.

FIG. 38 illustrates the report that displays the summary conclusion along with the guru report card for a plurality of advisors.

DESCRIPTION OF A PREFERRED EMBODIMENT

Reports: Independent Reports and Final Reports

Figure 2:
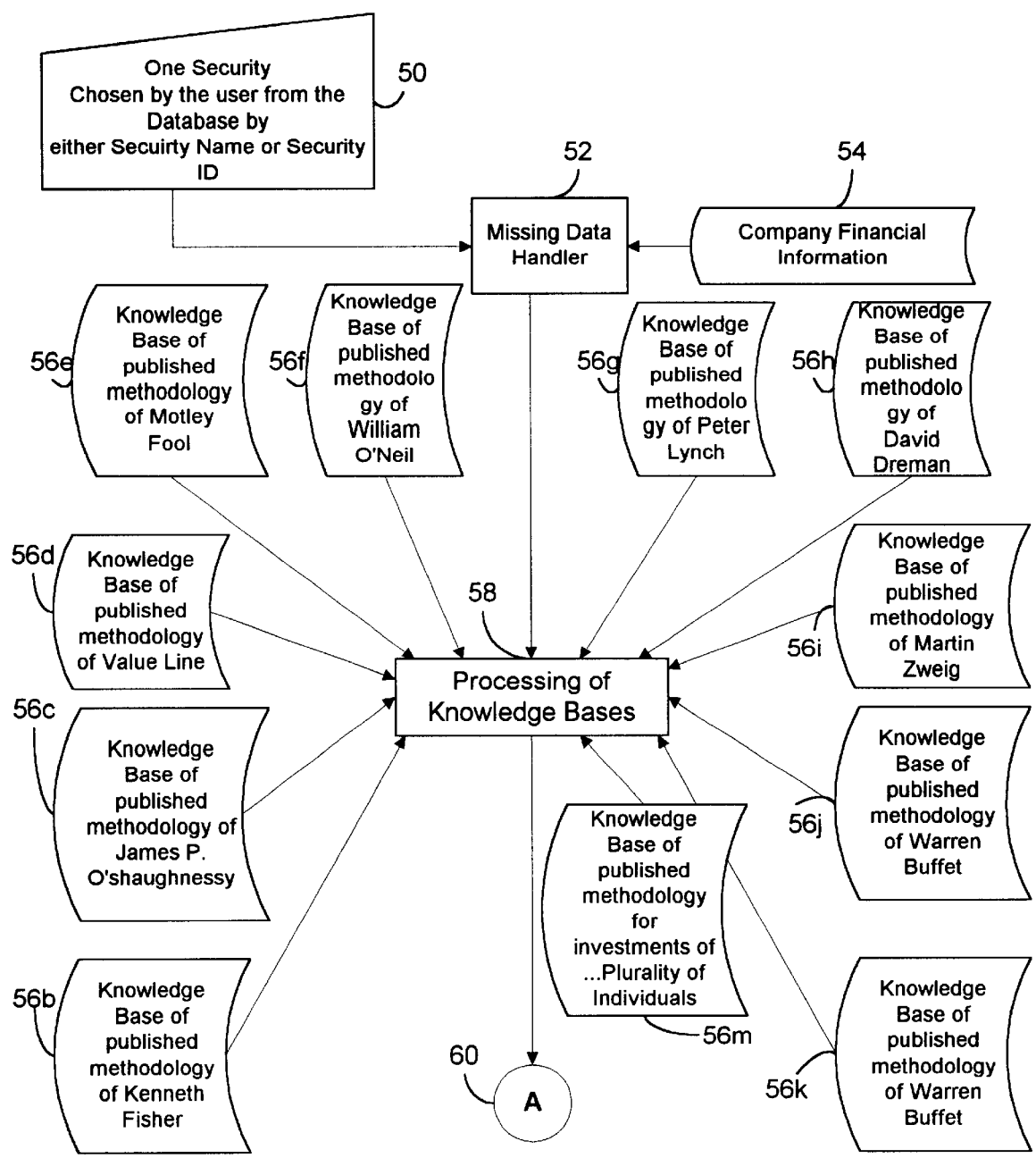
FIG. 2 is a schematic flowchart depicting the first stage of the processing of the plurality of Knowledge Bases. The stage begins with the user entering the security to be analyzed and the retrieval of the Knowledge Bases' methodologies.

The system outputs displays of several reports. Each report can be presented on its own and hence is independent of the other reports. Additionally, more than one of the reports could be displayed in any combination in the same report and result in a final report.

Independent Report of Guru Report Card

FIG. 1 illustrates the independent report that displays the guru report card. The guru report card includes the results of the overall methodologies of the plurality of Knowledge Bases available for analysis. The term Knowledge Base will be used throughout for ease of discussion. It refers to the codified methodologies of an investment advisor, which is used for the analysis of the security selected by the user. (see "Implementation of the Knowledge Bases" for a full description. It is located toward the end of the Specification section.)

The codification of the methodologies is implemented by utilizing the computer programming language Access Visual Basic. Alternative codification methods could be utilized to accomplish the creation of the Knowledge Bases. These Knowledge Bases include but should not be limited to Peter Lynch, The Motley Fool, Martin Zweig, Warren Buffet, Kenneth Fisher, James P. O'Shaughnessy, William O'Neil, Value Line, Benjamin Graham, Mary Buffet, Louis Navellier, Michael O'Higgins, Geraldine Weiss, Jim Collins, Morningstar, Jim Jubak, Stephen Leeb, Richard Band, Edward Jenson, David L. Brown, Christopher Graja, Fred Frailey, Richard Materi, Michael Gianturco, Thomas Phelps, Edwin Lefevre, Beardstown Ladies, Norman Fosback, Yale Hirsch, Martin Pring, Benjamin Zachs, Larry Williams, Ken Roberts, William Schmidt, W.H.Ford, Michael Murphy and Elaine Gazarelli.

The results depict the conclusion of the level of interest that the Knowledge Base would have in the security selected through the element selection enabling means. The level of interest is determined by the criteria specified in each Knowledge Base (a more detailed explanation on how the level of interest is determined can be found below in this section).

Box 100 in FIG. 1 depicts the security identification. The security identification in this case is the security ticker symbol. However, the invention allows for the display or selection of the security identification in multiple ways. It could be represented by just the company name and it could be represented by the company name along with the ticker symbol. The invention reports display just the ticker symbol in this case for ease of display.

Box 114 depicts the plurality of Knowledge Bases that were used to analyze the security selected by the user. The Knowledge Bases displayed can vary depending on the report design. In the case of the report displayed in FIG. 1, the Knowledge Bases include Value Line, Peter Lynch, Motley Fool, Benjamin Graham, William O'Neil, David Dreman, Martin Zweig, Kenneth Fisher, and James P. O'Shaughnessy. These Knowledge Bases include the results of the overall methodologies (which are displayed in FIG. 1), the descriptive analysis of the overall methodologies, the results of the analysis of individual ratios, and the descriptive analysis of the individual ratios. (The processing of these Knowledge Bases is described in detail in FIG. 2 through FIG. 3. The display of the individual report output from the information found in the Knowledge Bases are displayed in FIG. 1 and FIG. 7 through FIG. 15.) Box 104, box 106, box 108, and box 110 illustrates the columns that display the results, which in the current embodiment depicts the level of interest that each of the Knowledge Bases has in the security selected. The results can be broken down into four categories:

1. strong interest (box 104)
2. some interest (box 106)
3. no interest or would not invest (box 108)
4. selling interest (box 110)

The verbiage used in describing these categories was arbitrary. The invention allows for display of this final outcome in a multitude of ways. For example the phrase strong interest could have been stated "very attractive" or "buy." The invention reports display the results in this way to better help the user understand what the results represented.

The level of interest is determined by processing the Knowledge Bases' methodologies and tracking how many of the required criteria were satisfied in the case of the security selected. To receive strong interest, the Knowledge Bases' algorithms, in the invention, require that all of the criteria of the Knowledge Base be met. To receive some interest the Knowledge Bases' algorithms allow the security to fail some non-critical criteria of the Knowledge Base. A non-critical criterion was one that has been publicly disclosed by the advisor as not being as important as other required criteria. In order to fairly classify criteria to be non-critical, research had to be conducted on multiple writings and examples disclosed by each advisor. In other words, the research consisted of scouring through not just one source per Knowledge Base, but multiple sources. Only then was the research able to fully, and accurately, classify the criteria for the Knowledge Base.

To receive no interest or the "would not invest" level of interest, the algorithms of the Knowledge Bases' require that the company fail at least one critical criteria identified by a Knowledge Base or fail multiple non-critical criteria identified by a Knowledge Base. The actual determination of this level of interest does vary for each Knowledge Base and is in no way the only means in determining if the advisor would show no interest in the security selected by the user. The interpretation of the researcher could alter the implementation of the Knowledge Base slightly. However, if correctly done, any interpretation of the overall methodology would accurately reflect the Knowledge Base's criteria and final level of interest.

To receive a "sell" level of interest the algorithms of the Knowledge Bases' require that all of the sell methodology criteria be met. It is important to note that a sell methodology is not available for all of the Knowledge Bases, but where it is it has been researched and the invention allows for display of it. Box 102 depicts a result for one of the Knowledge Bases displayed on the report. This is determined through the processing of the required criteria in each of the Knowledge Base's methodology (as described above). Although the number of criteria required could vary depending on the Knowledge Base, a level of interest is always determined at the end of the processing prior to the generation of the report. Thus, the report in FIG. 1 gives the user an easy to read overview of the results for the overall methodologies of a plurality of Knowledge Bases. This report affords the user the opportunity to become more educated and more confident that the investment decision they are about to make is the right one. Alternative processing approaches could have been utilized but we have chosen what we feel to be a good way to generate the reports and display the results of the Knowledge Base methodologies. The schematic flowchart depicting that process is highlighted in the explanation of FIG. 1, FIG. 2, and FIG. 4 below.

Initial Processing of Investment Knowledqe Bases

Figure 3:
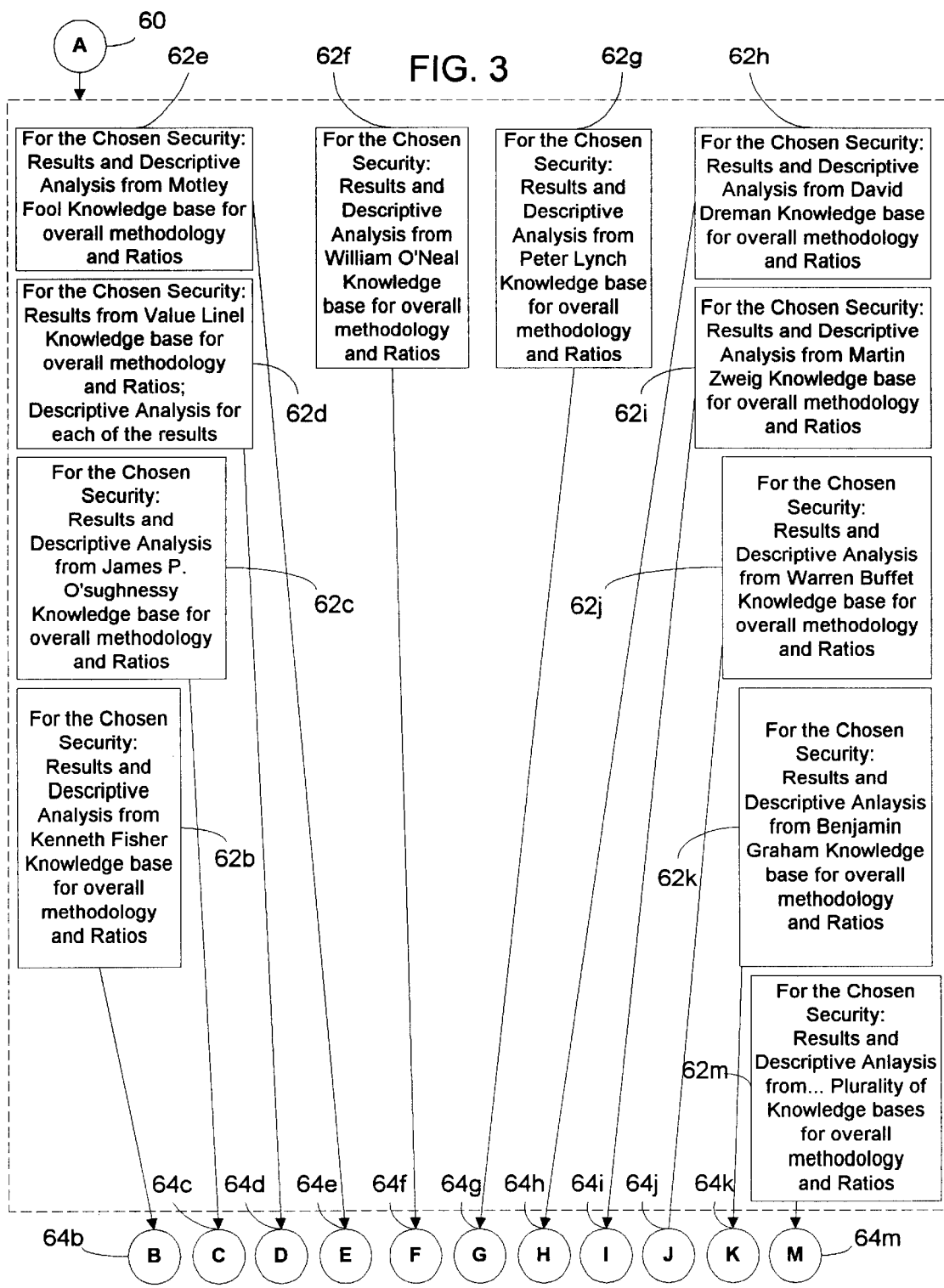
FIG. 3 is a schematic flowchart depicting the second stage of the processing of the Knowledge Bases. This stage processes the methodologies and generates the results and descriptive analysis for the overall methodologies for a plurality of Knowledge Bases and the individual ratio analysis.
Figure 18A:
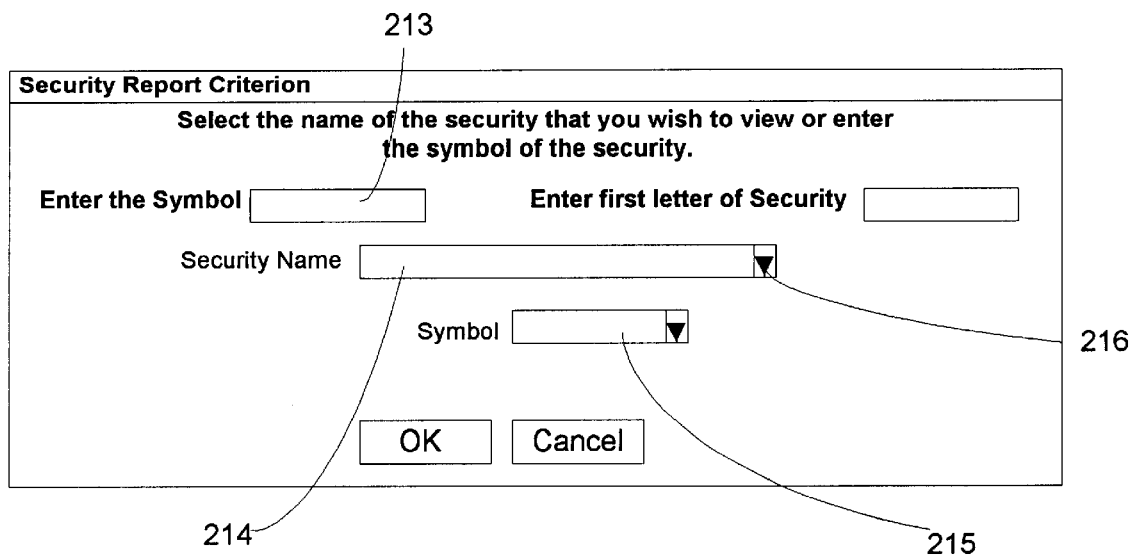

FIG. 2 and FIG. 3 are the first levels of processing that occur within the system. FIG. 2 is a schematic flowchart that depicts the initial processing of the functions of the Knowledge Bases upon selection of a security by the user. Box 50 illustrates the security selection means by which the user can select the security they are interested in and begin the processing of the functions found within the plurality of Knowledge Bases. A security selection means can be seen in FIG. 18a. The user can accomplish the selection of a security by using the techniques in the universe including:

1. entering the company name (FIG. 18a, Box 214)
2. entering the company ticker symbol (Box 213)

3. selecting the company name from a populated drop down box (Box 216)

4. selecting the company ticker symbol from a populated drop down box (Box 215)

The security selection means could be designed in a multitude of ways. The actual design of it is not critical to the generation of the invention reports. The process by which the user can select one security and have that security analyzed by the plurality of Knowledge Bases is.

After the selection of the security has been made, the system attempts to retrieve the required variables that will be used in the processing of the Knowledge Bases. Typically the number of required variables exceeds 60. Currently, the variables are stored in a Microsoft Access database (box 54). The information stored within the Access database is the fundamental numbers and fundamental data of the companies followed and the pricing information for the companies followed. This data is compiled from third party sources that include Omega, Dial Data, and Market Guide. The type of storage means is not critical to the processing of the Knowledge Bases. The data could have been stored in numerous data storage means such as a simple text file, Oracle database, Sequel Server database, and Microsoft Excel spreadsheet. Additionally, the source of the data is not critical to the processing of the Knowledge Bases. There are numerous alternative sources for the fundamental information and pricing information.

To accomplish the retrieval of information, the system first checks (box 52) to see if the security selected is part of the universe of securities followed. If the security is not part of the universe of securities followed, the system alerts the user that the security they have chosen can not be analyzed. This is quite a rare occurrence due to the fact that we cover over 15,000 securities. However, if this does occur the user is notified. Once the system has confirmed that the security selected is present in the universe followed, it checks to see (box 52) that all of the variables for the security selected are present in the data storage means. To achieve this, the system looks to the tables within the Access database and determines if the values in the fields required are present. It accomplishes this utilizing the Dlookup function found within Access Visual Basic. In this processing step, the Dlookup function is capable of looking into an Access table and determining if a value is present for a specific ticker symbol or company name. It is important to note that the process by which information is retrieved from the Access database is not critical to the processing. Each data storage means utilizes its own inherent retrieval means.

If all of the variables are present, the system retrieves the information and continues the processing. If there are variables missing the system attempts to replace the required variables with secondary, but just as relevant, variables. In other words, it does not simply accept that the variable is missing and prevent the security from being analyzed across the plurality of Knowledge Bases. In essence, it does what a human analyst would do and replaces the missing variable with a reliable substitution. For example, while one might expect to have the last reported quarterly sales for every company, there is at least one circumstance where one will not have the variable information available. The company could be a foreign company whose ADR is listed on the stock exchange, but as is the case with most foreign companies, they may not report quarterly results. Hence, many commercially available databases either leave this field blank or substitute the numeric value with a text value such as NA (Not Available).

As stated before, under such circumstance the system then follows the procedure that many human analysts would perform, it tries to find a substitute data variable or the same data variable for a prior period. In addition to this variable substitution, the system, as part of the processing, will set a flag that indicates that a substitution did occur. A flag is an identifier that is used to tell the processing system that a variable was not available and a replacement was found and used. This will allow the system to alert the user that the substitution has occurred and also allow the system to adjust the processing of the Knowledge Bases' methodologies if required. Regardless if a substitution was required, the system begins the processing of the Knowledge Bases (box 58). It conducts this processing through the retrieval of the functions found within the plurality of Knowledge Bases.

Box 56*b*, box 56*c*, box 56*d*, box 56*e*, box 56*f*, box 56*g*, box 56*h*, box 56*i*, box 56*j* and box 56*k* illustrate 10 of the Knowledge Bases that will be processed and available for analysis by the user. Box 56*m* illustrates the remaining plurality of Knowledge Bases available for processing which in turn will be available for analysis by the user. Due to the processing system utilized to process the information and generate the invention reports, each Knowledge Base consists of Access queries and Visual Basic modules that contain the Visual Basic functions that are used for the processing of the methodologies of the advisors. Within the Visual Basic functions are a series of If-Then statements that are used to simulate the analysis provided by the Knowledge Bases' methodologies. The If-Then statements could also be referred to as the required criteria of the Knowledge Bases' methodologies. If a different processing system were utilized, the means by which the Knowledge Bases' methodologies were processed would be different. In other words, the structure utilized by the current system to process the methodologies is not critical. It is simply inherent to the structure chosen. The logical analysis used to generate the results from the plurality of Knowledge Bases could be in multiple alternative forms such as an expert system and an Excel spreadsheet (see "Origin of the Logical Analysis" at the end of the Specification Section for more detail). Box 60 illustrates the connector that allows the flowchart to continue to FIG. 1. The processing of the Knowledge Bases is uninterrupted when moving from FIG. 1 to FIG. 2.

Generation of Results and Descriptive Analysis of Investment Knowledge Bases

FIG 3 is a continuation of the schematic flowchart that began in FIG. 2. It illustrates the generation of the final results from the processing of the Knowledge Bases. Box 60 illustrates the connector that allows the schematic flowchart to continue from FIG. 2 to FIG. 3. Box 62*b*, box 62*c*, box 62*d*, box 62*e*, box 62*f*, box 62*g*, box 62*h*, box 62*i*, box 62*j* and box 62*k* illustrate the final processing step of the Knowledge Bases of 10 advisors. These advisors include Kenneth Fisher, James P. O'Shaughnessy, Value Line, The Motley Fool, William O'Neil, Peter Lynch, David Dreman, Martin Zweig, Warren Buffet, and Benjamin Graham. Box 62m illustrates the final processing step of the additional plurality of Knowledge Bases. The final processing step generates the results and the descriptive analysis of those results for the plurality of Knowledge Bases. It does this both for the advisors' overall methodologies as well as individual ratios. The four resultant sets and the information found within those sets is as follows:

1. Results for the Knowledge Bases' overall methodologies—illustrates what level of interest each advisor has in the security selected by the user.

2. Descriptive analysis of the results for the Knowledge Bases' overall methodologies—explains in detail why the advisor has the level of interest illustrated in the results.

It explains each criteria that the advisor requires for their methodology in the following three ways:
  a. what value the advisor is requiring for the variable highlighted
  b. did the security's value meet the requirement or not
  c. what is the implication if the security did or did not meet the requirement of the advisor
3. Results for the analysis of a plurality of ratios—illustrates if the ratio passes or fails the required criteria of the plurality of Knowledge Bases
4. Descriptive analysis of the results for the multiple ratios for a plurality of Knowledge Bases—explains in detail why the ratio has either passed or failed the required criteria of the plurality of Knowledge Bases. It explains each criteria in the same way as described in number 2 above.

In general, the results of the overall methodologies give the user the ability to quickly view the level of interest of each of the Knowledge Bases presented. The descriptive analysis explains in detail the reasoning behind the level of interest, based on the Knowledge Bases' methodologies. The results for the ratio analysis affords the user an easy to read matrix that illustrates if the ratio of interest has passed or failed the requirements of a plurality of advisors. The descriptive analysis of the results for the individual ratios illustrates in detail why the ratio either passed or failed the requirements of a plurality of advisors' methodologies.

It is important to note that the ratio analysis can also be referred to as the analysis of the evaluation criteria required by the methodologies. In the investment world, these evaluation criteria are typically numerical in nature and hence the use of the terminology ratio analysis. However, the evaluation criteria could be qualitative in nature also. For example, a methodology could require that the company be involved in a turnaround situation or that the industry of the company be technology. This evaluation criteria is purely qualitative but would still be considered part of the universe of evaluation criteria. Therefore, the terminology, ratio analysis, refers to the evaluation criteria of the methodologies and was used because of the vast number of numerical ratios typically used in these methodologies.

The results and descriptive analysis of the Knowledge Bases are generated using Then statements as described in resultant set #2, above. Two examples of such If-Then statements found within a Knowledge Base can be seen at the end of the specification section in FIG. 21 and FIG. 22. These two figures illustrate the complex processing that occurs in order to produce the results found within the results and descriptive analysis of the overall methodologies and individual ratios.

However, as stated before, this processing could occur in a number of ways other than that highlighted in FIG. 21 and FIG. 22. The Knowledge Bases are being processed this way in both those figures due to the processing means available in the Access database environment.

Upon completion of the generation of the results and descriptive analysis, the information is processed one last time in order to prepare the information for final display on the invention reports. Box 64*b*, 64*c*, 64*d*, 64*e*, 64*f*, 64*g*, 64*h*, 64*i*, 64*j*, 64*k*, and 64*m* illustrate the connectors used to continue the processing and flow of information from FIG. 1 to FIG. 2.

Figure 4:
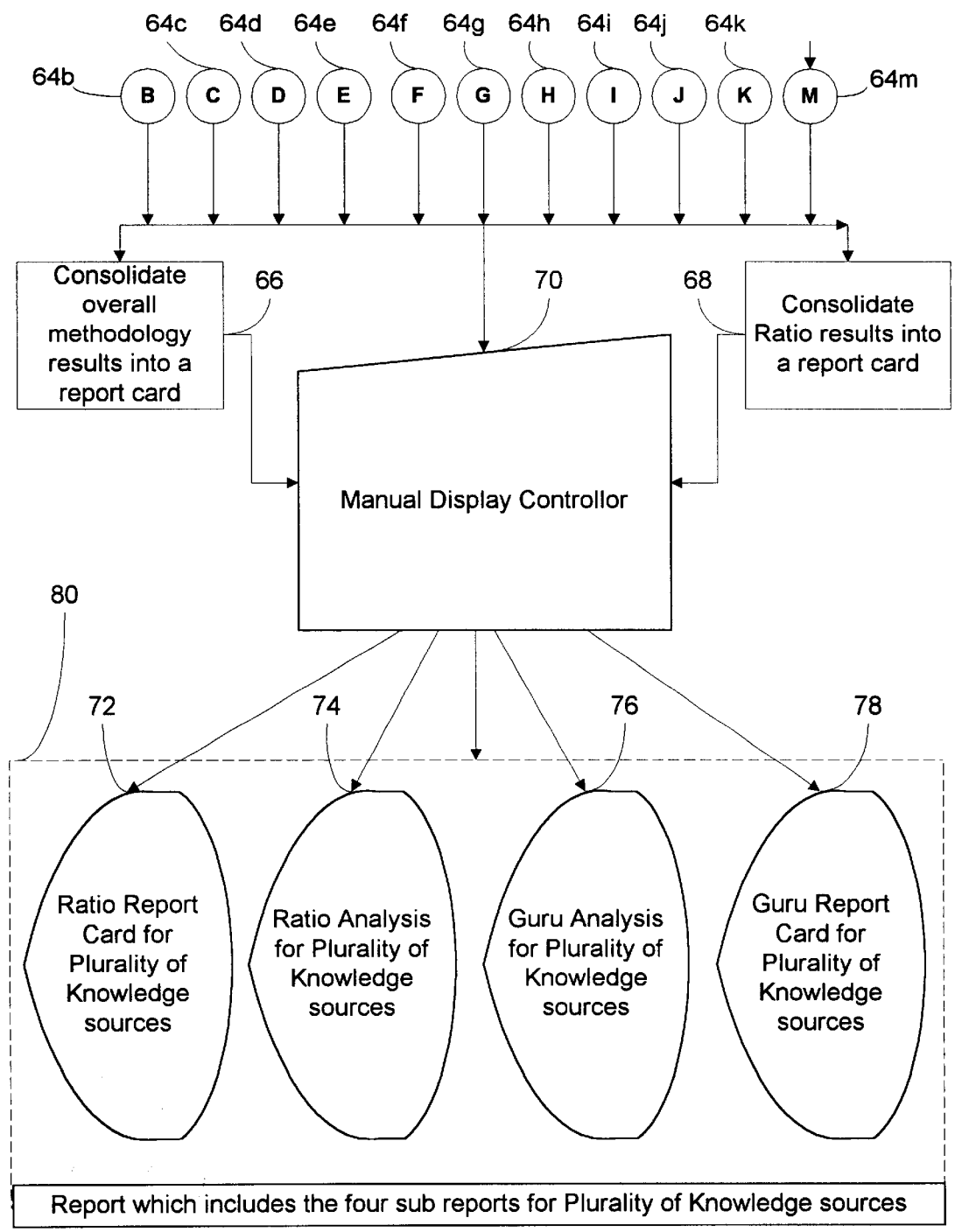
FIG. 4 is a schematic flowchart depicting the final stage of processing. This stage prepares the information for final display on the invention reports and generates the report based on the report design. The reports include the ratio report card, descriptive ratio analysis, guru report card, and the descriptive guru analysis all for a plurality of ratios and Knowledge Bases.
Figure 5:
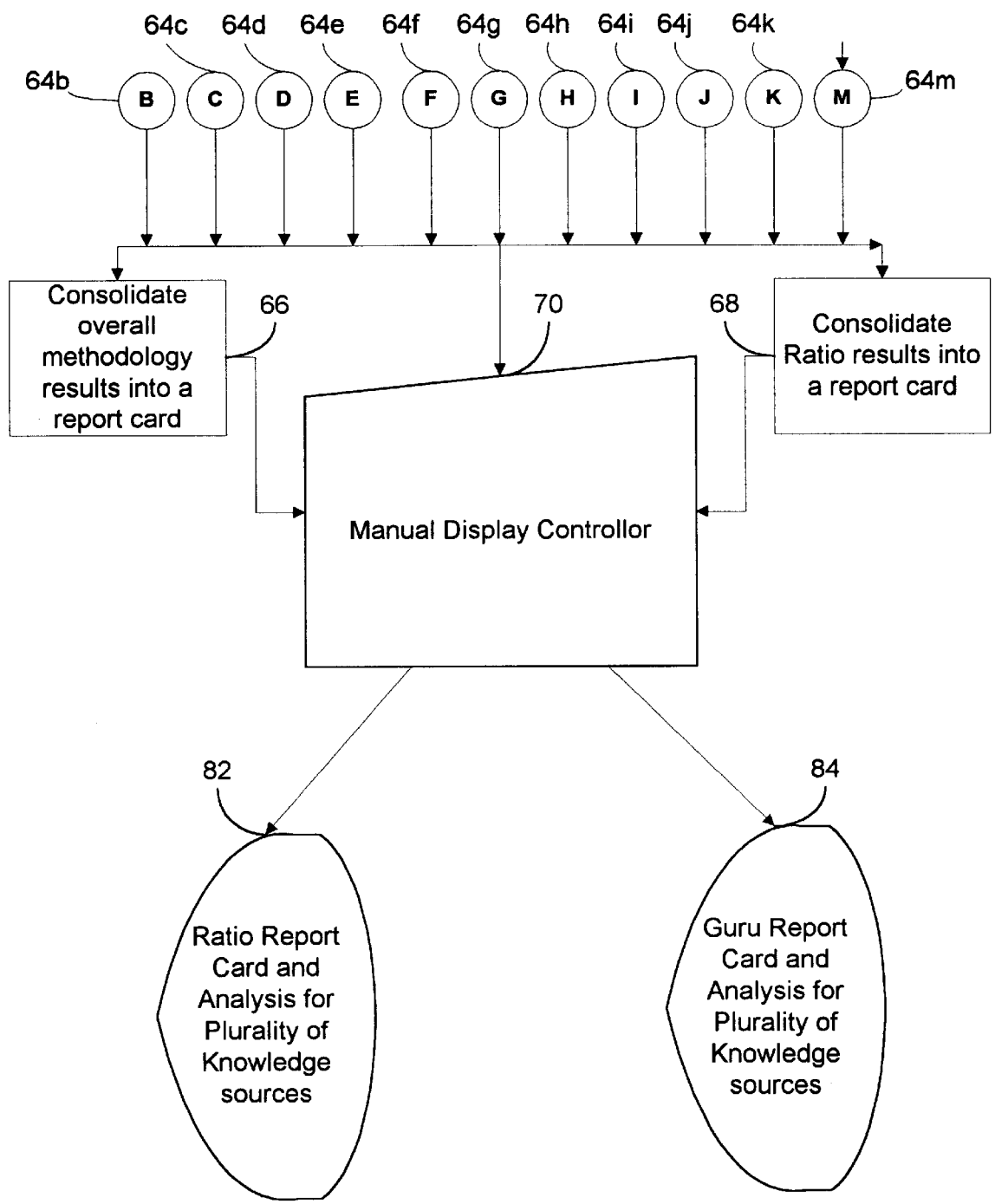
FIG. 5 is a schematic flowchart depicting the final stage of processing. This stage prepares the information for final display on the invention reports and generates the report based on the report design. The reports include the ratio report card along with a descriptive ratio analysis, guru report card along with a descriptive guru analysis each for a plurality of ratios and Knowledge Bases.

Generation of Independent Reports for Multiple Guru Analysis, Multiple Guru Report Card, Multiple Ratio Report Card, and Multiple Ratio Analysis Box 64*b*, 64*c*, 64*d*, 64*e*, 64*f*, 64*g*, 64*h*, 64*i*, 64*j*, 64*k*, and 64*m* illustrate the connectors used to continue the processing and flow of information from FIG. 3 to FIG. 4. Each of the connectors represents the results and descriptive analysis of both the overall methodologies and individual ratios for the plurality of Knowledge Bases. Box 68 illustrates the processing step that consolidates the ratio results of the plurality of Knowledge Bases and prepares them for display in an easy to read format. It achieves this through the use of an Access function. The function combines the output string variables generated by the process in FIG. 3 into a predetermined format. In this case, the invention report displays this information in a matrix, which consists of the advisor's name along the Y-axis and the ratio along the X-axis. However, the number of formats that the results for the ratios can be displayed in is endless. The ratio report card that the invention reports display is easy to read and useful for a quick reference.

For each ratio listed, there will be a result displayed for every advisor whose Knowledge Base analyzes the ratio. For example, for every advisor listed, the user will see if the PE ratio has passed or failed their methodology if they have a requirement for it. Not every advisor analyzes the PE ratio, which means that not every advisor will have a result for the PE ratio. For the advisors who do analyze the PE ratio, there will be a result. Box 66 illustrates the processing step that consolidates the overall methodology results of the plurality of Knowledge Bases and prepares the information for display in an easy to read format. In this case, the invention reports also display the information in a matrix format, which consists of the advisor's name along the Y-axis and the level of interest across the X-axis. However, as with the individual ratios, the number of formats that the results for the overall methodologies can be displayed in are endless.

The guru report card that the invention reports display is easy to read and useful for a quick reference. For each advisor listed, there will be a result displayed indicating what level of interest each advisor has in the security selected based on the Knowledge Base of the advisor. For example, for every advisor listed, the user will see if the advisor has a strong interest in the security selected or no interest. It will also indicate if the advisor has some interest in the security. The some interest level of interest allows the system to indicate that the security being researched falls into a gray area of the Knowledge Bases' methodology. In other words, the security and its required variables neither clearly pass nor clearly fail the advisor's methodology.

Box 70 illustrates the manual display controller. The manual display controller stores the results as generated by the steps highlighted in FIG. 3, box 66, and box 68. In general, it stores the consolidated results and the descriptive analysis of the results in a format that allows the information to be displayed on the reports in the format predefined by the report design.

Box 78 illustrates the generation of the guru report card for a plurality of Knowledge Bases. The guru report card is the results of the overall methodologies of the Knowledge Bases. The resulting independent report can be seen in FIG. 1. A detailed breakdown of the report seen in FIG. 1 can be found at the beginning of the specification under the heading Independent Report of Guru Report Card.

Box 76 illustrates the generation of the report that displays the descriptive analysis for the overall methodologies of a plurality of Knowledge Bases. The descriptive analysis provides the reasoning why the advisors' Knowledge Bases have the level of interest in the security that they do. The resulting report can be seen in FIG. 7.

Independent Report of Multiple Guru Analysis

As stated above, FIG. 7 depicts the descriptive guru analysis of the overall methodologies for a plurality of Knowledge Bases. Box 140 depicts the name of the advisor whose Knowledge Base methodology is being displayed. The plurality of Knowledge Base methodologies could come from the universe consisting of Peter Lynch, David Dreman, Martin Zweig, William O'Neil, Benjamin Graham, James P. O'Shaughnessy, Motley Fool, Value Line, Warren Buffet, Mary Buffet, Louis Navellier, Michael O'Higgins, Geraldine Weiss, Jim Collins, Morningstar, Jim Jubak, Stephen Leeb, Richard Band, Edward Jenson, David L. Brown, Christopher Graja, Fred Frailey, Richard Materi, Michael Gianturco, Thomas Phelps, Edwin Lefevre, Beardstown Ladies, Norman Fosback, Yale Hirsch, Martin Pring, Benjamin Zachs, Larry Williams, Ken Roberts, William Schmidt, W. H. Ford, Elaine Gazarelli, Michael Murphy and Kenneth Fisher. The actual plurality of Knowledge Bases displayed depends on the report design, which could vary depending on the desires of the report designer.

Box 142 in FIG. 7 depicts the security identification. In this report the security identification is displayed in the form of the company ticker symbol. However, it could be displayed in the form of the just the company name and the company name and ticker symbol combined. Box 144 depicts the descriptive analysis of the Knowledge Bases' methodologies applied to the specific security at that point in time. The descriptive analysis includes the reasoning as to why the security has received the level of interest that is indicated in the result for the Knowledge Base. In other words, the descriptive analysis shows, in detail, the required criteria of the Knowledge Base displayed in the report (in the same manner as described in FIG. 1). The main components of the descriptive analysis are as follows:

1. variable being analyzed (box 148)
2. value of the variable being analyzed (box 150)
3. value of the required threshold of the Knowledge Base (box 152)
4. result of the individual variable analysis according to the requirement as determined from the Knowledge Base (box 154)

The descriptive analysis allows the user to better educate themselves as to why the Knowledge. Base requires the ratio as part of the methodology and what value the Knowledge Base is looking for. This saves the user a tremendous amount of time due to the fact that they do not have to read the numerous public documents written by the advisor they are interested in and interpret the requirements. The work is done for them in the descriptive analysis.

Box 146 depicts the level of interest of the Knowledge Base, which is a direct result of the required criteria used in the methodology. The level of interest will vary depending on the Knowledge Base and will inform the user as to the attractiveness of the security selected according to their favorite Knowledge Bases. Overall, this report is an extremely informative tool that guides the user through the reasoning and results of a plurality of Knowledge Base methodologies.

Box 72 in FIG. 4 illustrates the generation of the ratio report card for multiple ratios across a plurality of Knowledge Bases. The ratio report card is the results of the Knowledge Bases for a plurality of individual ratios. The resulting report can be seen in FIG. 8.

Independent Report of Multiple Ratio Report Card

Figure 8:
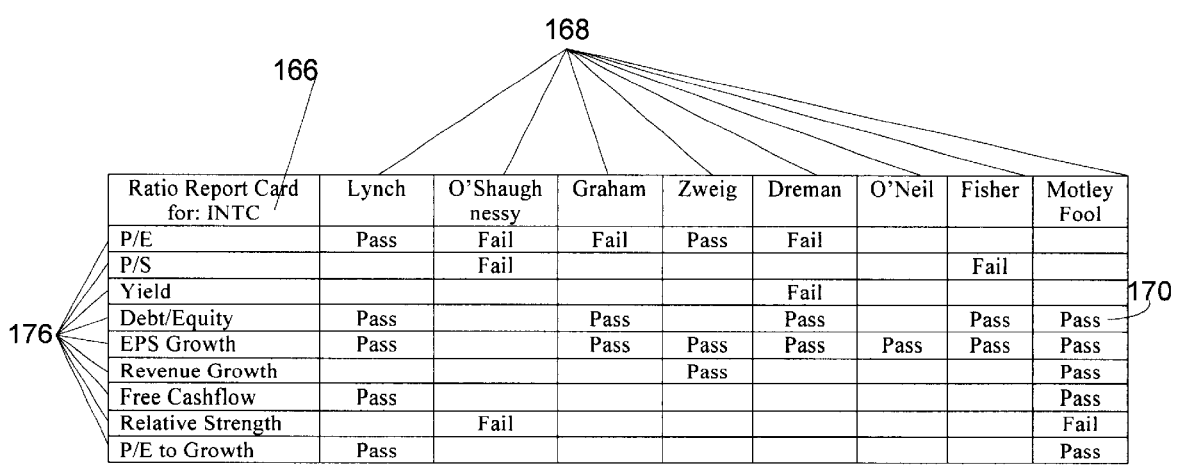
FIG. 8 illustrates the report that displays the ratio report card for multiple ratios analyzed across a plurality of Knowledge Bases.

As stated above, FIG. 8 illustrates the resulting report that depicts the ratio report card of multiple ratios across a plurality of Knowledge Bases. Box 166 depicts the security identification that the ratio report card was generated for.

Box 176 depicts the multiple ratios that are analyzed across the plurality of Knowledge Bases. There could be numerous other ratios listed depending on the Knowledge Bases included and the report design. The ratios that could be included in the report depending on the design can be found in the examples consisting of the Price, Earnings, Growth Rate, Earnings Growth Rate, Sales growth rate, Sales, Debt, Debt/Equity, Free Cash flow, Revenues, Cash, Relative strength, P/E ratio, P/S ratio, P/CF, price to earnings growth rate, Number of Outstanding Shares, Yield, and relative strength. The ratios highlighted in FIG. 8 were selected for display because they are the most popular ratios which allows the user to more easily identify and understand the ratios within the ratio report card.

Box 168 depicts the plurality of Knowledge Bases used to analyze the ratios. There could be numerous other Knowledge Bases listed depending on the design of the report (a list of the available Knowledge Bases can be found in FIG. 7). Box 170 depicts the result of a selected ratio for the Knowledge Base Motley Fool for the ratio Debt/Equity. The result can be either one of the following:

1. Pass—indicates the ratio satisfied the requirement for the advisor's Knowledge Base
2. Fail—indicates the ratio did not satisfy the requirement for the advisor's Knowledge Base
3. Hold—indicates the ratio did not completely fail the requirement for the advisor's Knowledge Base but it did not completely pass the requirement. For example, this would be used in the case where an advisor has publicly stated that it is O.K. for a variable to be at the level it is at but they would not pass the ratio with "flying colors."
4. Null—would not have a result at all in the space provided. This would indicate that the Knowledge Base did not have an analysis for the ratio available in the publicly disclosed documents researched.

This report is useful for the user who would like to quickly see how their favorite ratios rate a particular security when passed through some very popular Knowledge Bases. It provides a resource that is available nowhere else and is easy to use when interested in specific ratios for specific Knowledge Bases.

Box 74 illustrates the generation of the descriptive ratio analysis for multiple ratios across a plurality of Knowledge Bases. The descriptive ratio analysis provides the reasoning as to why the ratios listed in the ratio report card received the results listed based on the requirements of the Knowledge Bases. The resulting report can be seen in FIG. 9.

Independent Report of Multiple Ratio Analysis

As stated above, FIG. 9 illustrates the resulting report that depicts the descriptive ratio analysis of multiple ratios across a plurality of Knowledge Bases. Box 194 depicts the ratio name that is being analyzed across the plurality of Knowledge Bases. These ratios come from the universe as listed in FIG. 8. The inventor has chosen these ratios due to the fact that they are the most followed by the investment world and most useful in helping a user make a more educated investment decision.

Box 198 depicts the column that will identify the name of the advisor whose Knowledge Base is used for the analysis of the ratio listed. The names included will vary depending on the ratio being analyzed. For example, for some of the more popular ratios (i.e.—PE ratio and EPS growth), there will be numerous advisors whose Knowledge Base will be applied to the analysis of the ratio listed. In other ratio cases (such as P/S ratio), there will be only two advisors whose Knowledge Base will be applied to the analysis of the ratio listed. In either case, the advisors' name will appear in the column depicted by box 198. Box 200 depicts the actual name of the plurality of Knowledge Bases that are used to analyze the multiple ratios. For each ratio the Knowledge Bases used will vary due to the fact that each Knowledge Base analyzes different ratios. For example, David Dreman's Knowledge Base does not provide an analysis for the PS ratio but does provide an analysis for the Yield ratio. Hence, the user would see a descriptive analysis from David Dreman's Knowledge Base for the Yield ratio but not for the PS ratio.

Box 196 depicts the column where the descriptive analysis of each Knowledge Base will be displayed. As stated in box 198, the number of descriptive analyses displayed will vary according to the number of Knowledge Bases that analyze the ratio listed. Box 202 depicts the actual descriptive analysis of the plurality of Knowledge Bases for the ratio highlighted. This will describe the reasoning as to why the ratio is considered favorable or unfavorable according to the Knowledge Bases providing analysis of the ratio listed (in the manner described in FIG. 1).

Box 201 in FIG. 9 shows an optional column whose purpose is to illustrate to the user the typical holding period of the advisor's methodology. (I.e.—Short-term, Long-term, etc . . . ) This report allows for a quick and easy to read reference as to why a ratio either passes or does not pass the required criteria for a plurality of the most popular Knowledge Bases. It provides a tool that gives the user more confidence in the investment decision they are going to make regarding the security they have selected without having to read and codify every Knowledge Base methodology they are interested in. In short, all the work regarding the in depth ratio analysis is done for them and presented in such a way that makes it readable and understandable.

Generation of Reports for Multiple Guru Report Card alone with Multiple Guru Analysis and Multiple Ratio Report Card alone with Multiple Ratio Analysis FIG. 50, boxes 64b, 64c, 64d, 64e, 64f, 64g, 64h, 64i, 64j, 64k, and 64m illustrate the connectors used to continue the processing and flow of information from FIG. 3 to FIG. 4. Each of the connectors represents the results and descriptive analysis of both the overall methodologies and individual ratios for the plurality of Knowledge Bases. Box 68 illustrates the processing step that consolidates the ratio results of the plurality of Knowledge Bases and prepares them for display in an easy to read format (in the same manner as in FIG. 4). Box 66 illustrates the processing step that consolidates the overall methodology results of the plurality of Knowledge Bases and prepares them for display in an easy to read format (in the same manner as in FIG. 4). The manual display controller step takes (either from RAM memory or disk storage) the results as generated by the steps described in FIG. 4, the steps described in box 66, and the steps described in box 68, and based on the user's choice, generates the selected report.

Box 84 illustrates the generation of the report that displays the descriptive analysis for the overall methodologies and the guru report card of a plurality of Knowledge Bases. The resulting report can be seen in FIG. 10.

Report of Multiple Guru Report Card along with Multiple Guru Analysis

As stated above, FIG. 10 depicts the descriptive guru analysis of the overall methodologies and the results (guru report card) for a plurality of Knowledge Bases. Box 140 depicts the name of the advisor whose Knowledge Base methodology is being displayed (in the same manner as in FIG. 7).

Box 142 depicts the security identification (in the same manner as in FIG. 7). Box 144 depicts the descriptive analysis of the Knowledge Bases' methodologies (in the same manner as in FIG. 7). The descriptive analysis includes the reasoning as to why the security has received the level of interest as indicated in the result for the Knowledge Base. In other words, the descriptive analysis shows, in detail, the required criteria of each Knowledge Base displayed in the report (in the same manner as described in FIG. 7). The main components of the descriptive analysis are as follows:

1. variable being analyzed (box 148)
2. value of the variable being analyzed (box 150)
3. value of the required threshold of the Knowledge Base (box 152)
4. result of the individual variable analysis according to the requirement as determined from the Knowledge Base (box 154)

Box 146 depicts the level of interest of the Knowledge Base, which is a direct result of the required criteria used in the methodology (in the same manner as in FIG. 7). Box 100 depicts the security identification (in the same manner as in FIG. 1). Box 114 depicts the plurality of Knowledge Bases that were used to analyze the security selected by the user (in the same manner as in FIG. 1). Box 104, box 106, box 108, and box 110 depict the level of interest that the plurality of Knowledge Bases have in the security selected (in the same manner as in FIG. 1). The level of interest of the overall methodology that was used to analyze the security can be broken down into four categories:

1. strong interest (box 104)
2. some interest (box 106)
3. no interest or would not invest (box 108)
4. selling interest (box 110)

Box 102 depicts a result for one of the Knowledge Bases displayed on the report (in the same manner as in FIG. 1).

Overall, this report is an extremely informative tool that guides the user through the reasoning and results of a plurality of Knowledge Base methodologies. It allows the user to quickly see the level of interest of a plurality of Knowledge Bases along with the descriptive reasons as to why the Knowledge Base had that level of interest.

Box 72 in FIG. 4 illustrates the generation of the ratio report card for multiple ratios along with the descriptive analysis of the individual ratio analysis across a plurality of Knowledge Bases. The resulting report can be seen in FIG. 11.

Report of Multiple Ratio Report Card alone with Multiple Ratio Analysis

As stated above, FIG. 11 illustrates the resulting report that depicts the ratio report card of multiple ratios and the descriptive analysis of the individual ratio analysis across a plurality of Knowledge Bases. Box 166 depicts the security identification that the ratio report card was generated for (in the same manner as in FIG. 8).

Box 176 depicts the multiple ratios that are analyzed across the plurality of Knowledge Bases (in the same manner as in FIG. 8). Box 168 depicts the plurality of Knowledge Bases used to analyze the ratios (in the same manner as in FIG. 8). Box 170 depicts the result of a selected ratio for a Knowledge Base (in the same manner as in FIG. 8). Box 194 depicts the ratio name that is being analyzed across the plurality of Knowledge Bases (in the same manner as in FIG. 9). Box 198 depicts the column that will identify the name of the advisor whose Knowledge Base is used for the analysis of the ratio listed (in the same manner as in FIG. 9). Box 200 depicts the name of the plurality of Knowledge Bases that are used to analyze the multiple ratios (in the same manner as FIG. 9). Box 202 depicts the actual descriptive analysis of the plurality of Knowledge Bases for the ratio highlighted (in the same manner as in FIG. 9).

This report provides the user with the ratio report card (results) which is a quick and easy to read reference to determine whether or not a ratio passes or does not pass the required criteria for a plurality of the most popular Knowledge Bases along with the detailed reasoning as to why it passed or did not pass. In the end, it provides a tool that gives the user more confidence in the investment decision they are going to make regarding the security they have selected without having to read and codify every Knowledge Base methodology they are interested in. In short, all the work regarding the in depth ratio analysis is done for them and presented in such a way that makes it readable and understandable.

Generation of the Independent Reports for One Guru Report Card. One Guru Analysis, One Ratio Report Card, and One Ratio Analysis FIG. 6a, boxes 64b, 64c, 64d, 64e, 64f, 64g, 64h, 64i, 64j, 64k, and 64m illustrate the connectors used to continue the processing and flow of information from FIG. 3 to FIG. 6a. Each of the connectors represents the results and descriptive analysis of both the overall methodologies and individual ratios for the plurality of Knowledge Bases. Box 68 illustrates the processing step that consolidates the ratio results of the plurality of Knowledge Bases and prepares them for display in an easy to read format (in the same manner as in FIG. 4). Box 66 illustrates the processing step that consolidates the overall methodology results of the plurality of Knowledge Bases and prepares them for display in an easy to read format (in the same manner as in FIG. 4). Box 70 illustrates the manual display controller. The manual display controller stores the results as generated by the steps highlighted in FIG. 4, the steps highlighted by box 66, and the steps highlighted by the steps in box 68 (in the same manner as in FIG. 4).

Figure 6A:
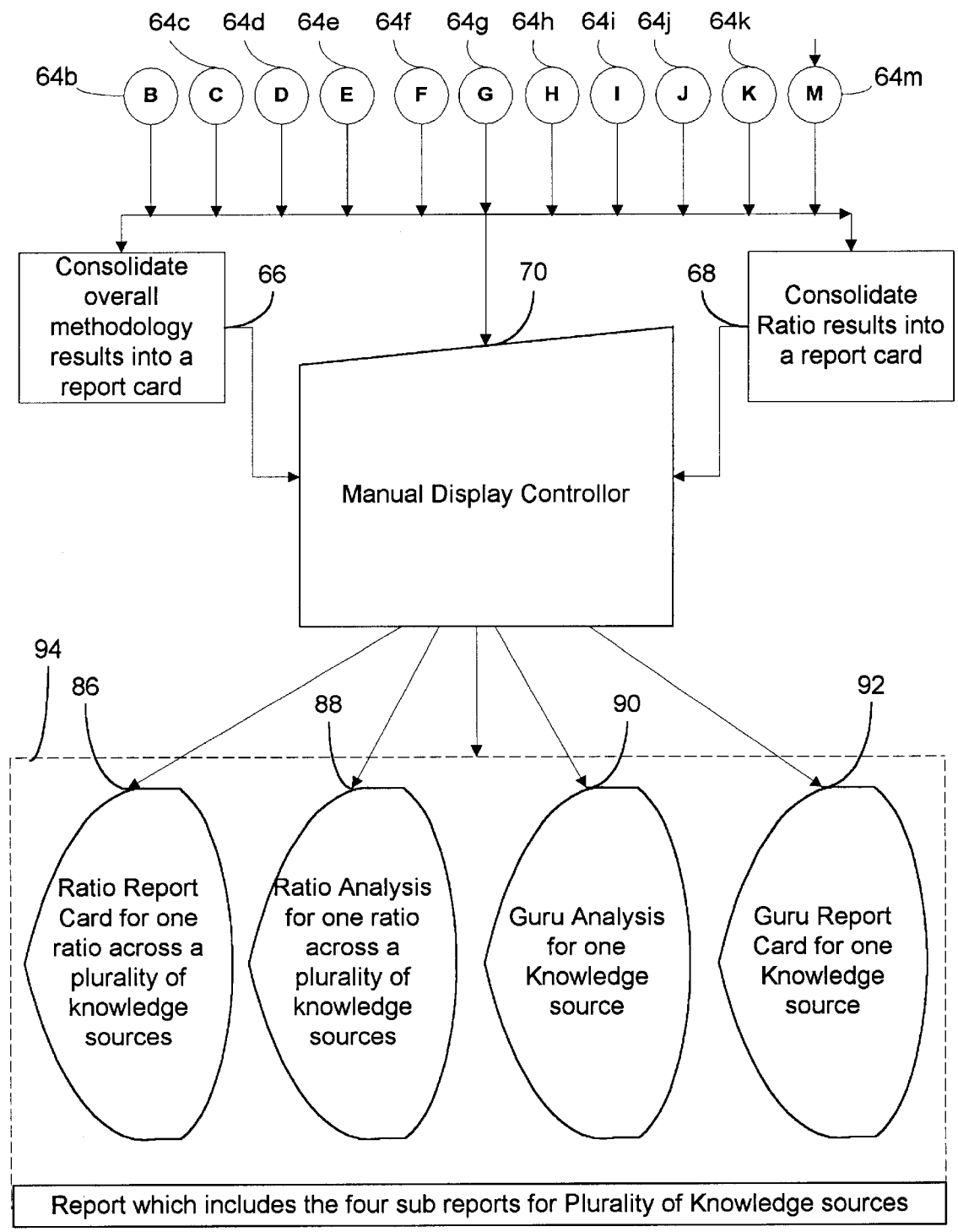
FIG. 6a is a schematic flowchart depicting the final stage of processing. This stage prepares the information for final display on the invention reports and generates the report based on the report design. The reports include the ratio report card, descriptive ratio analysis, guru report card, and the descriptive guru analysis all for either one ratio or one Knowledge Base.

Box 92 in FIG. 6a illustrates the generation of the guru report card for one Knowledge Base. In this report, the guru report card is the results of the overall methodology of one Knowledge Base. The resulting report can be seen in FIG. 12.

Independent Report of One Guru Report Card

Figure 12:
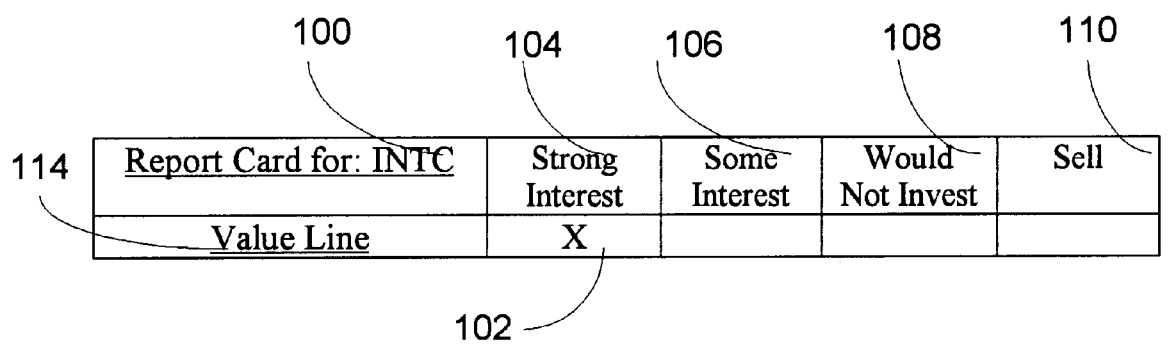

As stated above, FIG. 12 depicts the report that displays the guru report card (results) of one Knowledge Base. The results depict the level of interest the Knowledge Base would have in the security selected by the user. Box 100 depicts the security identification (in the same manner as in FIG. 1). Box 114 depicts the one Knowledge Base that was used to analyze the security selected by the user. The one Knowledge Base displayed can vary depending on the report structure (in the same manner as in FIG. 1). Box 104, box 106, box 108, and box 110 depict the level of interest that the one Knowledge Base has in the security selected. The level of interest of the overall methodology that was used to analyze the security can be broken down into four categories:

1. strong interest (box 104)
2. some interest (box 106)
3. no interest or would not invest (box 108)
4. selling interest (box 110)

The verbiage used in describing these categories was arbitrary (in the same manner as in FIG. 1). Box 102 depicts a result for the one Knowledge Base displayed on the report (in the same manner as in FIG. 1).

Thus, this report gives the user an easy to read overview of the results for the overall methodology of one select Knowledge Base. In the end, by viewing the result for their favorite Knowledge Base, the user is more educated and more confident that the investment decision they are about to make is the right one. The exact process by which the report is generated is not critical to the report that is generated. However, the system utilized is a good way to generate the reports and display the results of the Knowledge Base methodology.

Box 90 in FIG. 6a illustrates the generation of the report that displays the descriptive analysis for the overall methodology of one Knowledge Base. The descriptive analysis provides the reasoning as to why the advisor's Knowledge Base has the level of interest in the security that it does. The resulting report can be seen in FIG. 13.

Independent Report of One Guru Analysis

As stated above, FIG. 13 depicts the descriptive guru analysis of the overall methodology for one Knowledge Base. Box 140 depicts the name of the advisor whose Knowledge Base methodology is being displayed. The Knowledge Base methodology could come from the universe consisting of Peter Lynch, David Dreman, Martin Zweig, William O'Neil, Benjamin Graham, James P. O'Shaughnessy, Motley Fool, Value Line, Warren Buffet, Mary Buffet, Louis Navellier, Michael O'Higgins, Geraldine Weiss, Jim Collins, Morningstar, Jim Jubak, Stephen Leeb, Richard Band, Edward Jenson, David L. Brown, Christopher Graja, Fred Frailey, Richard Materi, Michael Gianturco, Thomas Phelps, Edwin Lefevre, Beardstown Ladies, Norman Fosback, Yale Hirsch, Martin Pring, Benjamin Zachs, Larry Williams, Ken Roberts, William Schmidt, W. H. Ford, Elaine Gazarelli, Michael Murphy and Kenneth Fisher. The one Knowledge Base displayed depends on the report design, which could vary depending on the desires of the report designer.

Box 142 depicts the security identification (in the same manner as in FIG. 7). Box 144 depicts the descriptive analysis of the Knowledge Base methodology. The descriptive analysis includes the reasoning as to why the security has received the level of interest as indicated in the result for the Knowledge Base. In other words, the descriptive analysis shows, in detail, the required criteria of the Knowledge Base displayed in the report (in the same manner as described in FIG. 1). The main components of the descriptive analysis are as follows:

1. variable being analyzed (box 148)
2. value of the variable being analyzed (box 150)
3. value of the required threshold of the Knowledge Base (box 152)
4. result of the individual variable anlaysis according to the requirement as determined from the Knowledge Base (box 154)

The descriptive analysis allows the user to better educate themselves as to why the Knowledge Base has the ratio requirements it does as part of the methodology and what value the Knowledge Base is looking for. This saves the user a tremendous amount of time due to the fact that they do not have to read the numerous public documents written by the Knowledge Base they are interested in and interpret the requirements. The work is done for them in the descriptive analysis. Box 146 depicts the level of interest of the Knowledge Base, which is a direct result of the required criteria used in the methodology. The level of interest will vary depending on the Knowledge Base and will inform the user as to the attractiveness of the security selected according to their favorite Knowledge Bases. Overall, this report is an extremely informative tool that guides the user through the reasoning and results of one Knowledge Base methodology.

Box 86 illustrates the generation of the ratio report card for one ratio across a plurality of Knowledge Bases. The ratio report card is the results of the Knowledge Bases' analysis for one individual ratio. The resulting report can be seen in FIG. 14.

Independent Report of One Ratio Report Card

Figure 14:
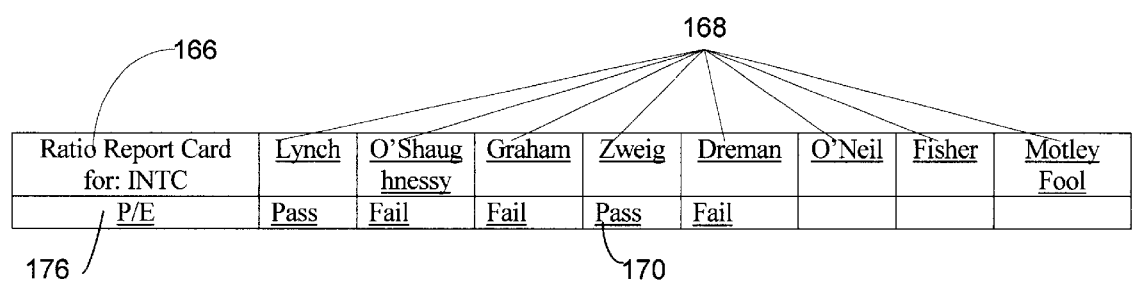
FIG. 14 illustrates the report that displays the ratio report card for one ratio analyzed across a plurality of Knowledge Bases.

As stated above, FIG. 14 illustrates the resulting report that depicts the ratio report card of one ratio across a plurality of Knowledge Bases. Box 166 depicts the security identification that the ratio report card was generated for (in the same manner as in FIG. 8). Box 176 depicts the one ratio that is analyzed across the plurality of Knowledge Bases. There could numerous other ratios listed depending on the report design (in the same manner as in FIG. 8).

Box 168 depicts the plurality of Knowledge Bases used to analyze the ratio. There could be numerous other Knowledge Bases listed depending on the design of the report (a list of the available Knowledge Bases can be found in FIG. 7). Box 170 depicts the result of the selected ratio for a Knowledge Base (in the same manner as in FIG. 8). This report is useful for the user who would like to quickly see how their favorite ratio fares when passed through some very popular Knowledge Bases. It provides a resource that is available no where else and is easy to use when interested in specific variables for specific Knowledge Bases.

Box 88 in FIG. 6a illustrates the generation of the descriptive ratio analysis for one ratio across a plurality of Knowledge Bases. The descriptive ratio analysis provides the reasoning as to why the ratio listed in the ratio report card received the results listed based on the requirements of the Knowledge Bases. The resulting report can be seen in FIG. 15.

Independent Report of One Ratio Analysis

As stated above, FIG. 15 illustrates the resulting report that depicts the descriptive ratio analysis of one ratio across a plurality of Knowledge Bases. Box 194 depicts the ratio name that is being analyzed across the plurality of Knowledge Bases (in the same manner as in FIG. 9). Box 198 depicts the column that will identify the name of the advisor whose Knowledge Base is used for the analysis of the ratio listed. The names included will vary depending on the ratio being analyzed (in the same manner as in FIG. 9).

Box 200 depicts the actual name of the plurality of Knowledge Bases that are used to analyze the one ratio (in the same manner as in FIG. 9). Box 196 depicts the column where the descriptive analysis of each Knowledge Base will be displayed (in the same manner as in FIG. 9). Box 202 depicts the actual descriptive analysis of the plurality of Knowledge Bases for the ratio highlighted (in the same manner as in FIG. 9).

This report allows for a quick and easy to read reference as to why a favorite ratio either passes or does not pass the required criteria for a plurality of the most popular Knowledge Bases. It provides a tool that gives the user more confidence in the investment decision they are going to make regarding the security they have selected without having to read and codify every Knowledge Base methodology they are interested in. In short, all the work regarding the in depth ratio analysis is done for them and presented in such a way that makes it readable and understandable.

Figure 6B:
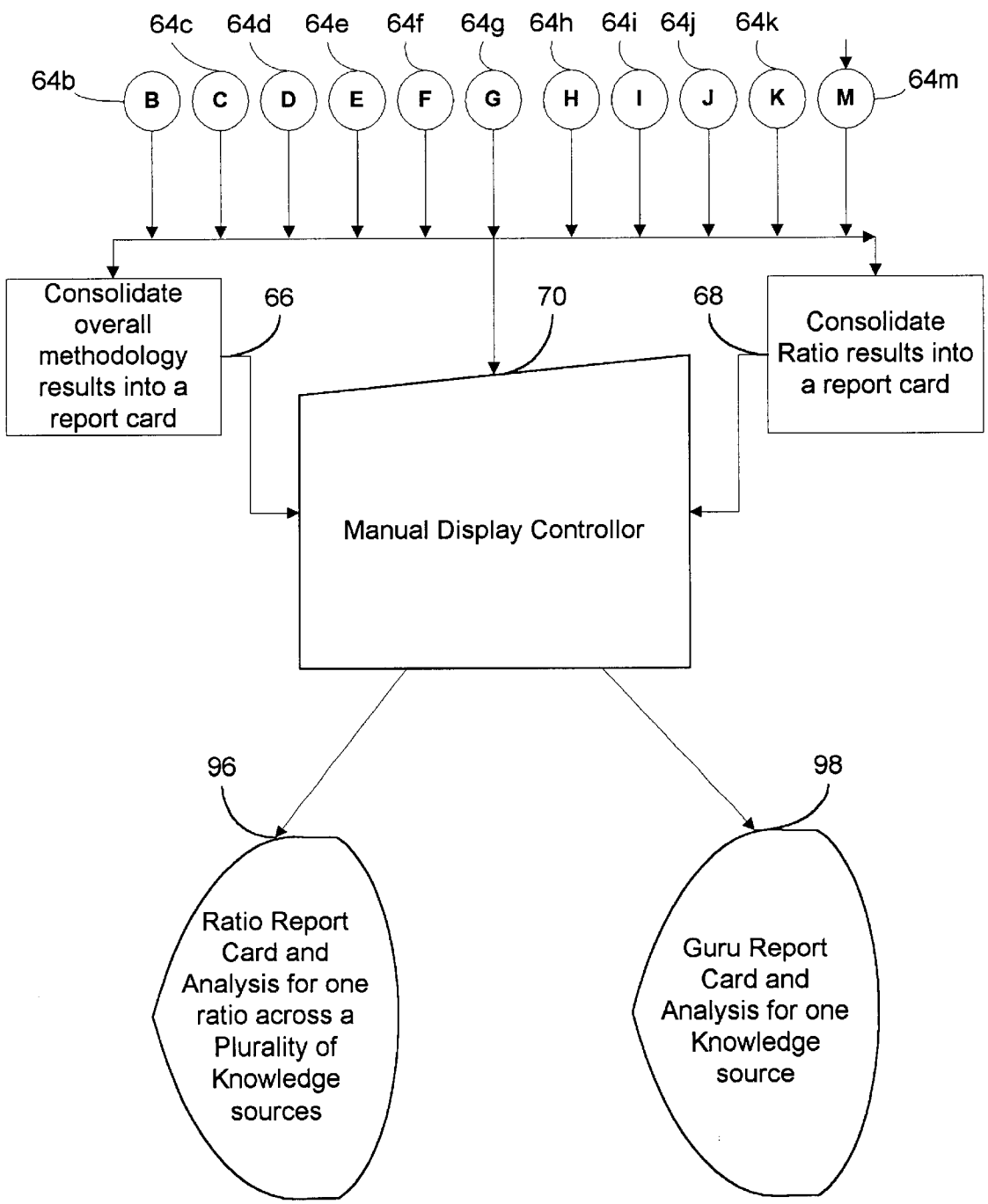
FIG. 6b is a schematic flowchart depicting the final stage of processing. This stage prepares the information for final display on the invention reports and generates the report based on the report design. The reports include the ratio report card along with a descriptive ratio analysis, guru report card along with a descriptive guru analysis each for one ratio and one Knowledge Base.

Generation of the Reports for One Guru Report Card along with One Guru Analysis and One Ratio Report Card along with One Ratio Analysis FIG. 6b, boxes 64b, 64c, 64d, 64e, 64f, 64g, 64h, 64i, 64j, 64k, and 64m illustrate the connectors used to continue the processing and flow of information from FIG. 3 to FIG. 6b. Each of the connectors represents the results and descriptive analysis of both the overall methodologies and individual ratios for the plurality of Knowledge Bases. Box 68 illustrates the processing step that consolidates the ratio results of the plurality of Knowledge Bases and prepares them for display in an easy to read format (in the same manner as in FIG. 4). Box 66 illustrates the processing step that consolidates the overall methodology results of the plurality of Knowledge Bases and prepares them for display in an easy to read format (in the same manner as in FIG. 4). The manual display controller stores the results as generated by the steps highlighted in FIG. 3, the steps highlighted in box 66, and the steps highlighted in box 68 (in the same manner as in FIG. 4).

Box 98 illustrates the generation of the report that displays the descriptive analysis for the overall methodology and the guru report card of one Knowledge Base. The resulting report can be seen in FIG. 16.

Report of One Guru Report Card alone with One Guru Analysis

As stated above, FIG. 16 depicts the descriptive guru analysis of the overall methodology and the results (guru report card) for one Knowledge Base. Box 140 depicts the name of the advisor whose Knowledge Base methodology is being displayed (in the same manner as in FIG. 7). Box 142 depicts the security identification (in the same manner as in FIG. 7).

Box 144 depicts the descriptive analysis of the Knowledge Base's methodology (in the same manner as in FIG. 7). The descriptive analysis includes the reasoning as to why the security has received the level of interest as indicated in the result for the Knowledge Base. In other words, the descriptive analysis shows, in detail, the required criteria of the Knowledge Base displayed in the report (in the same manner as described in FIG. 1). The main components of the descriptive analysis are as follows:

1. variable being analyzed (box 148)
2. value of the variable being analyzed (box 150)
3. value of the required threshold of the Knowledge Base (box 152)
4. result of the individual variable analysis according to the requirement as determined from the Knowledge Base (box 154)

Box 146 depicts the level of interest of the Knowledge Base, which is a direct result of the required criteria used in the methodology (in the same manner as in FIG. 7). Box 100 depicts the security identification (in the same manner as in FIG. 2). Box 114 depicts the one Knowledge Base that was used to analyze the security selected by the user (in the same manner as in FIG. 1). Box 104, box 106, box 108, and box 110 depict the level of interest that the one Knowledge Base has in the security selected (in the same manner as in FIG. 1). The level of interest of the overall methodology that was used to Analyze the security can be broken down into four categories:

1. strong interest (box 104)
2. some interest (box 106)
3. no interest or would not invest (box 108)
4. selling interest (box 110)

Box 102 depicts a result for one of the Knowledge Bases displayed on the report (in the same manner as in FIG. 1).

Overall, this report is an extremely informative tool that guides the user through the reasoning and results of one Knowledge Base's methodology. It allows the user to quickly see the level of interest of the one Knowledge Base along with the descriptive reasons as to why the Knowledge Base had that level of interest.

Box 96 illustrates the generation of the ratio report card for one ratio along with the descriptive analysis of the individual ratio analysis across a plurality of Knowledge Bases. The resulting report can be seen in FIG. 17.

Report of One Ratio Report Card along with One Ratio Analysis

As stated above, FIG. 17 illustrates the resulting report that depicts the ratio report card of one ratio and the descriptive analysis of the individual ratio analysis across a plurality of Knowledge Bases. Box 166 depicts the security identification that the ratio report card was generated for (in the same manner as in FIG. 8). Box 176 depicts the one ratio that is analyzed across the plurality of Knowledge Bases (in the same manner as in FIG. 8). Box 168 depicts the plurality of Knowledge Bases used to analyze the ratios (in the same manner as in FIG. 8). Box 170 depicts the result of the selected ratio for a Knowledge Base (in the same manner as in FIG. 8).

Box 194 depicts the ratio name that is being analyzed across the plurality of Knowledge Bases (in the same manner as in FIG. 9). Box 198 depicts the column that will identify the name of the advisor whose Knowledge Base is used for the analysis of the ratio listed (in the same manner as in FIG. 9). Box 200 depicts the actual name of the plurality of Knowledge Bases that are used to analyze the one ratio (in the same manner as FIG. 9). Box 202 depicts the actual descriptive analysis of the plurality of Knowledge Bases for the ratio highlighted (in the same manner as in FIG. 9).

This report provides the user with the ratio report card (results) which is a quick and easy to read reference as to whether or not a ratio either passes or does not pass the required criteria for a plurality of the most popular Knowledge Bases along with the detailed reasoning as to why it passed or did not pass. In the end, it provides a tool that gives the user more confidence in the investment decision they are going to make regarding the security they have selected without having to read and codify every Knowledge Base methodology they are interested in. In short, all the work regarding the in depth ratio analysis is done for them and presented in such a way that makes it readable and understandable.

Advisor Selection Means

FIG. 19 illustrates the advisor selection means. This allows the user to optionally select the advisor's Knowledge Base results they wish to view. It is important to note that this selection means is optional. In general, the invention reports display information based on the predetermined report design. This advisor selection means provides some flexibility as to what report will be displayed. Box 218 illustrates the advisor name that the user could select to view the report for. FIG. 19 lists some alternative advisors whose report could be viewed. There are many alternative advisors' methodologies (as described in FIG. 1) that could be viewed through the selection of the user using the advisor selection means.

Ratio Selection Means

FIG. 20 illustrates a ratio selection means. This allows the user to optionally select the ratio for which they wish to view the results or descriptive analysis for. It is important to note that this selection means is optional. In general, the invention reports display information based on the predetermined report design. The ratio selection means provides some flexibility as to what report will be displayed. Box 222 illustrates the ratio that the user could select to view the report for. FIG. 20 lists some of the alternative ratios that a report could be generated for. There are many alternative ratios (as described in FIG. 8) that could be viewed through the selection of the user using the ratio selection means.

Implementation of the Knowledge Bases

When the invention reports were first conceptualized, there was no system in place to generate the output provided by the methodologies of the plurality of financial advisors. Hence, the inventor devised a system that would codify the methodologies of the financial advisors which results in the creation of a Knowledge Base for each advisor, process the codified algorithms of the Knowledge Bases, and generate the output that could be displayed on the invention reports.

The system the inventor chose to utilize to codify the methodologies of the financial advisors, the processing of the codified algorithms and the generating of the reports for the resulting Knowledge Bases can be found within an Access database. It is important to note that the codification and processing of the methodologies could have been achieved in alternative ways. In other words, the Access environment is not the only means available to process the complex algorithms of the Knowledge Bases' methodologies. Other alternative systems include an expert system and a Microsoft Excel spreadsheet. Due to the fact that the Access environment was chosen, the codified methodologies took the form of conditional statements such as If-Then-Else statements. Additionally, we have utilized Case statements, which also are powerful conditional statements found within the Access environment. However, the conditional statements from this point forward will be referred to as If-Then-Else statements for ease of description.

These If-Then-Else statements appropriately represent the complex algorithmic requirements used by each Knowledge Base's methodology. Two Knowledge Base's If-Then-Else statements can be found in FIG. 21*a* through FIG. 21*d* and FIG. 22*a* through FIG. 22*f*. The number of requirements (If-Then-Else statements) varies depending on the Knowledge Base. Some Knowledge Bases require more criteria to be satisfied which results in the use of more If-Then-Else statements. In any case, it is these If-Then-Else statements that process the algorithms and generate the reports the user will view. It accomplishes by utilizing the following technique. NOTE: This technique is used due to the processing environment chosen. If the environment were different the technique would differ (as stated above). However, the resulting reports would take the same format of the invention reports as described in the Specification section and Claims section.

Each If-Then-Else conditional statement (FIG. 21*a* box 228, FIG. 21*c* box 232, FIG. 21*c* box 228, FIG. 21*c* box 236, FIG. 21*d* box 232, FIG. 22*a* box 228, FIG. 22*b* box 236, FIG. 22*c* box 232, FIG. 22*c* box 228, and FIG. 22*f* box 232) represents a criterion required by the financial advisor's methodology. The number of If-Then-Else statements will differ for each advisor depending on the number of required criterion. For example, if an advisor requires that a security pass eight criteria in order to receive strong interest there would be eight If-Then-Else conditional statements. These If-Then-Else statements are the basis for the processing of the financial advisor's methodologies and result in the creation of a Knowledge Base for each advisor. The processing of the Knowledge Bases results in the invention reports seen in FIG. 2 and FIG. 7 through FIG. 13. The actual processing of the If Then-Else statements is described below.

The If-Then-Else statements compare the required variable threshold value (FIG. 21*a* box 226, FIG. 22*b* box 226) identified by the advisor's Knowledge Base to the actual value of the variable (FIG. 21*a* box 230, FIG. 22*b* box 230) of the security chosen by the user. The conditional statements then determine if the security's value satisfies the requirement. In either case, the creation of the final results that will be displayed on the invention reports is accomplished. These results include the guru report card (results), guru descriptive analysis, ratio report card (results), and the ratio descriptive analysis. Each result is generated within the If-Then-Else conditional statements but is generated in a separate variable.

The guru report card (result) value for each Knowledge Base is stored in a string variable (FIG. 22c box 240) that is used for final display on the invention reports. A string variable is a variable that is found within an Access database environment that stores text, number, and symbol values. In the case of the current system, the string variable stores the output statement that will appear on the invention reports. In this case the invention report is the guru report card (results), therefore the string variable would store the information that designs the table and populates it with the information required to illustrate the results of the plurality of Knowledge Bases.

It is important to note that the string variable being referred to is generated for each Knowledge Base that is found within the system. The report design will determine which string variables will be used for display on the final invention report. The information stored within the string variable can be in many alternative formats. The format is essential only when the report is designed. Two of the alternative formats are HTML (Hypertext Markup Language) and simple text. In either case the information displayed will look the same displayed on an end user's PC or on a printed report.

To determine what level of interest should be displayed on the final invention reports, the system maintains what is called a scorecard variable (FIG. 21b box 242, FIG. 21c box 242, FIG. 22b box 242). It is important to note that alternative means of determining the level of interest are available. The scorecard variable maintains a count of how many criteria have been satisfied within the Knowledge Base being processed. For example, for each criterion that is passed, the scorecard is incremented by a value of five. For each criterion that is failed, the scorecard is incremented by a value zero. For each criterion that is OK according to the advisor, the scorecard is incremented by three. This flexible scoring system allows the processing system to determine not only a level of strong interest or no interest, but some interest also. At the completion of the processing the final value of the scorecard is compared to the value required to receive a certain level of interest. Therefore, based on the final value of the scorecard variable the result for each Knowledge Base is determined.

The guru descriptive analysis is stored in a string variable (FIG. 21a box 224, FIG. 21c box 224, FIG. 22a box 224, FIG. 22c box 224). This string variable stores the reasoning as to what values the advisor requires the variables to be and why they have passed or failed the requirements. In other words, it stores the descriptive results of the advisor's methodology. It does this in a format that can be displayed on the invention reports.

The ratio report card results are also stored in a string variable (FIG. 21b box 240, FIG. 22c box 240). It stores this information in a format that can be displayed on the final invention reports (The format is stored in the same manner as in the guru report card description).

The ratio descriptive analysis is stored in a string variable (FIG. 21b box 238, FIG. 22c box 238). This string variable stores the reasoning as to what value the advisor requires the variable to be and why it is has passed or failed the requirement. It stores this information in a format that can be displayed on the invention reports.

The final result of the codification and processing of the financial advisors' methodologies is the generation of the invention reports. The schematic flowcharts that illustrate this process can be found in FIG. 2 through FIG. 6b.

Initial processing of Advisor Knowledge Bases

Figure 23:
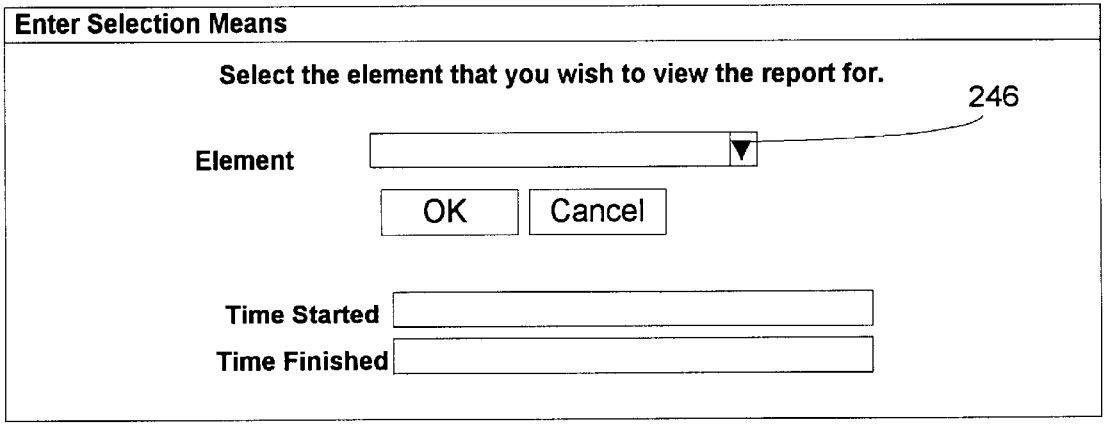
Figure 24:
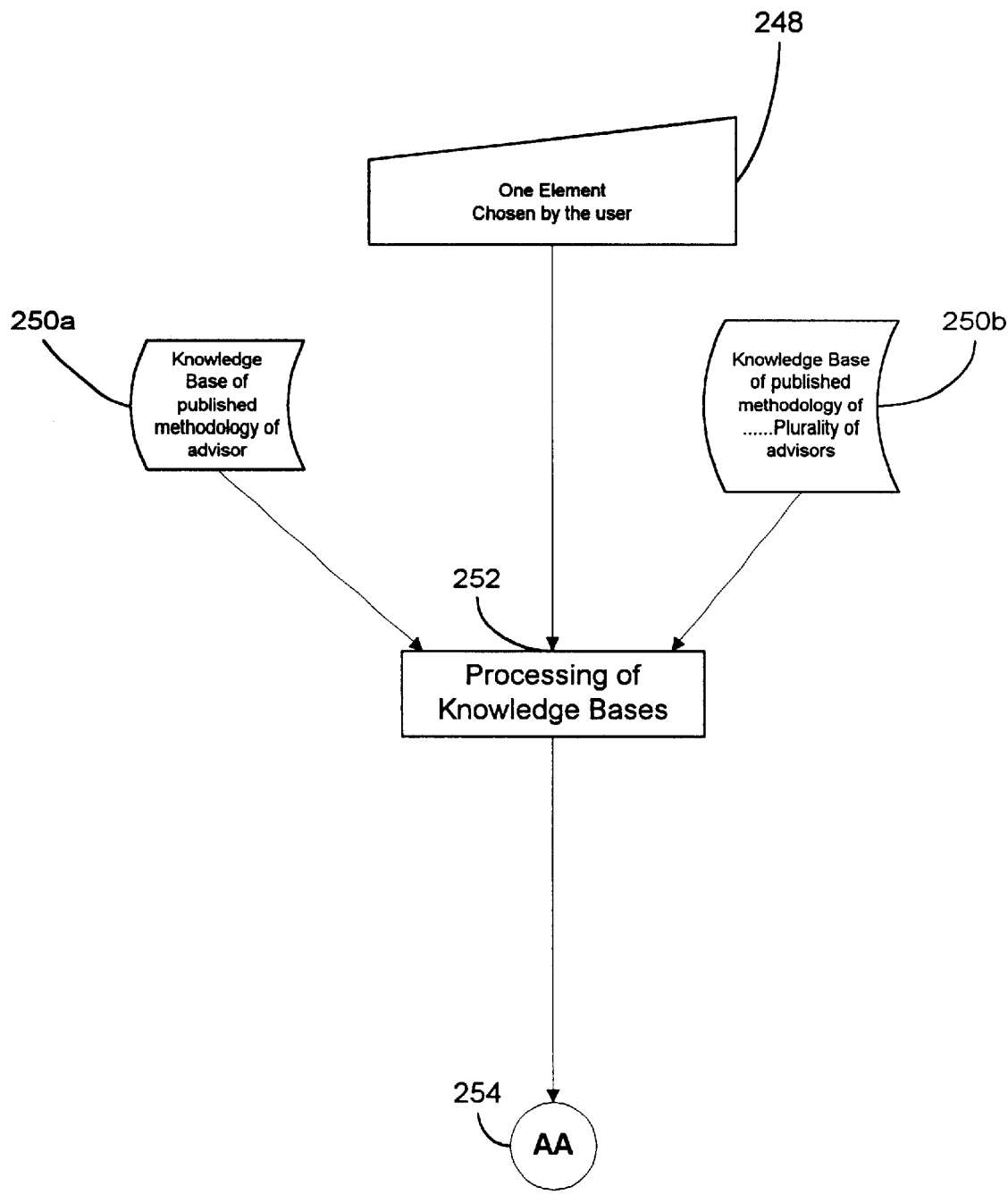
FIG. 24 is a schematic flowchart depicting the first stage of the processing of the plurality of advisor Knowledge Bases. The stage begins with the user entering the element to be analyzed and the retrieval of the Knowledge Bases' methodologies.

FIG. 24 is a schematic flowchart that depicts the initial processing of the functions of the advisor Knowledge Bases upon selection of an element, from a list of elements. The term Knowledge Base will be used to analyze elements found within the subject matter, of advisors within the aforementioned specified subject matter (in the same manner as described in FIG. 2). Box 248 is the element selection step by which the user can select the element, from a list of elements, which they are interested in and begin the processing of the functions found within the plurality of advisor Knowledge Bases. A selection enabling means can be seen in FIG. 23, box 246.

After the selection of the element is made, the computer system retrieves the Knowledge Bases that will be used for the analysis of the element selected. Box 250a illustrates a specific Knowledge Base that can be executed when the initial processing begins. This contains the codified published methodology of an advisor in the specified subject matter area. Box 250b illustrates the remaining plurality of Knowledge Bases that will be applied. As stated before, each Knowledge Base will contain the analysis of the codified methodology of the advisor for elements selected, from a list of elements, in the subject matter area. Box 254 illustrates a connector that allows the processing of the element to continue to FIG. 25.

Generation of Results and Descriptive Analysis of Advisor Knowledge Bases

FIG. 25 is a schematic flowchart that illustrates the second stage of processing that occurs in order to generate the invention report. Overall, the schematic flowchart accomplishes the generation of the analysis results for the Knowledge Bases that are used in the analysis of the element selected. The Knowledge Bases used for the analysis will vary depending on the subject matter area and the element selected. Box 254 is the connector that allows the processing to continue from FIG. 24 to FIG. 25.

Box 256a in FIG. 25 illustrates the generation of the analysis results for one specific Knowledge Base. The analysis results can include results, descriptive analysis of the results, and both the results and descriptive analysis together. The results will provide the information as to what the final outcome of the analysis of the advisor's Knowledge Base produced. This could be in various alternative formats. The format would depend on the subject matter area of interest. The descriptive analysis will provide the reasoning as to why the processing of the Knowledge Base's methodology produced the result that it did. Box 256b illustrates the generation of the results and descriptive analysis of those results for a plurality of Knowledge Bases. The plurality of Knowledge Bases utilized in the processing will vary depending on the subject matter specified and the element chosen from the list of elements within that subject matter. Box 258a and Box 258b illustrate the connectors that allow the processing of the Knowledge Bases to continue from FIG. 25 to FIG. 26a and to continue from FIG. 25 to FIG. 26b.

Figure 26A:
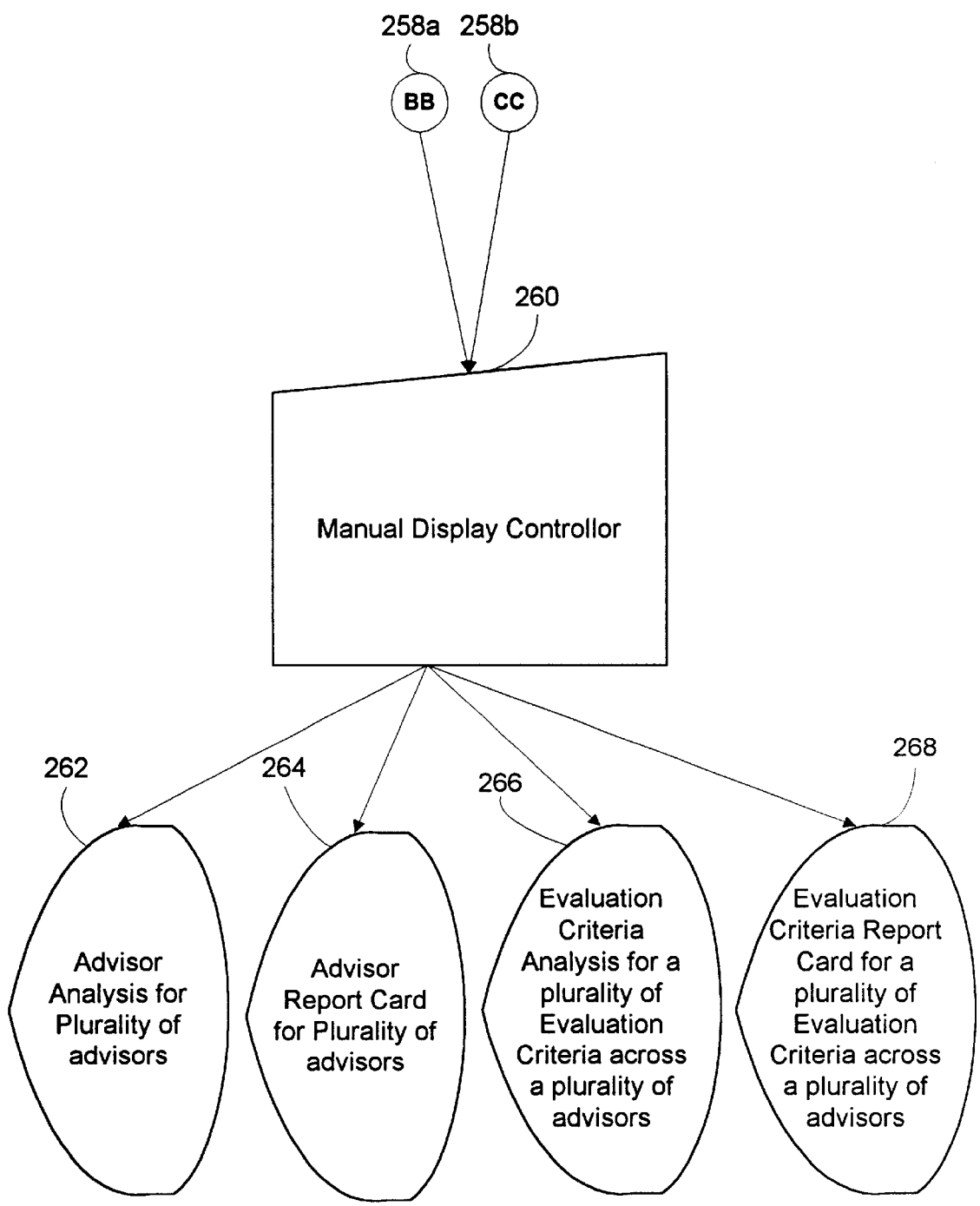
FIG. 26*a* is a schematic flowchart depicting the final stage of processing. This stage prepares the information for final display on the invention reports and generates the report based on the report design. The reports include the evaluation criteria report card, descriptive evaluation criteria analysis, advisor report card, and the descriptive advisor analysis all for a plurality of evaluation criteria and Knowledge Bases.

Generation of Independent Reports for Multiple Advisor Analysis, Multiple Advisor Report Card. Multiple Evaluation Criteria Report Card. and Multiple Evaluation Criteria Analysis FIG. 26a is a schematic flowchart that illustrates the final processing stage of the advisor Knowledge Bases. The final processing stage is the generation of the invention reports for the element selected by the user for a plurality of advisors and a plurality of evaluation criteria. Box 258*a* and Box 258*b* illustrate the connectors that allow the processing of the advisor Knowledge Bases to continue from FIG. 25 to FIG. 26*a*. It is important to note that the processing of the Knowledge Bases is not interrupted when moving from FIG. 25 to FIG. 26*a*. Box 260 illustrates the manual display controller. The manual display controller stores the analysis results of the advisor Knowledge Bases and prepares them for final display on the invention reports.

Box 264 in FIG. 26*a* illustrates the generation of the advisor report card for a plurality of advisor Knowledge Bases. The advisor report card is the results of the overall methodologies of the Knowledge Bases. The resulting independent report can be seen in FIG. 27.

Independent Report of Multiple Advisor Report Card

FIG. 27 illustrates the independent report that displays the advisor report card. The advisor report card includes the results of the overall methodologies of the plurality of Knowledge Bases available for analysis.

Box 270 in FIG. 27 depicts the element identification. The invention allows for the display or selection of the element identification in multiple ways. This display or selection may vary depending on the subject matter area.

However, the element will be selected from a list of elements within a subject matter in each case. A sample element selection means can be seen in FIG. 23.

Box 272 depicts the plurality of advisor Knowledge Bases that were used to analyze the element selected by the user. The Knowledge Bases displayed can vary depending on the report design. These advisor Knowledge Bases include the results of the overall advisor methodologies, the descriptive analysis of the overall advisor methodologies, the results of the analysis of individual evaluation criteria, and the descriptive analysis of the individual evaluation criteria. (The processing of these Knowledge Bases is described in detail in FIG. 24 through FIG. 25.

The display of the individual report output from the information found in the advisor Knowledge Bases are displayed in FIG. 27 through FIG. 34. Box 274, box 276, box 278, and box 280 illustrates the columns that display the results. The verbiage of the results will vary depending on the subject matter area being analyzed by the user. The invention allows for display of this final outcome in a multitude of ways.

Box 282 in FIG. 27 illustrates a result of an advisor Knowledge Base. As stated above, this verbiage of the result will vary depending on the subject matter analyzed (in may be simply designated by an 'X', a check mark, or a graphical icon). Also, the result will vary depending on the advisor Knowledge Base. In the end, the report allows the user to quickly view and compare the results of a plurality of advisor methodologies for the one specific element they wish to analyze in a subject matter area.

Box 262 in FIG. 26*a* illustrates the generation of the report that displays the descriptive analysis for the overall methodologies of a plurality of advisor Knowledge Bases. The descriptive analysis provides the reasoning why the advisors' Knowledge Bases have the result in the element that they do. The resulting report can be seen in FIG. 28.

Independent Report of Multiple Advisor Analysis

Figure 28:
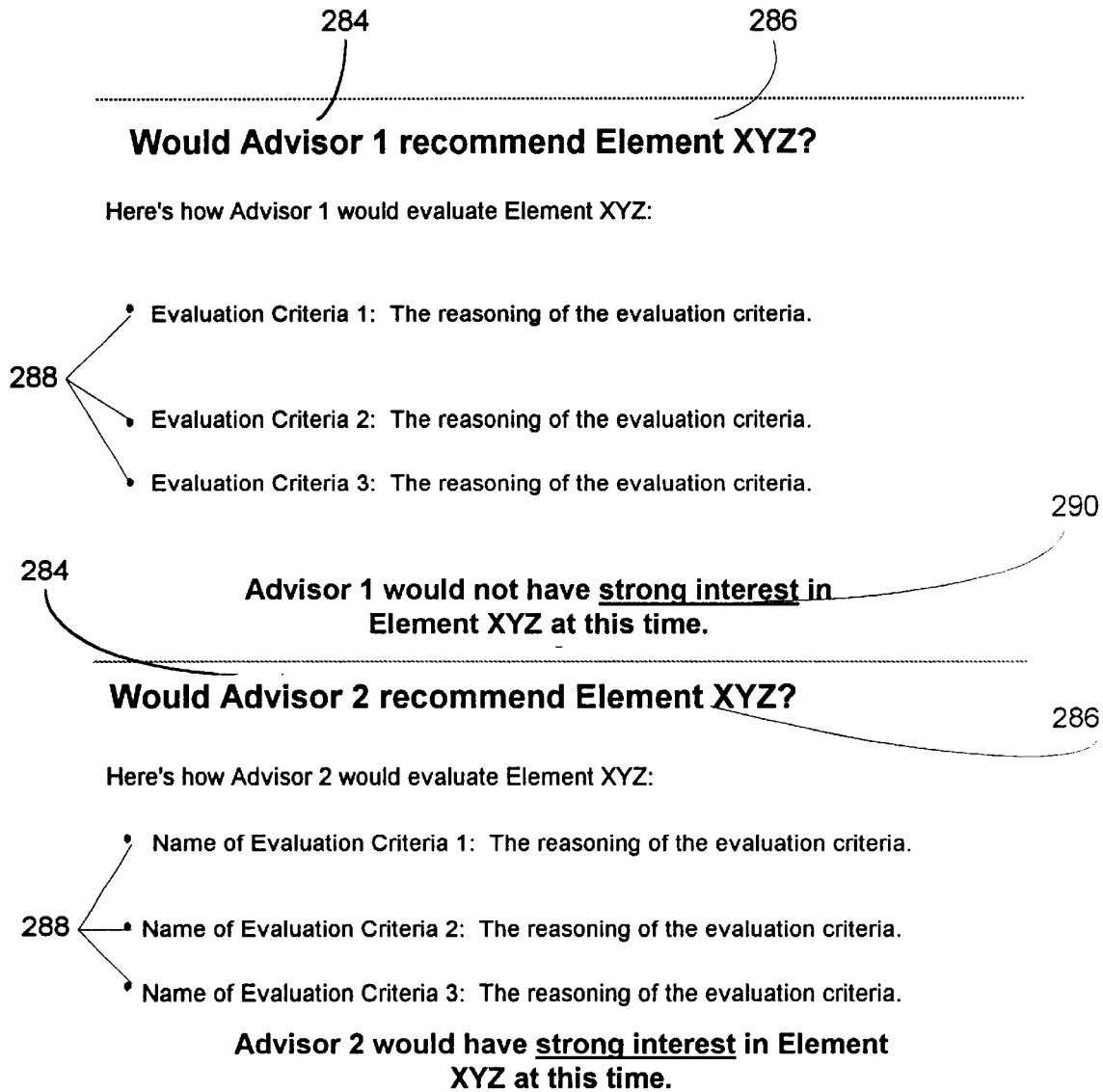
FIG. 28 illustrates the report that displays the descriptive advisor analysis for a plurality of advisor Knowledge Bases.

As stated above, FIG. 28 depicts the descriptive advisor analysis of the overall methodologies for a plurality of advisor Knowledge Bases. Box 284 depicts the name of the advisor whose Knowledge Base methodology is being displayed. The actual plurality of advisor Knowledge Bases displayed depends on the report design, which could vary depending on the desires of the report designer. It also depends on the subject matter area being analyzed by the user.

Box 286 in FIG. 28 depicts the element identification. Box 288 depicts the descriptive analysis of the Knowledge Bases' methodologies applied to the specific element at that point in time. The descriptive analysis includes the reasoning as to why the element has received the result that is indicated in the result for the advisor Knowledge Base. In other words, the descriptive analysis shows, in detail, the required evaluation criteria of each advisor Knowledge Base displayed in the report.

The descriptive analysis allows the user to better educate themselves as to why the Knowledge Base requires the evaluation criteria as part of the methodology and what value the advisor Knowledge Base is looking for. This saves the user a tremendous amount of time due to the fact that they do not have to codify the requirements of each advisor on their own. The work is done for them in the descriptive analysis.

Box 290 depicts the level of interest of an advisor Knowledge Base, which is a direct result of the required criteria used in the methodology. The result will vary depending on the advisor Knowledge Base and will inform the user as to the attractiveness of the element selected according to their favorite Knowledge Bases. Overall, this report is an extremely informative tool that guides the user through the reasoning and results of a plurality of advisor Knowledge Base methodologies. Box 268 in FIG. 26*a* illustrates the generation of the evaluation criteria report card for multiple evaluation criteria across a plurality of advisor Knowledge Bases. The evaluation criteria report card is the results of the advisor Knowledge Bases for a plurality of individual evaluation criteria. The resulting report can be seen in FIG. 29.

Independent Report of Multiple Evaluation Criteria Report Card

Figure 29:
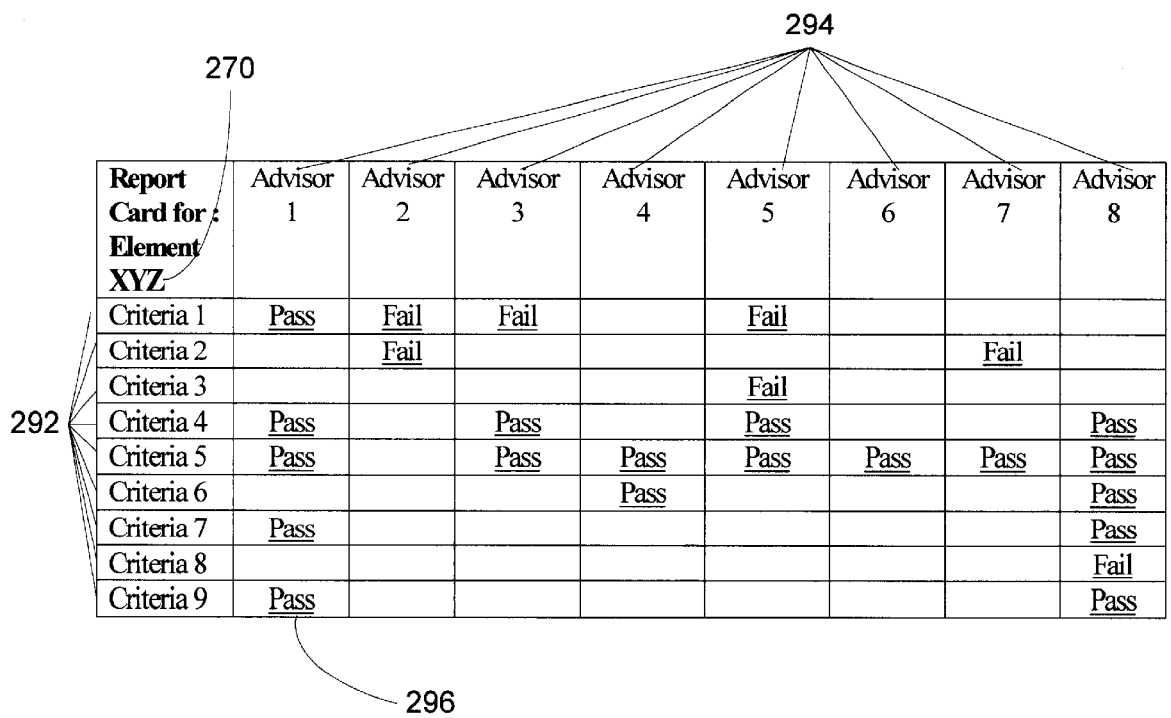
FIG. 29 illustrates the report that displays the evaluation criteria report card for multiple evaluation criteria analyzed across a plurality of advisor Knowledge Bases.

As stated above, FIG. 29 illustrates the resulting report that depicts the evaluation criteria report card of multiple evaluation criteria across a plurality of advisor Knowledge Bases. Box 270 depicts the element identification that the evaluation criteria report card was generated for. Box 292 depicts the multiple evaluation criteria that are analyzed across the plurality of advisor Knowledge Bases. There could be numerous other evaluation criteria listed depending on the Knowledge Bases included and the report design.

Box 294 depicts the plurality of advisor Knowledge Bases used to analyze the evaluation criteria. There could be numerous other advisors Knowledge Bases listed depending on the design of the report. Box 296 depicts the result of a selected evaluation criterion for an advisor Knowledge Base. The result can be displayed in alternative ways depending on the subject matter areas being analyzed.

This report is useful for the user who would like to quickly see how their favorite evaluation criteria rate a particular element when passed through some very popular advisor Knowledge Bases. It provides a resource that is available nowhere else and is easy to use when interested in specific evaluation criteria for specific advisor Knowledge Bases.

Box 266 in FIG. 26*a* illustrates the generation of the descriptive evaluation criteria analysis for multiple evaluation criteria across a plurality of advisor Knowledge Bases. The descriptive evaluation criteria analysis provides the reasoning as to why the evaluation criteria listed in the evaluation criteria report card received the results listed based on the requirements of the advisor Knowledge Bases. The resulting report can be seen in FIG. 30.

Independent Report of Multiple Evaluation Criteria Analysis

Figure 30:
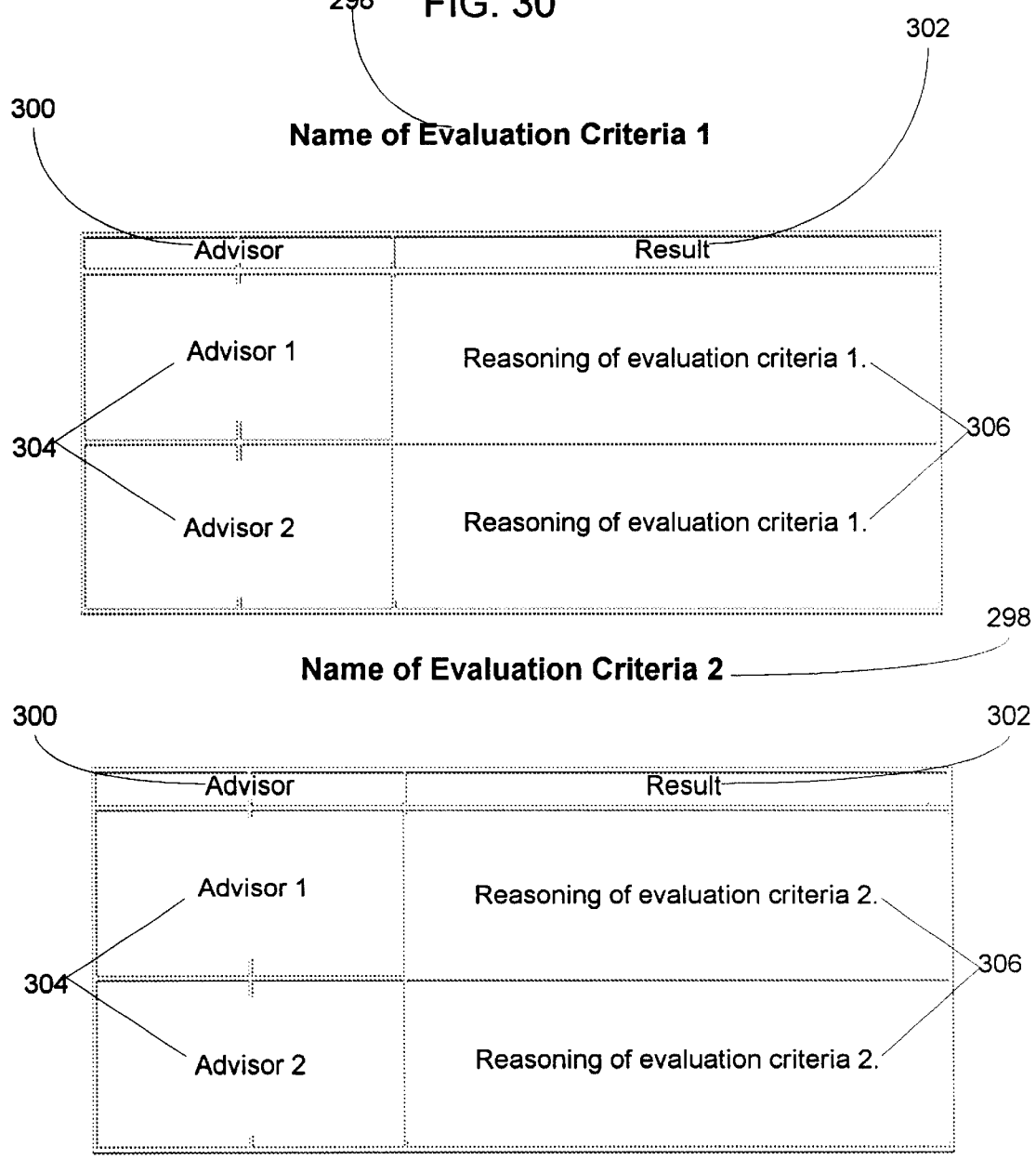
FIG. 30 illustrates the report that displays the descriptive evaluation criteria analysis for multiple evaluation criteria analyzed across a plurality of advisor Knowledge Bases.

As stated above, FIG. 30 illustrates the resulting report that depicts the descriptive evaluation criteria analysis of multiple evaluation criteria across a plurality of advisor Knowledge Bases. Box 298 depicts the evaluation criteria name that is being analyzed across the plurality of advisor Knowledge Bases. The actual evaluation criteria displayed will vary depending on the subject matter area and the advisor methodologies.

Box 300 depicts the column that will identify the name of the advisor whose Knowledge Base is used for the analysis of the evaluation criteria listed. The names included will vary depending on the evaluation criteria being analyzed. Box 304 depicts the actual name of the plurality of advisor Knowledge Bases that are used to analyze the multiple evaluation criteria. For each evaluation criteria, the advisor Knowledge Bases used will vary due to the fact that each Knowledge Base analyzes different evaluation criteria.

Box 302 depicts the column where the descriptive analysis of each advisor Knowledge Base will be displayed. Box 306 depicts the actual descriptive analysis of the plurality of advisor Knowledge Bases for the evaluation criteria highlighted. This will describe the reasoning as to why the evaluation criteria is considered favorable or unfavorable according to the advisor Knowledge Bases providing analysis of the evaluation criteria listed.

This report allows for a quick and easy to read reference as to why an evaluation criteria either passes or does not pass the required criteria for a plurality of the most popular advisor Knowledge Bases in the subject matter area being analyzed. It provides a tool that gives the user more confidence in the decision they are going to make regarding the element they have selected without having to codify every advisor methodology they are interested in. In short, all the work regarding the in depth evaluation criteria analysis is done for them and presented in such a way that makes it readable and understandable.

Figure 26B:
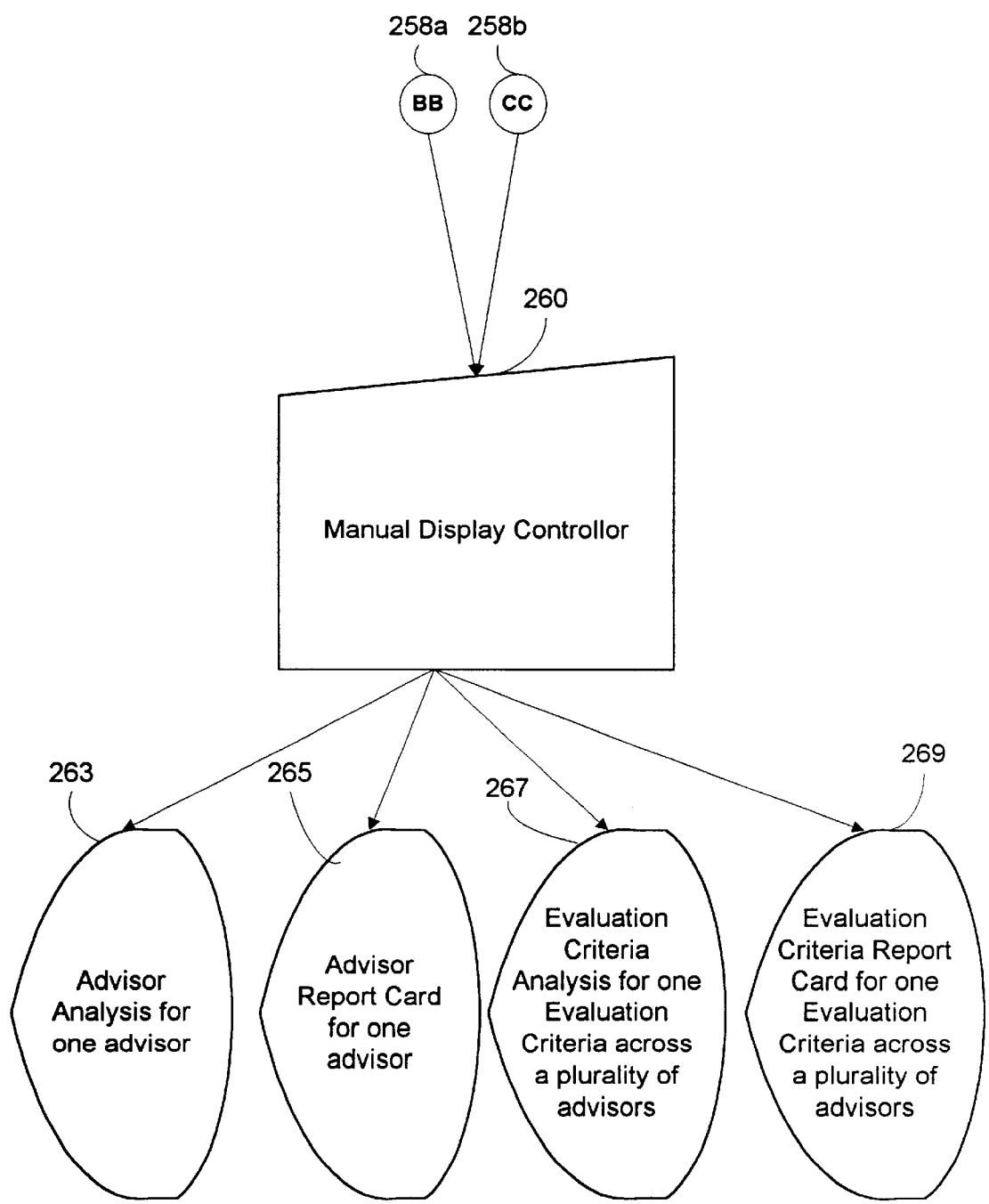
FIG. 26*b* is a schematic flowchart depicting the final stage of processing. This stage prepares the information for final display on the invention reports and generates the report based on the report design. The reports include the evaluation criteria report card, descriptive evaluation criteria analysis, advisor report card, and the descriptive advisor analysis all for either one evaluation criteria or one advisor Knowledge Base.

Generation of the Independent Reports for One Advisor Report Card, One Advisor Analysis, One Evaluation Criteria Report Card, and One Evaluation Criteria Analysis FIG. 26b, boxes 258a and 258b illustrate the connectors used to continue the processing and flow of information from FIG. 25 to FIG. 26b. Each of the connectors represents the results and descriptive analysis of both the overall methodologies and individual evaluation criteria for the plurality of advisor Knowledge Bases. Box 260 illustrates the manual display controller. The manual display controller stores the results as generated by the steps highlighted in FIG. 25.

Box 265 in FIG. 26b illustrates the generation of the advisor report card for one Knowledge Base. In this report, the advisor report card is the results of the overall methodology of one advisor Knowledge Base. The resulting report can be seen in FIG. 31.

Independent Report of One Advisor Report Card

As stated above, FIG. 31 depicts the report that displays the advisor report card (results) of one Knowledge Base. Box 100 depicts the element identification. Box 272 depicts the one advisor Knowledge Base that was used to analyze the element selected by the user. The one advisor Knowledge Base displayed can vary depending on the report structure and the subject matter area being analyzed. Box 274, box 276, box 278, and box 280 depict the result that the one Knowledge Base has in the element selected. The verbiage of the result of the overall methodology will vary depending on the subject matter area being analyzed.

Box 282 is a result of an advisor methodology. This result will vary depending on the advisor Knowledge Base being presented in the report.

Thus, this report gives the user an easy to read overview of the results for the overall methodology of one select advisor Knowledge Base. In the end, by viewing the result for their favorite advisor Knowledge Base, the user is more educated and more confident that the decision they are about to make is the right one. The exact process by which the report is generated is not critical to the report that is generated. However, the system utilized is a good way to generate the reports and display the results of the advisor Knowledge Base methodology.

Box 263 in FIG. 26b illustrates the generation of the report that displays the descriptive analysis for the overall methodology of one advisor Knowledge Base. The descriptive analysis provides the reasoning as to why the advisor's Knowledge Base has the result in the evaluation criteria that it does. The resulting report can be seen in FIG. 32.

Independent Report of One Advisor Analysis

As stated above, FIG. 32 depicts the descriptive advisor analysis of the overall methodology for one advisor Knowledge Base. Box 284 depicts the name of the advisor whose Knowledge Base methodology is being displayed. The one Knowledge Base displayed depends on the report design, which could vary depending on the desires of the report designer. It also depends on the subject matter area that is being analyzed by the user.

Box 286 depicts the element identification. Box 288 depicts the descriptive analysis of the advisor Knowledge Base methodology. The descriptive analysis includes the reasoning as to why the element has received the result as indicated by the Knowledge Base. In other words, the descriptive analysis shows, in detail, the required criteria of the advisor Knowledge Base displayed in the report.

The descriptive analysis allows the user to better educate themselves as to why the advisor Knowledge Base has the evaluation criteria requirements it does as part of the methodology and what value the Knowledge Base is looking for. This saves the user tremendous amounts of time due to the fact that they do not have codify the methodology of the Knowledge Base they are interested in and interpret the requirements. The work is done for them in the descriptive analysis.

Box 290 depicts the result of an advisor Knowledge Base, which is a direct result of the required criteria used in the methodology. The result will vary depending on the advisor Knowledge Base. Overall, this report is an extremely informative tool that guides the user through the reasoning and results of one advisor Knowledge Base methodology.

Box 269 in FIG. 26b illustrates the generation of the evaluation criteria report card for one evaluation criteria across a plurality of Knowledge Bases. The evaluation criteria report card is the results of the Knowledge Bases' analysis for one individual evaluation criteria. The resulting report can be seen in FIG. 33.

Independent Report of One Evaluation Criteria Report Card

Figure 33:
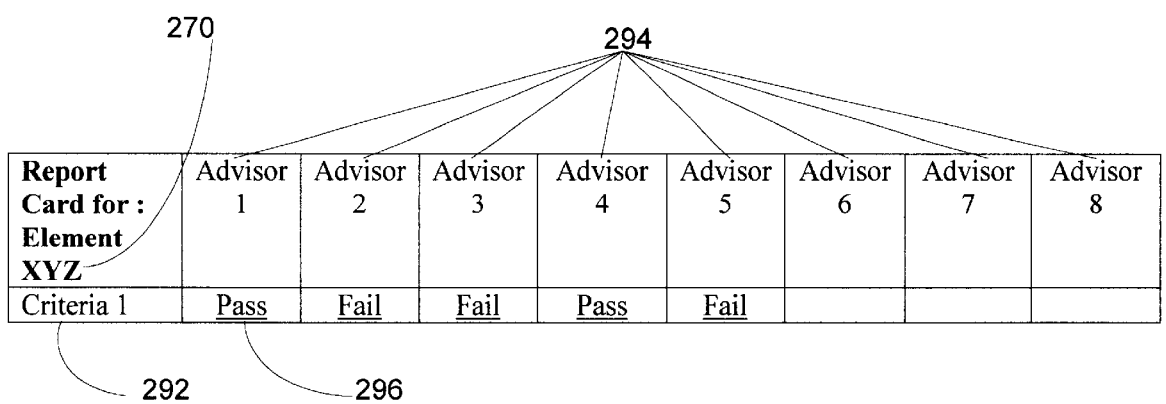
FIG. 33 illustrates the report that displays the evaluation criteria report card for one evaluation criteria analyzed across a plurality of advisor Knowledge Bases.

As stated above, FIG. 33 illustrates the resulting report that depicts the evaluation criteria report card of one ratio across a plurality of advisor Knowledge Bases. Box 270 depicts the element identification that the evaluation criteria report card was generated for. Box 292 depicts the one evaluation criteria that is analyzed across the plurality of advisor Knowledge Bases. There could numerous other evaluation criteria listed depending on the report design.

Box 294 depicts the plurality of advisor Knowledge Bases used to analyze the evaluation criteria. There could be numerous other advisors Knowledge Bases listed depending on the design of the report. Box 296 depicts the result of the selected evaluation criteria for an advisor Knowledge Base.

This report is useful for the user who would like to quickly see how their favorite evaluation criteria fares when passed through some very popular advisor Knowledge Bases in the subject matter area being analyzed. It provides a resource that is available nowhere else and is easy to use when interested in specific variables for specific advisor Knowledge Bases.

Box 267 in FIG. 26b illustrates the generation of the descriptive evaluation criteria analysis for one evaluation criteria across a plurality of advisor Knowledge Bases. The descriptive evaluation criteria analysis provides the reasoning as to why the evaluation criteria listed in the evaluation criteria report card received the results listed based on the requirements of the advisor Knowledge Bases. The resulting report can be seen in FIG. 34.

Independent Report of One Evaluation Criteria Analysis

Figure 34:
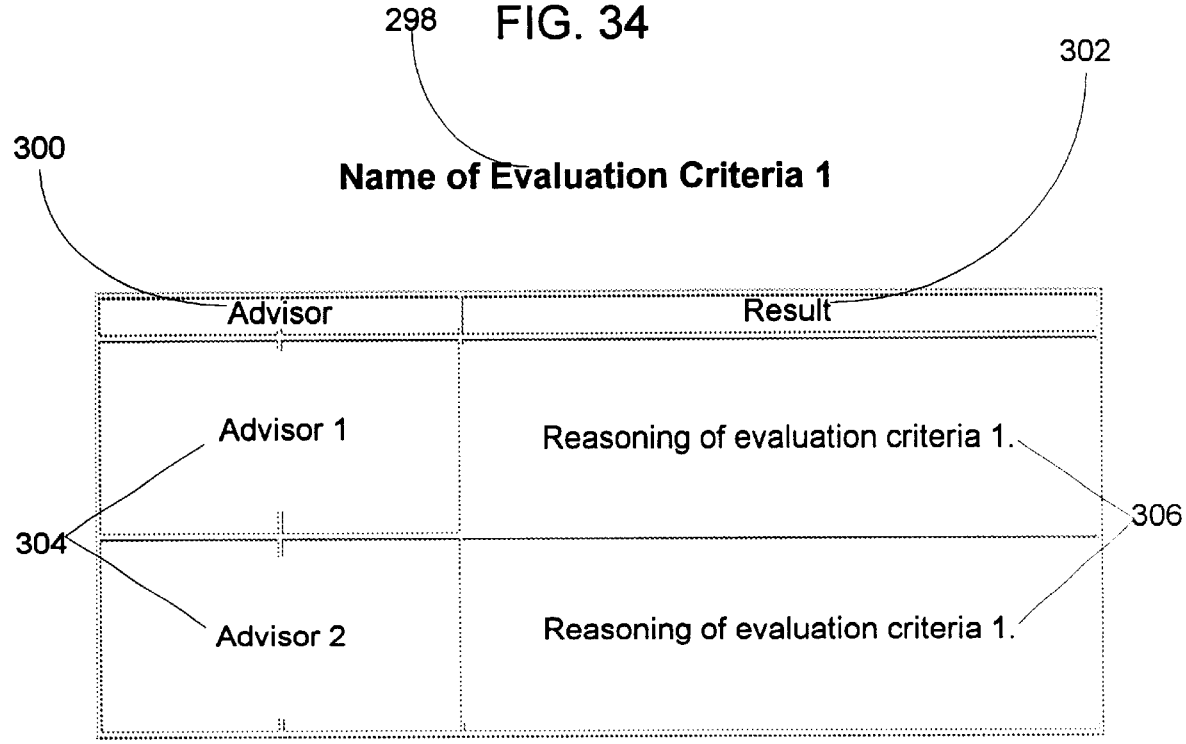
FIG. 34 illustrates the report that displays the descriptive evaluation criteria analysis for one evaluation criteria analyzed across a plurality of advisor Knowledge Bases.

As stated above, FIG. 34 illustrates the resulting report that depicts the descriptive evaluation criteria analysis of one evaluation criteria across a plurality of advisor Knowledge Bases. Box 298 depicts the evaluation criteria name that is being analyzed across the plurality of advisor Knowledge Bases. Box 300 depicts the column that will identify the name of the advisor whose Knowledge Base is used for the analysis of the evaluation criteria listed. The names included will vary depending on the evaluation criteria being analyzed and the subject matter area being analyzed.

Box 304 depicts the actual name of the plurality of advisor Knowledge Bases that are used to analyze the one evaluation criteria. Box 302 depicts the column where the descriptive analysis of each advisor Knowledge Base will be displayed. Box 306 depicts the actual descriptive analysis of the plurality of advisor Knowledge Bases for the evaluation criteria highlighted.

This report allows for a quick and easy to read reference as to why a favorite evaluation criteria either passes or does not pass the required criteria for a plurality of the most popular advisor Knowledge Bases in the subject matter being analyzed. It provides a tool that gives the user more confidence in the decision they are going to make regarding the element they have selected without having to codify every advisor Knowledge Base methodology they are interested in. In short, all the work regarding the in depth evaluation criteria analysis is done for them and presented in such a way that makes it readable and understandable.

CONCLUSION, RAMIFICATIONS, AND SCOPE

The invention reports provide the user with a powerful research tool that allows them to view the analysis of a plurality of expert advisors' methodologies for a specific security or element of interest. These reports display the information in a format that is easy-to-read but extremely insightful and educational.

Qualitative Analysis Feature

One of the highly sophisticated features that the processing system offers is that it handles criteria from an advisor's methodology that is qualitative and not just quantitative. For example, one of the expert advisor's methodology requires that the company whose security is being researched is a turnaround company (A company that has not performed well recently, in fact is possibly on the brink of bankruptcy, but is about to turn things completely around.). Through the incorporation of information from a third party, the system includes the answer to whether or not the company is a turnaround in the data storage means. Therefore, when the system processes this expert advisor's methodology, it will be capable of determining if the company is a turnaround and appropriately pass or fail the security being analyzed based on this criteria.

Another qualitative example involves the industry of the company whose security is being analyzed. Again, using a third party vendor, the industry name or ID of the company is incorporated into the data storage means that is used in the processing of the advisor Knowledge Bases. If an advisor's methodology requires that the company whose security is being analyzed be part of a particular industry, the system need not ask the user to determine this information. The system simply retrieves this qualitative information, analyzes it, and continues the processing. The system completes the analysis of this qualitative criterion without user intervention. The system's ability to incorporate qualitative criterion makes it more useful to the user due to the fact that it eliminates additional research steps that would be required otherwise.

Multiple Environments to Display Reports

While the above description contains many specificities, these should not be construed as limitations on the scope of the invention, but rather as an exemplification of one preferred embodiment. For example, the invention reports could be displayed in multiple alternative environments. These environments include the World Wide Web via multiple web browsers including Netscape and Internet Explorer, an Intranet, a LAN, on a standalone PC, and as a printed report. The environment that the reports are displayed within is not critical to the invention. As technology evolves and improves, the number of environments available to display the invention reports will increase. The invention reports can be displayed in any of the environments that exist or will exist in the future.

Multiple Display Formats for the Invention Reports

The invention reports could be displayed in a multitude of ways. They could be in a hard copy report, an HTML formatted page, a Microsoft Access report displayed on a monitor, etc . . . The inventor has displayed the invention reports in each of the ways described above and each is accomplished by a simple alteration. Therefore, the invention reports should not be limited to the display shown in the above figures.

Time of Generation of Invention Reports

The actual time of the generation of the invention reports in response to a user's request could occur in many ways. We have implemented three of the ways and they include:

1. Preprocessing the invention reports before the user selects the security that they wish to analyze. In other words, the invention reports for all securities that are followed would be generated in a batch process before a security selection is made and the reports would be available whenever a user enters the security of choice. This has the following advantages and disadvantages:
   a. Advantage: The retrieval of the invention reports is more efficient and quicker
   a. Disadvantage: The amount of storage space required to store the invention reports is enormous.
   b. Disadvantage: The company fundamental information used for the report processing is not the most current due to the fact that the reports would be run once a day versus multiple times per day.
2. Generating the reports after the user selects the security that they wish to view the invention reports of. In other words, the invention reports would be generated "on the fly" after the selection of the security is made. This has the following advantages and disadvantages:

a. Advantage: The amount of storage space required to store the invention reports is reduced to nothing.
b. Advantage: The company fundamental information used for the report processing is the most current due to the fact that the reports are processed only when the user selects the security.
c. Disadvantage: The retrieval of the invention reports less efficient and slow.
3. Combinations of both processing techniques utilized in number one and number two above, where the reports for the most popular components are preprocessed and the rest are generated "on the fly."

The processing and generation of the results and descriptive analysis of the plurality of advisors does not have to occur at the same time, does not have to be conducted by the same program, or does not have to take place on the same computer that the reports are displayed from. The reports could be decoupled from the relatively time-consuming processing that takes place to generate the results and descriptive analysis. In other words, the processing of the codified methodologies does not have to be part of the same physical system as the reporting system. This variation allows a data set of processed results to be transferred to a third party company for incorporation of the invention reports into their own product.

Alternate Selection Means

The security selection means and the element selection means found within the invention affords the user the ability to enter multiple symbols or multiple elements at a time and receive a report with multiple report cards or the comparison of multiple securities using the plurality of expert advisors' methodologies. In other words, the security selection means and the element selections means is not limited to allowing a user to enter only one security or element.

The system that processes and generates the invention reports could allow for a selection means where the user preselects only the advisors they are interested in and/or the ratios they are interested. In turn, the user could view the invention reports in a customized fashion rather than viewing the information in the report design that has been predetermined before the processing.

Alternate Universe of Elements

The securities that the invention reports could be generated for includes stocks, bonds, commodities, futures, options, real estate, derivatives, mortgages, mutual funds etc . . . The elements and subject matter areas that the invention reports could be generated for include analysis of company financial statements, personal decision making such as the evaluation of going to one college by a plurality of advisors, management decision making, etc. It is important to note that the invention reports are applicable when there is the following:

1. a substantial but finite number of elements to evaluate. For example, the number of colleges in the U.S., the number of banks in Connecticut, the list of parts to be used in a specific design like selecting a motor for a robot or a transistor for an electronic amplifier design, etc.
2. the quantitative and qualitative data for most of the elements are available (or can be made available) in an organized or indexed data storage means The invention reports could alternatively be generated for various different universes of securities or elements. For example, the reports could be generated for a prepackaged list of securities such as the 30 stocks of the Dow Jones Industrial Average, securities in a user's portfolio, a selected list of multiple securities or elements of the user's choice, etc . . . across one advisor's methodology or multiple advisors' methodologies. In other words, the generation of the invention reports is not be restricted to just one security or one element at a time. The reports that illustrate the multiple element and multiple security analysis can be seen in FIG. 35a through FIG. 37.

Report of Evaluation Criteria Analysis for Multiple Elements across a Plurality of Advisor Knowledge Bases FIG. 35a illustrates the report that displays the results for the evaluation criteria analysis for more than one element across a plurality of advisor Knowledge Bases. This report is different from the previous invention reports because it offers the user the ability to see the evaluation criteria analysis results across more than one element at a time. The report displayed in FIG. 35a is one design that could be utilized to display the results. However, there are multiple alternative designs that could be utilized.

Figure 18B:
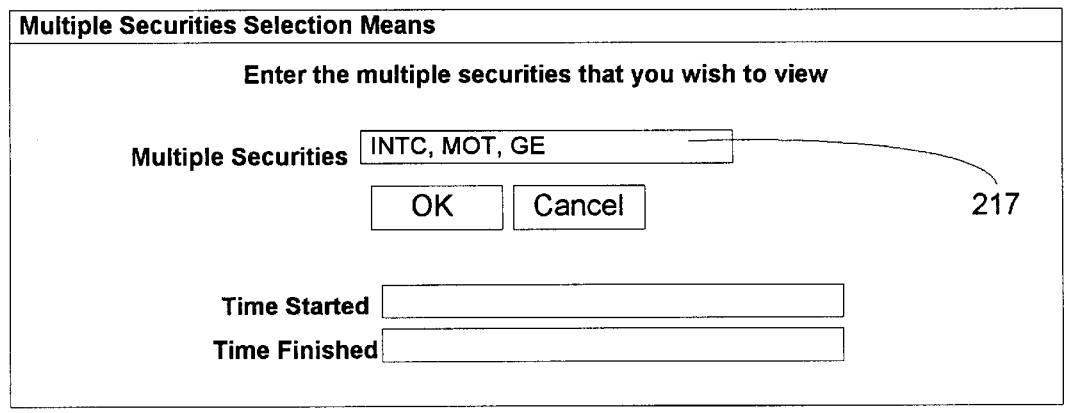
FIG. 18*b* illustrates the multiple element selection means whereby a user can enter the multiple elements they wish to view the invention reports for. The example illustrates a multiple element selection means for securities.

Box 310 illustrates the multiple elements whose evaluation criteria are being analyzed across a plurality of advisors and displayed on the report. The user has selected the multiple elements they wish to have displayed on this report using a multiple element selection means (FIG. 18b).

FIG. 28b illustrates a multiple element selection means that can be utilized by the user to generate the reports for multiple elements. The example illustrated in FIG. 18b is a multiple security selections means. However, the actual element being entered will depend upon the subject matter area being analyzed. Box 217 in FIG. 18b illustrates the box where the user will enter the multiple elements. The multiple elements can be entered by separating each one with a delimited character such as a comma, a space, a colon, etc . . .

Box 308 illustrates the evaluation criteria utilized by the plurality of advisors whose analysis is included in the report. Box 294 in FIG. 35a illustrates the plurality of advisors whose result is being displayed on the report. The advisors being displayed can vary depending on the report design and the subject matter area being analyzed. Additionally, the advisors included in the report will vary depending on the evaluation criteria utilized in the analysis of the advisor. In other words, if the advisor offers an analysis of the evaluation criteria found within the report, it can be included in the report. Box 296 illustrates an evaluation criteria result of an advisor. The result could be represented in many alternative ways depending on the subject matter area and the desires of the report designer.

Report of Ratio Analysis for Multiple Elements across a Plurality of Investment Advisor Knowledge Bases FIG. 35b illustrates the report that displays the results for the ratio analysis for more than one security across a plurality of investment advisor Knowledge Bases. This report is different from the previous invention reports because it offers the user the ability to see the ratio analysis results across more than one security at a time. The report displayed in FIG. 35b is one design that could be utilized to display the results. However, there are multiple alternative designs that could be utilized.

Box 314 illustrates the multiple securities whose ratios are being analyzed across a plurality of investment advisors and displayed on the report. The user selects the multiple securities they wish to have displayed on this report using a multiple security selection means (FIG. 18b).

Box 312 illustrates the ratio utilized by the plurality of investment advisors whose analysis is included in the report. Box 168 in FIG. 35b illustrates the plurality of investment advisors whose result is being displayed on the report. The advisors being displayed can vary depending on the report design. Additionally, the investment advisors included in the report will vary depending on the ratios utilized in the analysis of the advisor. In other words, if the investment advisor offers an analysis of the ratios found within the report, it can be included in the report. Box 170 illustrates a ratio analysis result of an advisor. The result could be represented in many alternative ways depending on the desires of the report designer.

Figure 36A:
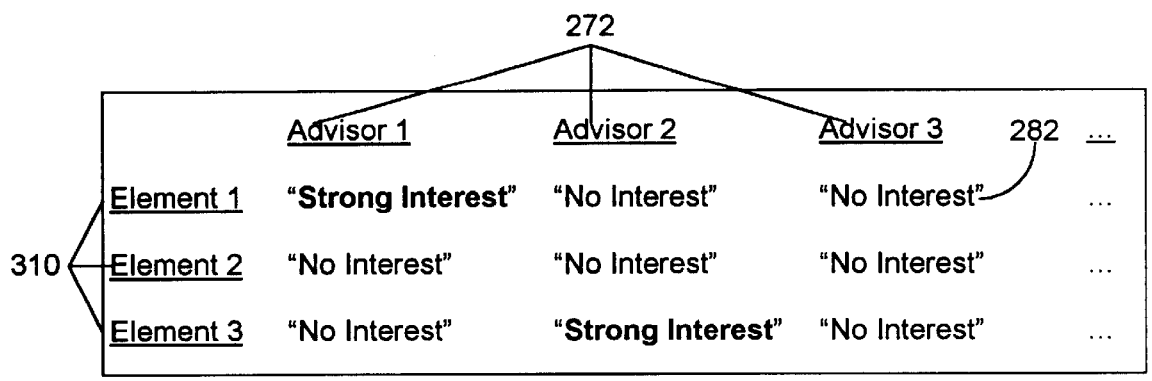
FIG. 36*a* illustrates the report that displays the advisor report card for a plurality of advisors for more than one element.

Report of Advisor Analysis for Multiple Elements across a Plurality of Knowledge Bases FIG. 36a illustrates the report that displays the results for the overall advisor analysis for more than one element across a plurality of advisor Knowledge Bases. This report is different from the previous invention reports because it offers the user the ability to see the overall analysis results across more than one element at a time. The report displayed in FIG. 36a is one design that could be utilized to display the results. However, there are multiple alternative designs that could be utilized.

Box 310 illustrates the multiple elements that are being analyzed according to a plurality of advisors overall methodologies and displayed on the report. The user selects the multiple elements they wish to have displayed on this report using a multiple element selection means (FIG. 18b).

Box 272 in FIG. 36a illustrates the plurality of advisors whose overall methodology result is being displayed on the report. The advisors being displayed can vary depending on the report design and the subject matter area being analyzed. Additionally, the advisors included in the report will vary depending on the evaluation criteria utilized in the analysis of the advisor. In other words, if the advisor offers an analysis of the evaluation criteria found within the report, it can be included in the report. Box 282 illustrates a result of an advisor's overall methodology. The verbiage of the results can be represented in many alternative ways.

Figure 36B:
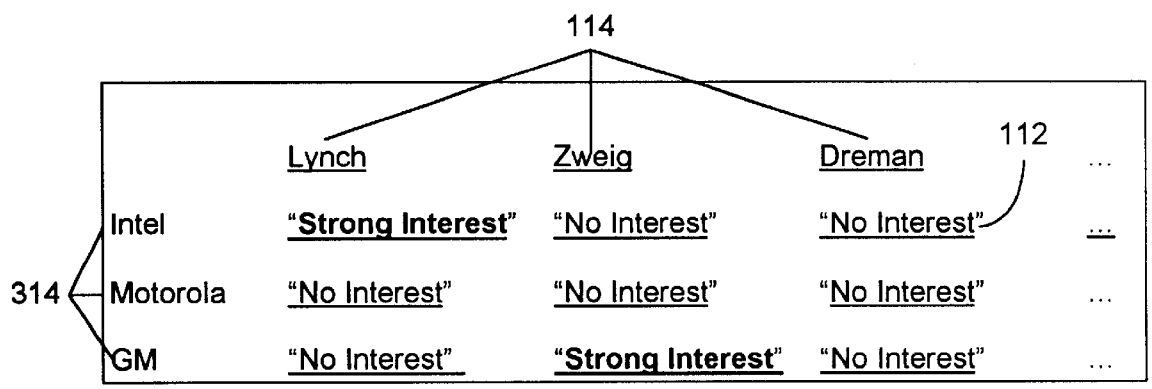
FIG. 36*b* illustrates the report that displays the advisor report card for a plurality of investment advisors for more than one security.

Report of Investment Advisor Analysis for Multiple Elements across a Plurality of Knowledge Bases FIG. 36b illustrates the report that displays the results for the overall investment advisor analysis for more than one security across a plurality of investment advisor Knowledge Bases. This report is different from the previous invention reports because it offers the user the ability to see the overall methodology analysis results across more than one security at a time. The report displayed in FIG. 36b is one design that could be utilized to display the results. However, there are multiple alternative designs that could be utilized.

Box 314 illustrates the multiple securities that are being analyzed across a plurality of investment advisors and displayed on the report. The user selects the multiple securities they wish to have displayed on this report using a multiple security selection means (FIG. 18b).

Box 114 in FIG. 36b illustrates the plurality of investment advisors whose overall result is being displayed on the report. The advisors being displayed can vary depending on the report design. Box 112 illustrates an overall analysis result of an advisor. The result could be represented in many alternative ways depending on the desires of the report designer.

Figure 37:
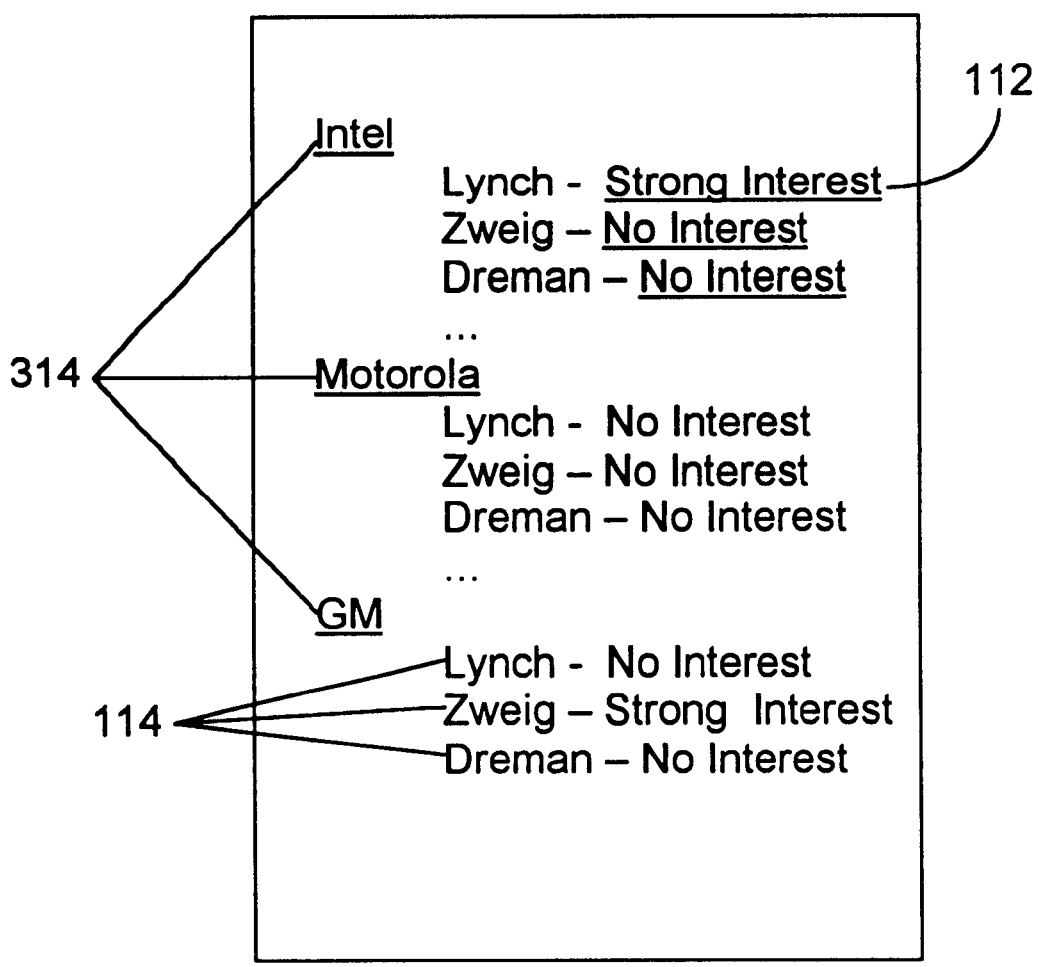
FIG. 37 illustrates an alternative report design that displays the guru report card for a plurality of investment advisors for more than one security.

Alternative Report of Investment Advisor Analysis for Multiple Elements across a Plurality of Knowledge Bases FIG. 37 illustrates an alternative report design that displays the results for the overall investment methodology analysis for more than one security across a plurality of investment advisor Knowledge Bases.

Box 314 illustrates the multiple securities that are being analyzed across a plurality of investment advisors and displayed on the report. The user selects the multiple securities they wish to have displayed on this report using a multiple security selection means (FIG. 18b).

Box 114 in FIG. 36b illustrates the plurality of investment advisors whose overall result is being displayed on the report. The advisors being displayed can vary depending on the report design. Box 112 illustrates an overall analysis result of an advisor. The result could be represented in many alternative ways depending on the desires of the report designer.

The processing system could be applied to a list of securities or elements, which are passed through the plurality of Knowledge Bases and results in the generation of a new list of securities, or elements. This new list could then be processed again by passing it through another set of advisor Knowledge Bases which would result in a final list of securities or elements that are the most attractive or least attractive according to the aforementioned Knowledge Bases.

Alternate Design of Reports

The design of the invention reports should not be limited to the design seen in the examples given in the Drawings included. The results and the descriptive analysis could be alternatively displayed in multiple ways. For example, the guru report card could be replaced by a simple one-column display of the advisor and their result.

The invention reports could display the advisors' results and descriptive analyses and results and descriptive analyses of the ratios according to the plurality of advisor Knowledge Bases in a multitude of ways. In other words, the reports could display any combination of ratios and advisors either individually or together with links between each of the report pages. These links would allow easy navigation between the desired reports, whether the reports were of a particular advisor or multiple advisors or a particular ratio or multiple ratios. For example, a user who is viewing the guru report card for multiple advisors may wish to see the descriptive analysis of one of the advisors Knowledge Bases. The invention reports can afford the user the ability to link from the advisor name in the guru report card to the descriptive analysis of just that particular advisor. On the other hand, the user could also click on a link that allows them to view the descriptive analyses of more than one advisor. The same example mentioned in the prior sentences could be applied to the ratio report card. Utilizing the linking and custom generation of the reports, the user could link on the ratio or multiple ratios they wish to see the descriptive analysis of and view the resulting invention report. Hence, the customized linking to the advisor or ratio of the user's choice allows for the displaying of the reports in multiple ways based on the link selection of the user.

Alternate Report that includes Summary Conclusion of Methodology Results

FIG. 38 illustrates a report that can be displayed. The report displays the guru report card for multiple advisors along with a summary investment conclusion based on the results of the codified methodologies of the advisors. Box 319 illustrates the summary investment conclusion that is displayed. The summary conclusion will provide the user with an investment action based on the combined results of the analyses of the advisors.

Box 100 in FIG. 2 depicts the security identification (as described in FIG. 2). Box 114 depicts the plurality of Knowledge Bases that were used to analyze the security selected by the user (as described in FIG. 2). Box 104, box 106, box 108, and box 110 depict the level of interest that the plurality of Knowledge Bases has in the security selected. The level of interest can be broken down into four categories:

1. strong interest (FIG. 27, box 104)
2. some interest (box 106)
3. no interest or would not invest (box 108)
4. selling interest (box 110)

This report provides the user with additional information that will aid them in their investment decision making. The addition of the summary conclusion of the results should not be restricted to the multiple guru report card. It could also be added to the following reports:

1. multiple guru analysis (FIG. 7)
2. multiple guru report card with multiple guru analysis (FIG. 20)
3. one guru report card (FIG. 12)
4. one guru analysis (FIG. 13)
5. one guru report card along with one guru analysis (FIG. 16)
6. multiple ratio report card (FIG. 8)
7. multiple ratio analysis (FIG. 9)
8. multiple ratio report card along multiple ratio analysis (FIG. 11)
9. one ratio report card (FIG. 14)
10. one ratio analysis (FIG. 15)
11. one ratio report card along with one ration analysis (FIG. 17)

Also, the design of the reports when the summary conclusion is added should not be limited to the design found in FIG. 26. The summary conclusion could be placed and worded in a fashion that is desirable by the report designer.

Alternate Phrasing of Results

The verbiage used when describing the result of the advisors should not be limited to the verbiage used in the sample invention reports. For example, the level of attractiveness could replace the level of interest. In other words, a security or element could receive a result of "Very attractive" rather than "Strong interest" or a security could receive a result of buy, sell or short rather than "Strong Interest", "Some Interest", or "No Interest".

Alternate Investment Methodologies to Display Results of

The methodologies of the advisors could include "short" methodologies also. The current invention includes "buy" methodologies and "sell" methodologies, but in no way should the invention be limited to the methodology type.

Additional Trackinq and Follow UP Service

An additional service that the invention could provide is a follow-up service. This follow-up service would track the securities or elements of interest for the user and automatically notify the user when one of the advisor's methodologies changed its "opinion" or result or summary conclusion on those securities or elements. There are numerous alternatives as to how the system could notify the user. These include but should not be limited to mailing a report via post office mail, electronic mail (e-mail), fax, telephone, etc.

Figure 39:
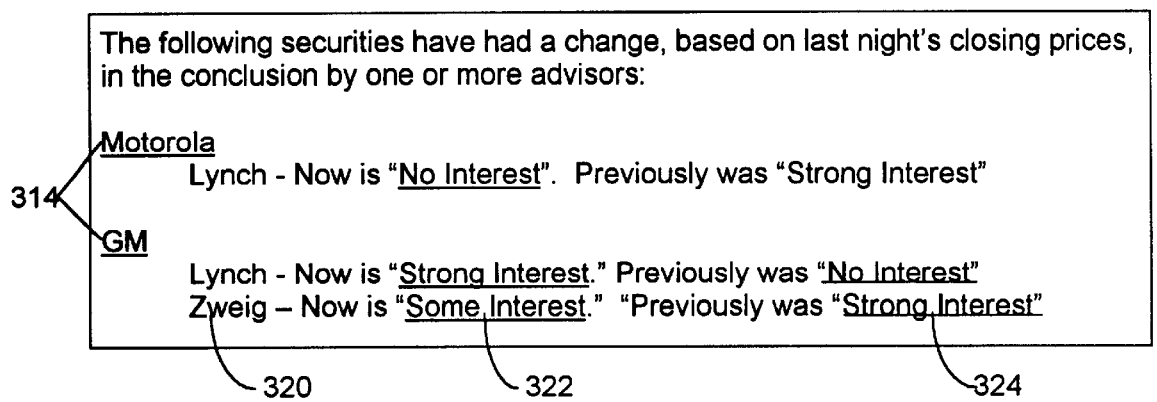
FIG. 39 illustrates the report that displays the change in the advisor's "opinion" or result or summary conclusion, which is used for the tracking service.
Figure 40:
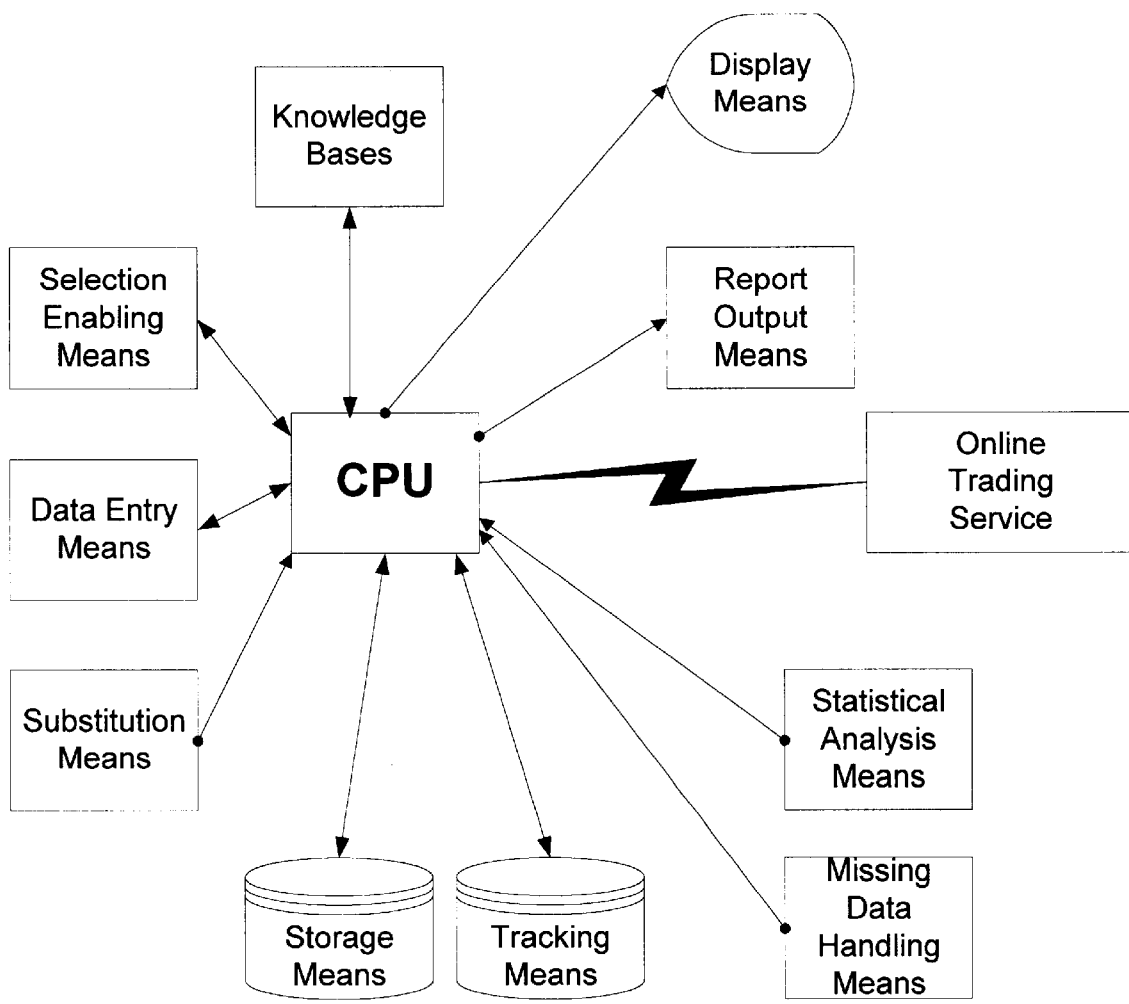
FIG. 40 illustrates the CPU's relationship to the major means comprising the invention.

FIG. 39 illustrates a report that could be used to display the change in the investment advisor overall methodology analysis. This service can be offered for at least one element or security. This report affords the user the opportunity to track the elements or securities they are interested in and be immediately notified of any changes in the advisor's overall analysis.

Box 314 illustrates the multiple securities that are being tracked and whose changes are being reported on the report. The user has selected the securities tracked. Box 320 illustrates the advisor's name whose overall analysis has changed. The number of advisors listed can vary depending on the number of advisors whose overall analysis has changed.

Box 322 in FIG. 39 illustrates an overall analysis result of an advisor at the current time. Box 324 illustrates an overall analysis result of the same aforementioned advisor at the time the user began to track the security of interest.

Overall, this report is a quick and easy way for a user to track the securities or elements they are interested in and to be automatically notified if at least one of the advisors' overall analyses have changed. Hence, they can make a decision on the security or element without having to track the security or element on their own which can save the user an enormous amount of time.

Alternate User Interaction Features

The processing system of the invention reports could also allow a user to enter a variable that is required for the analysis so it can be used for calculation in all Knowledge Bases. The entered variable, such as Price or perhaps Actual or Estimated Earnings, could affect all or some of the required variables or ratios that the Knowledge Bases rely on. This feature provides two benefits:

1. It allows for an interactive sensitivity analysis of a required variable. This enables the user to conduct a "What If" analysis or determine at what point the security or element of interest would receive interest from the expert advisor or expert advisors.
2. Due to the fact that the fundamental database is usually updated on some periodic basis (typically daily or weekly), should there be a radical change in price between update periods, the user will be able to override the fundamental database. They will be able to do this by entering a more up-to-date price. In turn, they can see if the most recent value of the price suddenly causes the stock to receive a different level of interest. This user interaction can also be conducted for multiple alternative variables. Another example is that the earnings of a company may become publicly available before the data storage means is updated. Hence the user can enter the most recent earnings per share of the company and receive the analysis based on the more up-to-date earnings information.

Automated Online Trading Feature

The invention could allow the user to select an advisor's methodology and request that the advisor's selections be transacted on-line automatically through an on-line trading service.

Alternate Performance Analysis

The invention can record, when an analysis is rendered on a security or element, a snapshot of the security or element's fundamental variables. This will allow the invention to look at the status of the security or element at the time the analysis was run. By doing so, the invention could analyze any of the required variables, for the user, at a later point in time and compare them to the time when the user decided to track the security or element.

The invention can record the recommendations of the advisors' methodologies at a particular moment in time and subsequently analyze the performance of the advisors for those recommendations for predetermined or random, ad hoc time frames.

Accordingly, the scope of the invention should be determined not by the embodiment illustrated, but by the appended claims and their legal equivalents.

I claim:

1. A semi-automated system comprised of at least one general purpose computer system, at least one data storage means, an element selection enabling means of selecting at least one element, a computerized means of analysis of an element using at least one identified methodology from a plurality of identified independent methodologies where at least one of the independent methodologies is comprised of a plurality of evaluation criteria, and a report output means, to output a final report that includes, for each element selected through the element selection enabling means, at least one report selected from the group consisting of:

a) a results report containing a plurality of results from said semi-automated system's analysis of an element using a plurality of identified independent analysis methodologies, where at least two of said results contained on the report are each associated with an identification of the methodology that generated the result, b) a report of reasoning from said semi-automated system's analysis of an element using an identified methodology, where reasoning is associated on the report with an identification of the methodology that generated the result, c) a summary conclusion report that suggests a conclusion with respect to an element based on said semi-automated system's analysis results from at least two independent methodologies, d) a report of results from said semi-automated system's analysis of an element using at least one type of evaluation criteria that is used by a methodology, where the type of the evaluation criteria is common to a plurality of identified independent methodologies, and where a plurality of said results are each associated with:
  i) an identification of said type of the evaluation criteria, and
  ii) identification of said methodology that generated the result, e) a report of a plurality of reasoning from said semi-automated system's analysis of at least one type of evaluation criteria where at least one reasoning in a plurality of reasoning on the report is associated with:
  i) an identification of the type of the evaluation criteria, and
  ii) an identification of the methodology that generated the result, f) wherein said reasoning on said report of reasoning is comprised of descriptive analysis for a plurality of evaluation criteria and where descriptive analysis for two or more of said plurality of evaluation criteria contain at least one actual value of a variable, for a selected element, that was analyzed by an evaluation criteria, where a plurality of methodologies are performed on the selected elements on the same date by said computerized means of analysis applied to data used by evaluation criteria of the methodologies, where the data about the selected elements are obtained from a data storage means that holds data about a multitude of similar elements, where the data inputs to at least 2 methodologies are independent of the outputs of the other independent methodologies, where the kind of element is selected from the group consisting of securities, financial products, stocks, bonds, notes, commodities, futures, options, real estate, derivatives, mortgages, insurance, funds, mutual funds, companies, organizations, advisors, analysts, managers, people, company financial statements, sectors, industries, colleges, personal decisions, occupations, management decisions, market segments, employees, customers, banks, parts, components, electronic components, products, motors, robots, transistors, and, whereby after a selection of at least one element for analysis occurs, a combination of reports is provided for each selected element of the analysis of at least one named methodology applied to data about one of the selected elements without having to translate the methodologies and without having to research and enter current and historical data needed for the methodology and where the reports are provided for comparing the results of independent methodologies applied to the selected elements with the same data set.

2. The system of claim 1 wherein at least one of the identified methodologies is derived from a source selected from the group consisting of a methodology of an identified advisor, a methodology disclosed in a publication, a methodology found in text, a methodology of an author, a methodology of an identified expert, a methodology of an identified strategy, a methodology of an identified organization and a methodology of a published advisor.

3. The system of claim 1 wherein the element is a security and wherein at least one of the identified methodologies is derived from a methodology selected from the group consisting of a methodology of an investment advisor, a methodology of an investment publication, a methodology of a text on investing, a methodology of an author on an investing topic, a methodology for investing, a methodology of an investing strategy, a methodology of a successful investor, a methodology of a successful investing firm, a methodology representing an investment style and a methodology of a published investment advisor.

4. The system of claim 1 wherein an identified methodology is derived from a published methodology for at least one action selected from the group consisting of rating an element, ranking an element, determining the best element, selecting an element, determining whether to buy an element, determining a grade for an element, determining an interest level in an element, determining which element to buy, determining whether to sell an element, determining which element to sell, rating a property of an element, ranking a property of an element, and managing an element.

5. The system of claim 1, wherein the final report is presented in a computer environment selected from the group consisting of:
  the World Wide Web,
  a local area network,
  an intranet, and
  a standalone PC.

6. The system of claim 1, wherein the computerized analysis of at least one element is preprocessed up to and including a final report, whereby
  delivery of the final report to an end user is speeded up by eliminating data lookup, calculation and display formatting time.

7. The system of claim 1 wherein the computerized analysis of at least one element is preprocessed up to, but not including a formatted final report, and the preprocessed data is stored in a data storage means, whereby
  memory storage requirements of the data storage means are substantially less than would be required if the formatted output pages were generated, and whereby the data that would be on the final report is not surrounded by text and formatting that is proprietary to just one website.

8. The system of claim 1 wherein the methodologies have been programmed by a programmer into separate knowledge bases, said knowledge bases comprised of rules implemented in executable code, wherein the selected element is analyzed by at least one out of a plurality of such knowledge bases to generate results for said final report and where a result of a knowledge base is associated on the report with an identification of the knowledge base that generated the result, and furthermore where a plurality of said knowledge bases are designed to perform an analysis without input from the results of the other said knowledge bases.

9. The system of claim 1 wherein said methodology of each advisor has been represented with its own knowledge base, where said knowledge base is a program module that implements advisor's methodology which is used to analyze elements found within the subject matter.

10. The system of claim 1 wherein the user is notified by said system through a notification means, of a change occurring in any of the independent reports selected from a group consisting of:

a) a report of the results, b) a report of reasoning, c) a summary conclusion report, d) a report of the result of at least one type of evaluation criteria from a plurality of types of evaluation criteria, and e) a report of the reasoning supporting the result of at least one type of evaluation criteria from a plurality of types of evaluation criteria, as an outcome of applying a plurality of methodologies to at least one element preselected by the user, and where said notification means is selected from the group consisting of e-mail, fax, telephone, wireless messaging and post office, whereby the system performs a service to its users by notifying the users of changes in the results or conclusions about elements, such as stocks, in which they have indicated to the system they have an ongoing interest.

11. The system of claim 1 wherein the system provides a data entry means and a substitution means, prior to each analysis, to allow a user to substitute, in a portion of the computer's memory that is devoted to temporarily holding a copy of data values for use in the analysis for just the element selected by the user, a different value for at least one data item, whereby when the user has more up-to-date information on an element than the system or wishes to conduct a sensitivity analysis for an element to changes in at least one variable, the user is able to but not required to, optionally enter the new data for said variables for said element, and this new data will be used in the analysis in place of the older data, but the data about the element in the data storage means remains unchanged.

12. The system of claim 1 wherein said final report is comprised of predetermined sections and standard web browser hyperlinks to navigate to said sections of the final report, said predetermined sections selected from the group consisting of:

a) a section for results for a selected element, b) a section for reasoning of at least one methodology applied to a selected element, c) a section for reasoning of at least one evaluation criteria of a methodology applied to a selected element, d) a section for reasoning for at least one type of evaluation criteria used by at least one methodology applied to a selected element, e) a summary conclusion section for a selected element, f) a section of the results of at least one type of evaluation criteria applied to a plurality of methodologies evaluating an element, and g) a section of the reasoning of a plurality of methodologies for at least one type of evaluation criteria applied to a selected element from a plurality of types of evaluation criteria, whereby the user may use a standard web browser to view reports and sections of reports that show the analysis of at least one advisor out of a plurality of advisors applied to an element selected by the user, without having to translate the methodologies and without having to research and enter current and historical data needed for the methodology and where the reports are provided for comparing the results of independent methodologies applied to the selected elements with the same data set.

13. The system of claim 1 wherein at least a portion of the identification of the methodology is selected from the group consisting of:

a) a title of the source from which the methodology was derived, b) a title of the published source from which the methodology was derived, c) a name of an author of the source from which the methodology was derived, d) a made-up name whose purpose is to identify the methodology, e) a description of the methodology, f) a name of a contributor to the source from which the methodology was derived, g) a name of a party that has interpreted or derived the methodology, and h) a category of users likely to be interested in the methodology.

14. The system of claim 1 wherein a general method of expressing a result of an evaluation criteria is selected from the group consisting of a) a level of interest, b) a letter grade, c) a numeric grade, d) a suggested action, e) a grade, wherein one value of a grade is selected from the group consisting of:
   i) pass,
   ii) fail,
   iii) hold,
   iv) null,
   v) neutral,
   vi) bullish,
   vii) bearish, f) a score, g) a rank, h) a symbol representing a grade or a rank, i) a symbol, where the brightness or color of the symbol indicates a grade, a rank or a level of interest j) a plurality of the same symbols representing a grade, k) a number of stars representing a grade, l) a recommendation, and m) a conclusion.

15. The system of claim 1 wherein said report output means is selected from the set consisting of: i) a display, ii)

a display of a page containing any HTML formatting, iii) a web browser, and iv) a hard copy report from a printer.

16. The system of claim 1 wherein said analysis means is comprised of a processing means and a set of instructions for said processing means that implement an analysis methodology.

17. The system of claim 1 wherein said analysis means include processing means selected from the set consisting of:
   a) SQL database queries and code,
   b) an expert system,
   c) a spreadsheet,
   d) computer code,
   e) processing of a knowledge base, and
   f) processing of a knowledge base that includes modules that contain code that are used for the processing of the methodologies.

18. The system of claim 1 that further includes a missing data handling means, said missing data handling means performing its function to check for and substitute for a missing data item from the data storage means before at least one analysis methodology would encounter said data item that is missing.

19. The system of claim 1 wherein the reasoning on the report is further comprised of a result for said evaluation criteria for said element.

20. The system of claim 1 further including a means to record a snapshot of a security's fundamental information and the results from the independent reports for a security, so as to allow for the display of this information at a later period of time which allows for a comparison to be made to the more recent fundamental information and results, whereby
   the user is able to see how the security's fundamentals have changed over time or also how the results of the investment advisors has changed over time.

21. The system of claim 1 wherein said methodologies are from advisors for making a purchase decision on one product out of a list of similar products, where the specifications of the products are kept in the data storage means.

22. The system of claim 1 wherein said methodologies are from advisors for making a design decision on one component out of a list of similar components, where the specifications of the components are kept in the data storage means.

23. The system of claim 1 wherein said methodologies are for analyzing company financial statements or company performance, personal decision making, management decision making, and selecting parts for a design.

24. The system of claim 1 which further allows selection of
   a) an advisor's methodology, and
   b) a predetermined result which will then output to the display means a report listing those elements receiving the predetermined result when the advisor's methodology is automatically applied to a plurality of similar elements.

25. The system of claim 1 which further allows selection of
   a) a plurality of advisor's methodologies, and
   b) a least one predetermined result which will then output to the display means a report listing those elements receiving the predetermined result from a plurality of advisor's methodology when automatically applied to a plurality of similar elements.

26. The system of claim 1 which further allows user selection of
   a) types of evaluation criteria from a plurality of advisor's methodologies, and
   b) at least one predetermined result which will then output to the display means a report listing those elements receiving the predetermined result after automatically applying the selected types of evaluation criteria from each selected advisor's methodology to a plurality of similar elements.

27. The system of claim 3 which in addition automatically places an order on-line through an on-line trading service, for one or more securities that are of strong interest to at least one user selected methodology.

28. The system of claim 1 which further includes a means of recording the results of each methodology applied to a multitude of elements within the data storage means, a tracking means that tracks a periodic quantitative measurement of a value of acting on the results of each methodology over time, a statistical analysis means to statistically analyze the periodic quantitative measurement, and a report output means for outputting said statistical analysis, whereby
   the performance of acting on a result for a methodology is tracked over time and statistically analyzed.

29. The system of claim 1 where the identification of the type of evaluation criteria is selected from the group consisting of:
   a) a statement of what to look for or at,
   b) a statement that the originator of the methodology would look for or at a specific condition,
   c) a question,
   d) a statement of what to determine,
   e) a question of what to determine,
   f) the name of a variable,
   g) the name of a condition,
   h) a phrase containing the name or synonym for a variable,
   i) a statement of a desirable condition,
   j) a question asking if a desirable condition exists,
   k) a statement of an undesirable condition,
   l) a question asking if an undesirable condition exists,
   m) a statement presenting mutually exclusive conditions, and
   n) a question asking which of a set of mutually exclusive conditions apply.

30. The system of claim 1 wherein the type of the evaluation criteria of an element by a methodology include analysis rules based on at least one variable selected from a group consisting of Price, Earnings, Growth Rate, Earnings Growth Rate, Sales growth rate, Sales, Debt, Debt/Equity, Free Cash flow, Revenues, Cash, P/E ratio, P/S ratio, P/CF, price to earnings growth rate, Number of Outstanding Shares, Yield, EPS Growth, Price/Research ratio, Quarterly EPS change, Institutional ownership, P/E to Growth, Revenue Growth, Sector, Profit Margin, ROE, Market Cap, Payout, Current Ratio, and Industry
   wherein said final report includes at least one report organized primarily by a section for each type of evaluation criteria on the report, whereby
      an investor using said final report can focus on one variable at a time and conveniently see a report of how at least one identified methodology independently analyzes that variable, using current data in said data storage means, for said element selected by a user.

31. A method of generating and reporting the results and reasoning of a plurality of identified analysis methodologies for the analysis of at least one selected element from a system with a multitude of similar elements where the kind of element is selected from the group consisting of securities, financial products, stocks, bonds, notes, commodities, futures, options, real estate, derivatives, mortgages, insurance, funds, mutual funds, companies, organizations, advisors, analysts, managers, people, company financial statements, sectors, industries, colleges, personal decisions, occupations, management decisions, market segments, employees, customers, banks, parts, components, electronic components, products, motors, robots, transistors, and, comprising:

a) providing a computer system comprising:
   i) a computer program, running on at least one general purpose computer, that process a plurality of identified analysis methodologies which are independent of each other and not dependent on a plurality of the other analysis methodologies for their input, said identified methodologies comprised of a plurality of evaluation criteria,
   ii) at least one data storage means holding a multitude of data items about each of the elements,
   iii) an element selection enabling means,
   iv) a means for a display;
b) selecting at least one element to be evaluated through use of the element selection enabling means;
c) analyzing, on the same date, a plurality of identified methodologies applied to the selected elements with financial data for the elements taken from the data storage means without the user being required to supply data values;
d) producing a result and descriptive analysis for each analysis of an identified methodology in the prior step while the analysis of that methodology is being performed;
e) reporting on a display means the results and descriptive analysis of the prior step in a manner selected from the group consisting of:
   i) a report of the results from the prior step, of a plurality of the independent identified analysis methodologies, where each result is associated on the report with an identification of the methodology that generated the result for each selected element, and
   ii) a report of the descriptive analysis of at least one independent identified analysis methodology, from the prior step, applied to an element, where each descriptive analysis is associated on the report with an identification of the independent identified analysis methodology that generated the descriptive analysis for each selected element;
f) recording, in the data storage means, the results of each methodology of the system applied to each similar element;
g) using a tracking means to track at least one periodic quantitative measurement of a value of acting on the results of each methodology for each element over time;
h) using a statistical analysis means to statistically analyze the periodic quantitative measurements;
i) making this statistical analysis available to a report output means.

32. The method of claim 31 wherein said reasoning on said report of reasoning is comprised of descriptive analysis for each of a plurality of evaluation criteria and where descriptive analysis for each of a plurality of evaluation criteria contain at least one actual value of a variable, for a selected element, that was analyzed by the evaluation criteria.

33. The methodology of claim 31 wherein said analyzing step further includes a step for missing data handling that checks to see if values, that are obtained from a data storage means for variables used by at least one methodology, are missing, and if a value is missing then attempts to find data for at least one pre-determined substitute variable, so that a methodology that calls for the use of the variable will find a substitute value present for the variable if a substitute value was available.

34. A semi-automated system comprised of at least one general purpose computer system, at least one data storage means, an element selection enabling means of selecting at least one element, a computerized means of analysis of an element using at least one identified methodology from a plurality of identified independent methodologies where at least one of the independent methodologies is comprised of a plurality of evaluation criteria, and a report output means, to output a final report that includes, for each element selected by the element selection enabling means, at least one report selected from the group consisting of:

a) a results report containing a plurality of results from said semi-automated system's analysis of an element using a plurality of identified independent analysis methodologies, where at least two of said results contained on the report are each associated with an identification of the methodology that generated the result,
b) a report of reasoning from said semi-automated system's analysis of an element using an identified methodology, where reasoning is associated on the report with an identification of the methodology that generated the result,
c) a summary conclusion report that suggests a conclusion with respect to an element based on said semi-automated system's analysis results from at least two independent methodologies,
d) a report of results from said semi-automated system's analysis of an element using at least one type of evaluation criteria that is used by a methodology, where the type of the evaluation criteria is common to a plurality of identified independent methodologies, and where a plurality of said results are each associated with:
   i) an identification of said type of the evaluation criteria, and
   ii) identification of said methodology that generated the result,
e) a report of a plurality of reasoning from said semi-automated system's analysis of at least one type of evaluation criteria, where the type of the evaluation criteria is common to a plurality of identified independent methodologies, and where each reasoning in a plurality of reasoning on the report are each associated with:
   i) an identification of the type of the evaluation criteria, and
   ii) an identification of the methodology that generated the result,
   wherein a plurality of reasoning on a report is comprised of:
   a) an identification of a type of an evaluation criteria,
   b) a value of the variable for said evaluation criteria being analyzed for an element on said final report, and c) descriptive analysis, comprised of a description of what a methodology looks for in the methodology's guidelines for values of the criteria, where a plurality of methodologies are performed on the selected elements on the same date by said computerized means of analysis applied to data used by evaluation criteria of the methodologies, where the data about the selected elements are obtained from a data storage means that holds data about a multitude of similar elements, where the data inputs to at least 2 methodologies are independent of the outputs of the other independent methodologies, where the kind of element is selected from the group consisting of securities, financial products, stocks, bonds, notes, commodities, futures, options, real estate, derivatives, mortgages, insurance, funds, mutual funds, companies, organizations, advisors, analysts, managers, people, company financial statements, sectors, industries, colleges, personal decisions, occupations, management decisions, market segments, employees, customers, banks, parts, components, electronic components, products, motors, robots, transistors, and, whereby after a selection of at least one element for analysis occurs, a combination of reports is provided for each selected element of the analysis of at least one named methodology applied to data about one of the selected elements without having to translate the methodologies and without having to research and enter current and historical data needed for the methodology and where the reports are provided for comparing the results of independent methodologies applied to the selected elements with the same data set.

35. The system of claim 34 wherein said analyzing step further includes a step for missing data handling that checks to see if values, that are obtained from a data storage means for variables used by at least one methodology, are missing, and if a value is missing then attempts to find data for at least one pre-determined substitute variable, so that a methodology that calls for the use of the variable will find a substitute value present for the variable if a substitute value was available.

* * * * *